(12) United States Patent
Nagasawa et al.

(10) Patent No.: US 8,677,436 B2
(45) Date of Patent: Mar. 18, 2014

(54) STEREOSCOPIC VIDEO DISTRIBUTION SYSTEM, STEREOSCOPIC VIDEO DISTRIBUTION METHOD, STEREOSCOPIC VIDEO DISTRIBUTION APPARATUS, STEREOSCOPIC VIDEO VIEWING SYSTEM, STEREOSCOPIC VIDEO VIEWING METHOD, AND STEREOSCOPIC VIDEO VIEWING APPARATUS

(75) Inventors: Masato Nagasawa, Tokyo (JP); Yuichiro Haruyama, Tokyo (JP)

(73) Assignee: Mitsubishi Electronic Corporation, Tokyo (JP)

( * ) Notice: Subject to any disclaimer, the term of this patent is extended or adjusted under 35 U.S.C. 154(b) by 664 days.

(21) Appl. No.: 12/767,487

(22) Filed: Apr. 26, 2010

(65) Prior Publication Data

US 2010/0275238 A1 Oct. 28, 2010

(30) Foreign Application Priority Data

Apr. 27, 2009 (JP) ................................. 2009-107393

(51) Int. Cl.
*H04N 7/173* (2011.01)
*H04N 15/00* (2006.01)
*H04N 13/00* (2006.01)

(52) U.S. Cl.
USPC ............................................ 725/116; 348/43

(58) Field of Classification Search
None
See application file for complete search history.

(56) References Cited

U.S. PATENT DOCUMENTS

| | | | | |
|---|---|---|---|---|
| 5,583,561 A * | 12/1996 | Baker et al. | ...................... | 725/93 |
| 5,644,714 A * | 7/1997 | Kikinis | ........................ | 709/219 |
| 5,719,620 A * | 2/1998 | Allio | .............................. | 348/49 |
| 5,822,117 A * | 10/1998 | Kleinberger et al. | ......... | 359/465 |
| 6,055,012 A * | 4/2000 | Haskell et al. | .................. | 348/48 |
| 6,072,831 A * | 6/2000 | Chen | ........................ | 375/240.03 |
| 6,137,456 A * | 10/2000 | Bhagavatula et al. | ............ | 345/7 |
| 6,476,850 B1 * | 11/2002 | Erbey | .............................. | 348/51 |
| 6,574,423 B1 * | 6/2003 | Oshima et al. | ................ | 386/329 |
| 6,862,043 B1 | 3/2005 | Song | | |
| 7,834,903 B2 * | 11/2010 | Saishu et al. | .................... | 348/51 |
| 2002/0030675 A1* | 3/2002 | Kawai | ............................ | 345/204 |

(Continued)

FOREIGN PATENT DOCUMENTS

EP     1 501 317 A1    1/2005
JP         9-46630 A    2/1997

(Continued)

OTHER PUBLICATIONS

Hitachi et al.; "HDMI Specification Version 1.3a", Internet Citation, Nov. 10, 2006, XP002476103, Retrieved from the Internet: URL:http://www.hdmi.org/download/HDMISpecification13a.pdf.

*Primary Examiner* — Brian Pendleton
*Assistant Examiner* — Jonathan V Lewis
(74) *Attorney, Agent, or Firm* — Birch, Stewart, Kolasch & Birch, LLP

(57) ABSTRACT

It is the object of the present invention to provide a stereoscopic video distribution system, a stereoscopic video distribution method, a stereoscopic video distribution apparatus, a stereoscopic video viewing system, a stereoscopic video viewing method, and a stereoscopic video viewing apparatus. In the stereoscopic video distribution system according to this invention, stereoscopic video signals provided by a plurality of video distribution source servers for distributing stereoscopic videos are once received by a transcoding server, so that the stereoscopic video signals can be reproduced by a BD player and a TV for stereoscopic viewing.

45 Claims, 43 Drawing Sheets

(56) References Cited

U.S. PATENT DOCUMENTS

| | | | |
|---|---|---|---|
| 2003/0128273 A1* | 7/2003 | Matsui et al. | 348/51 |
| 2004/0010588 A1* | 1/2004 | Slater et al. | 709/224 |
| 2004/0218269 A1 | 11/2004 | Divelbiss et al. | |
| 2004/0239685 A1* | 12/2004 | Kiyokawa et al. | 345/619 |
| 2005/0041960 A1 | 2/2005 | Oh | |
| 2005/0062846 A1* | 3/2005 | Choi et al. | 348/42 |
| 2005/0248561 A1* | 11/2005 | Ito et al. | 345/419 |
| 2005/0254010 A1* | 11/2005 | Kato et al. | 352/59 |
| 2006/0050383 A1* | 3/2006 | Takemoto et al. | 359/462 |
| 2006/0232584 A1* | 10/2006 | Utsugi et al. | 345/426 |
| 2008/0205791 A1* | 8/2008 | Ideses et al. | 382/285 |
| 2008/0247462 A1* | 10/2008 | Demos | 375/240.03 |
| 2008/0292287 A1 | 11/2008 | Oshima et al. | |
| 2008/0303892 A1* | 12/2008 | Kim et al. | 348/42 |
| 2008/0303893 A1* | 12/2008 | Kim et al. | 348/42 |
| 2009/0024767 A1 | 1/2009 | Matsuda | |
| 2009/0103833 A1 | 4/2009 | Mitsuhashi et al. | |
| 2010/0021141 A1* | 1/2010 | Yamashita et al. | 386/109 |
| 2010/0092148 A1* | 4/2010 | Ogawa et al. | 386/44 |
| 2010/0142924 A1* | 6/2010 | Yamashita et al. | 386/95 |
| 2010/0182403 A1* | 7/2010 | Chun et al. | 348/43 |
| 2010/0271466 A1* | 10/2010 | Newton | 348/51 |
| 2011/0181696 A1 | 7/2011 | Oshima et al. | |

FOREIGN PATENT DOCUMENTS

| | | |
|---|---|---|
| JP | 10-69755 A | 3/1998 |
| JP | 10-174110 A | 6/1998 |
| JP | 11-261943 A | 9/1999 |
| JP | 11-289555 A | 10/1999 |
| JP | 2000-78611 A | 3/2000 |
| JP | 2001-160945 A | 6/2001 |
| JP | 2001-231027 A | 8/2001 |
| JP | 2003-132624 A | 5/2003 |
| JP | 2003-185967 A | 7/2003 |
| JP | 2003-337913 | 11/2003 |
| JP | 2004-274125 | 9/2004 |
| JP | 2005-94168 A | 4/2005 |
| JP | 2005-130021 | 5/2005 |
| JP | 2005-175566 A | 6/2005 |
| JP | 2006-157605 A | 6/2006 |
| JP | 2007-503751 A | 2/2007 |
| JP | 2007-166651 A | 6/2007 |
| JP | 3935507 B2 | 6/2007 |
| JP | 2008-005203 A | 1/2008 |
| JP | 2008-288958 A | 11/2008 |
| JP | 4321658 B2 | 8/2009 |
| WO | WO 03/092303 A1 | 11/2003 |
| WO | WO 2004/004350 A1 | 1/2004 |
| WO | WO 2004/071102 A1 | 8/2004 |
| WO | WO 2007/040472 A1 | 4/2007 |

* cited by examiner

F I G . 5
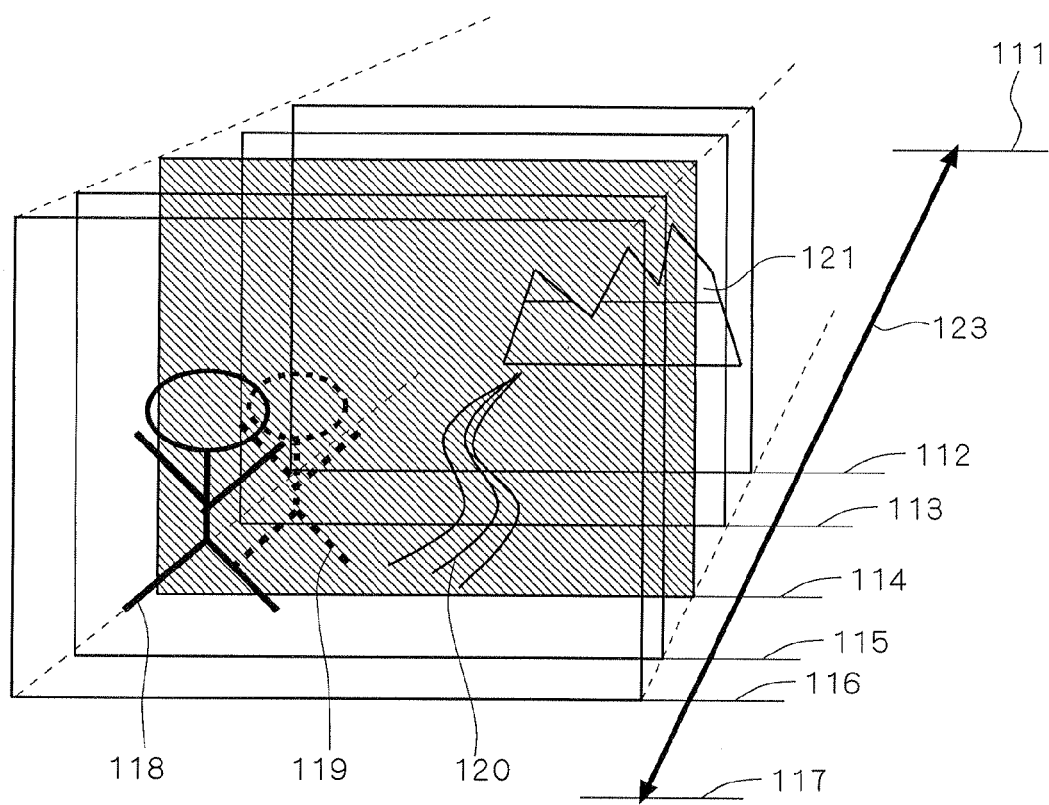

F I G . 6
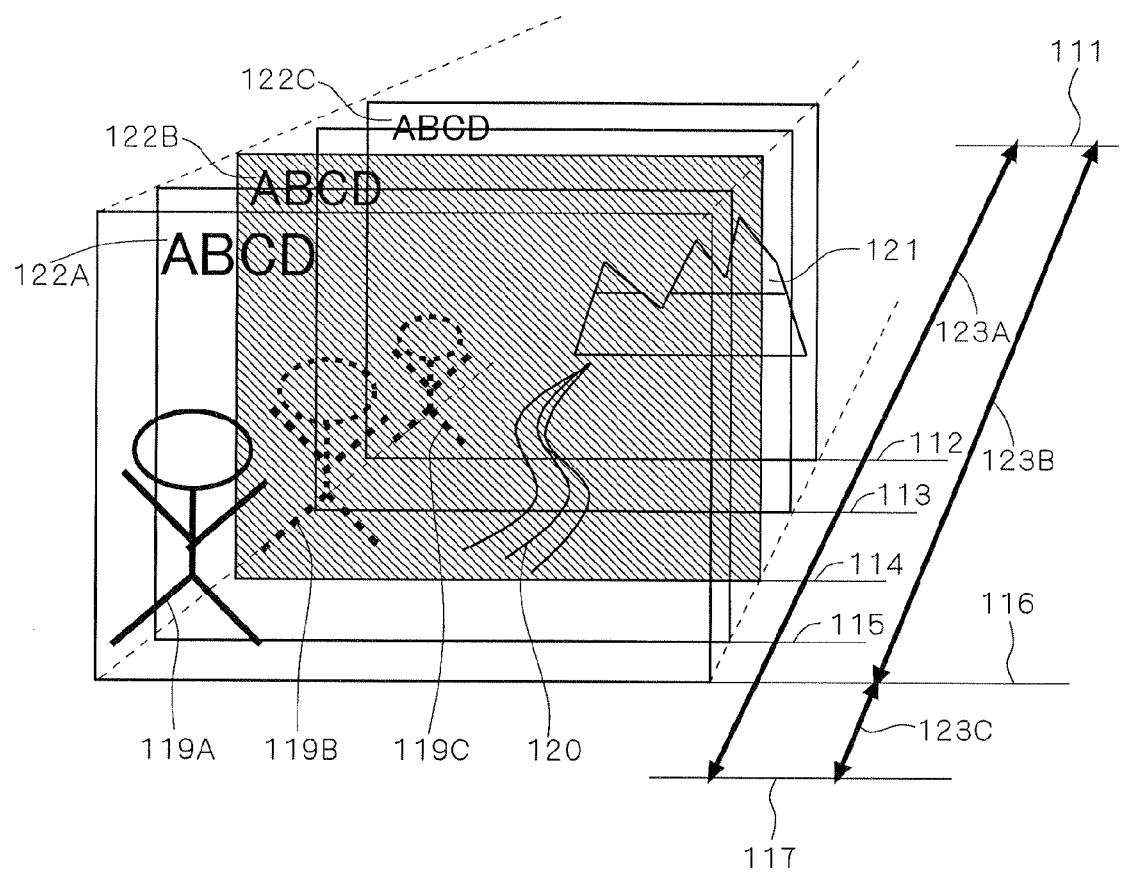

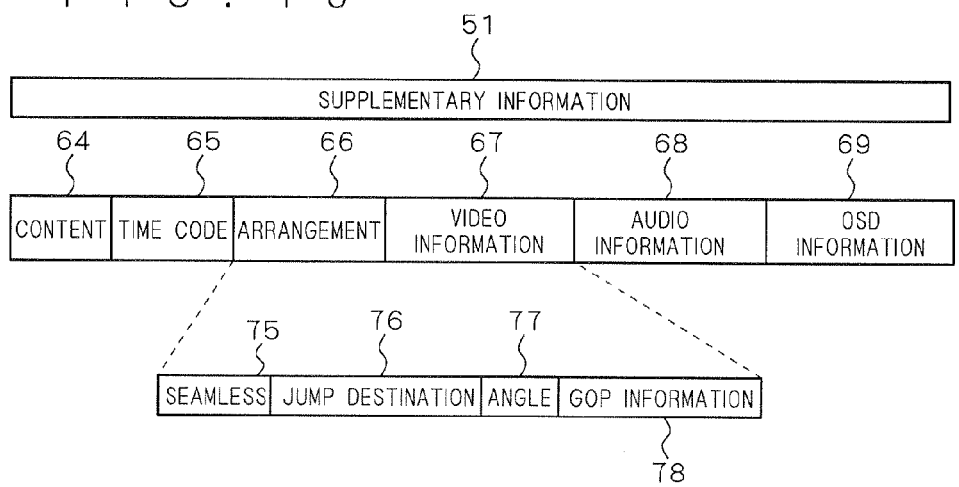
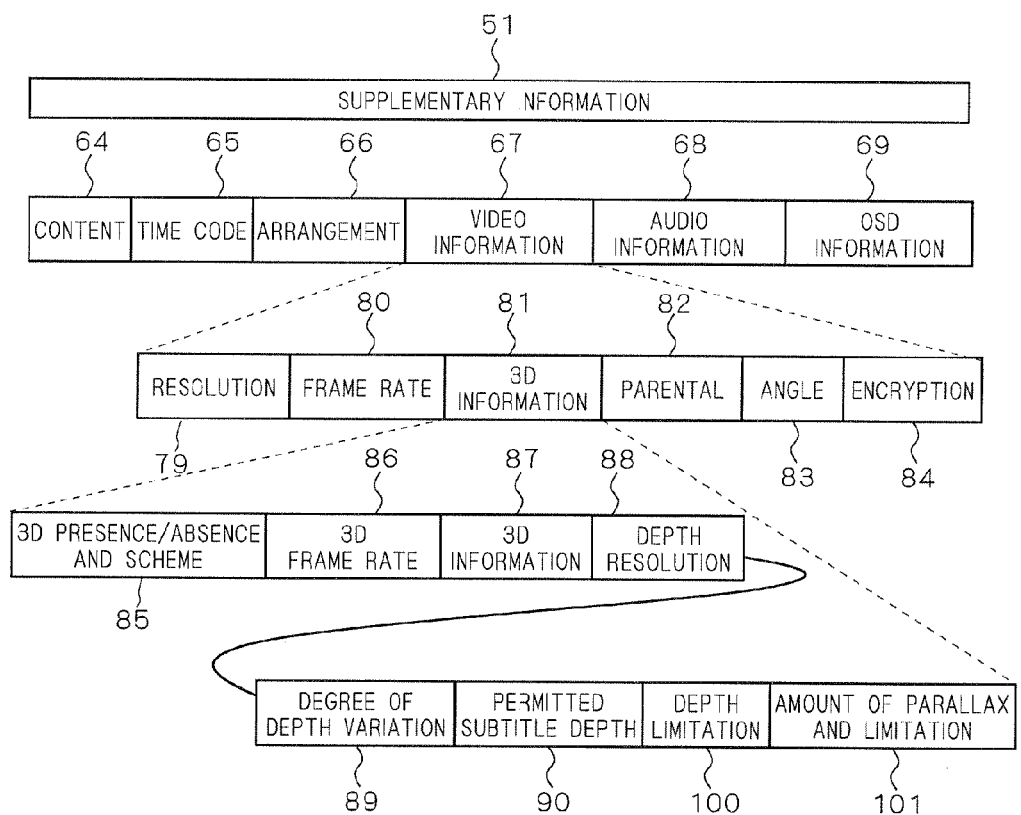

F I G . 1 8
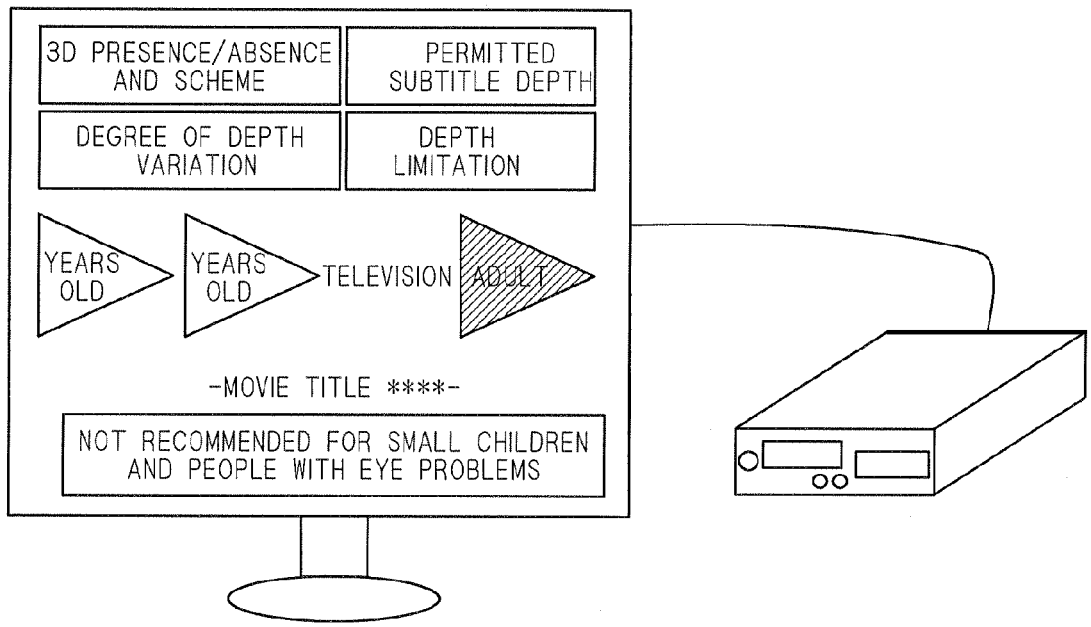

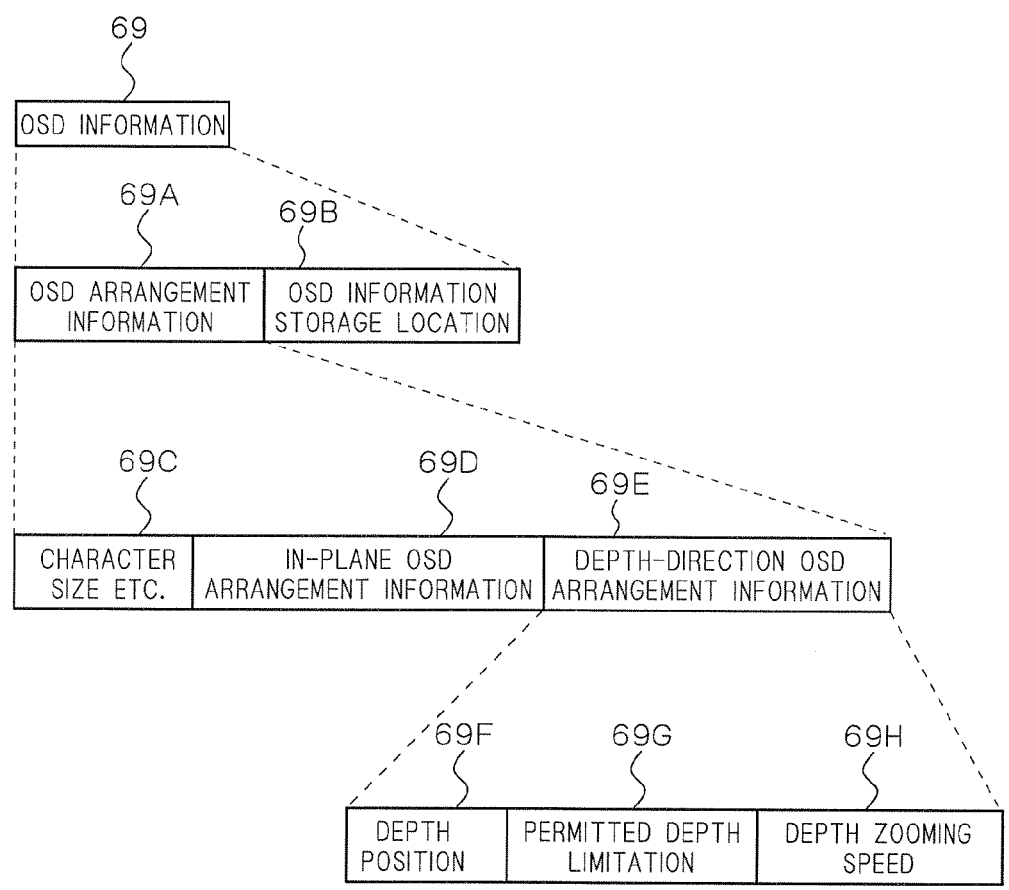

F I G . 2 6
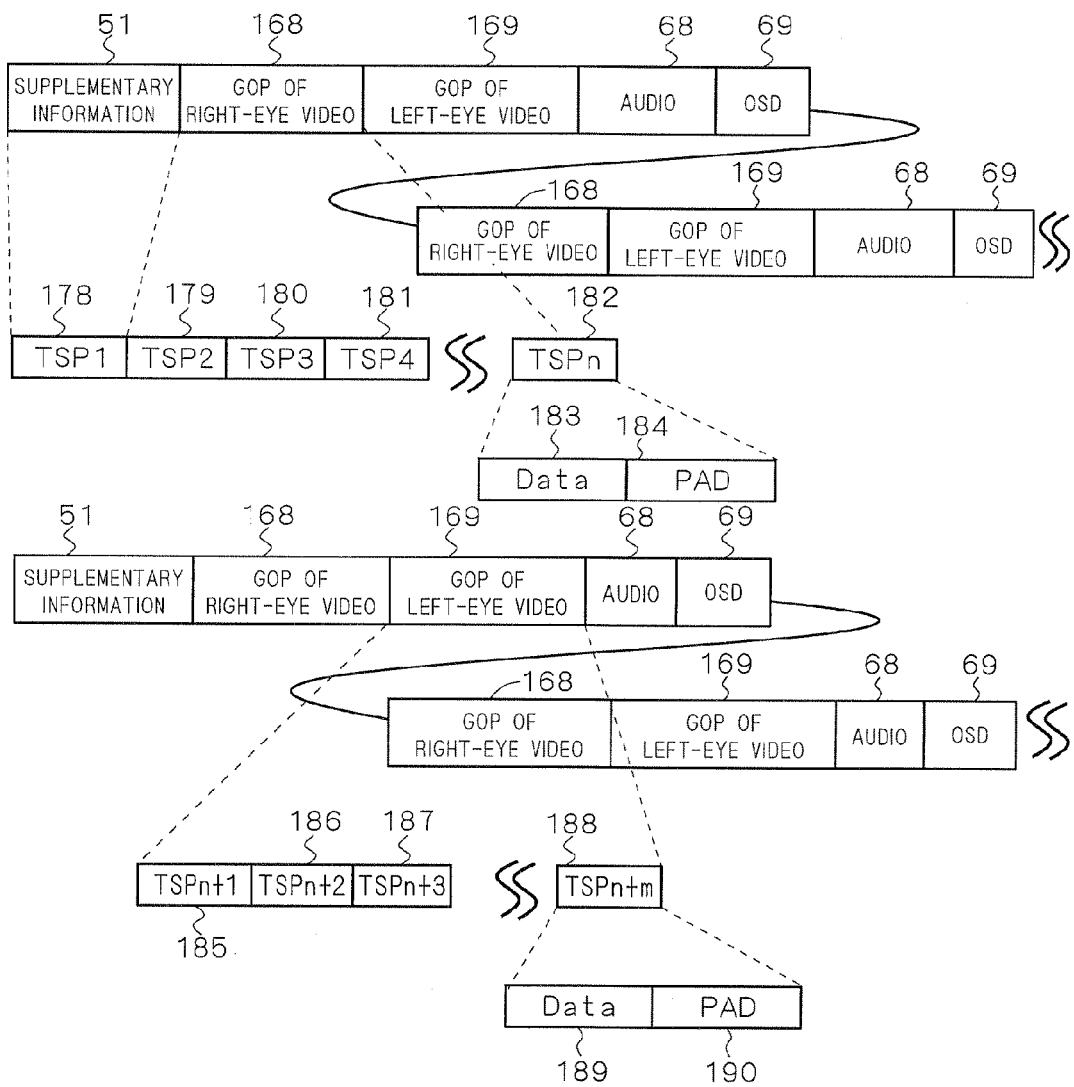

F I G . 2 8 A
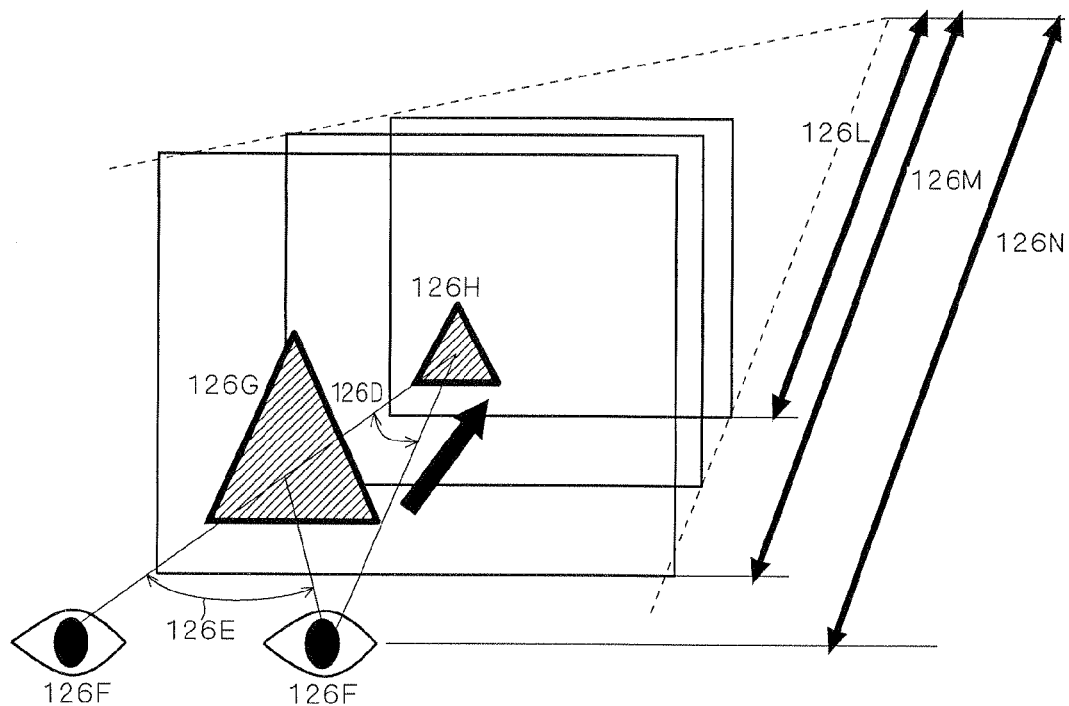
F I G . 2 8 B
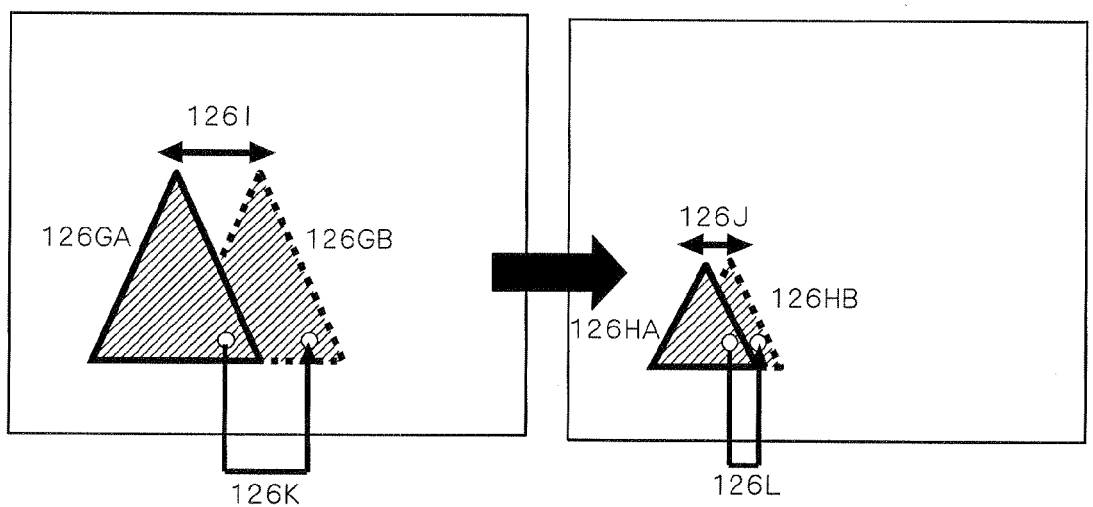

F I G . 3 7
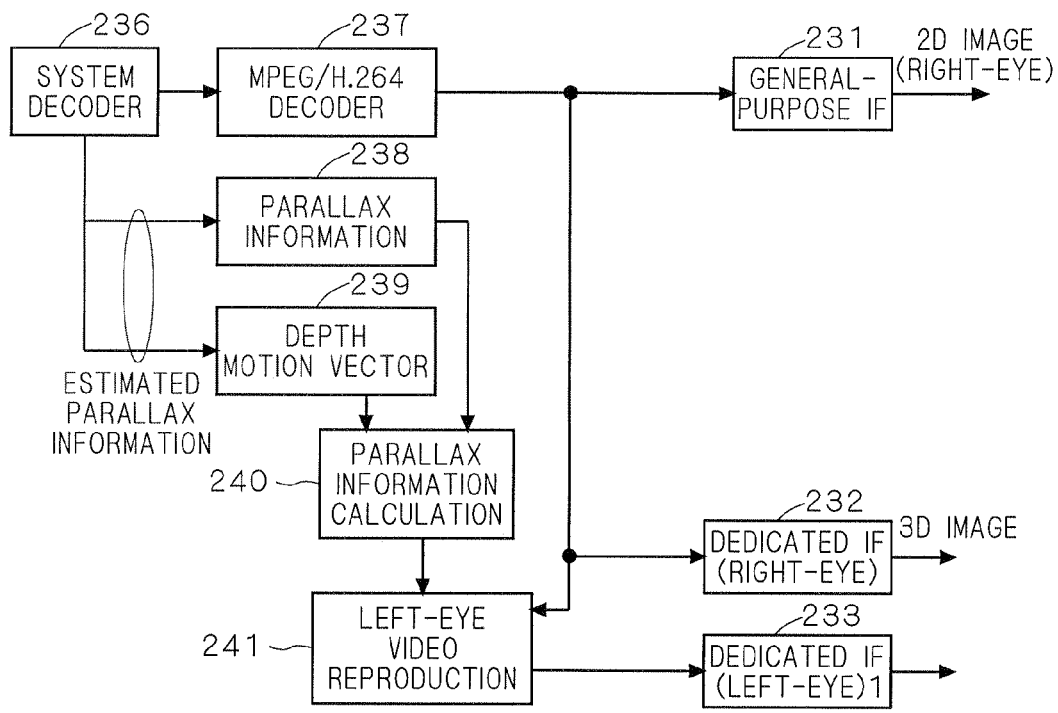

F I G . 4 2
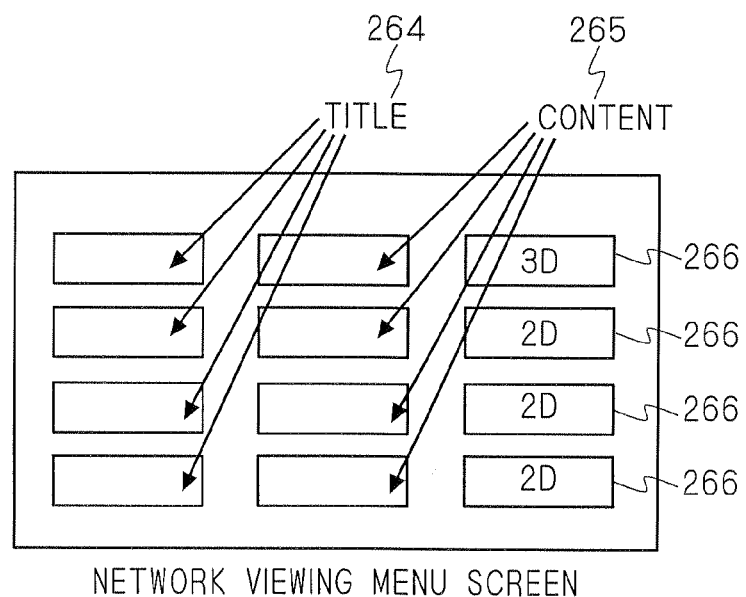

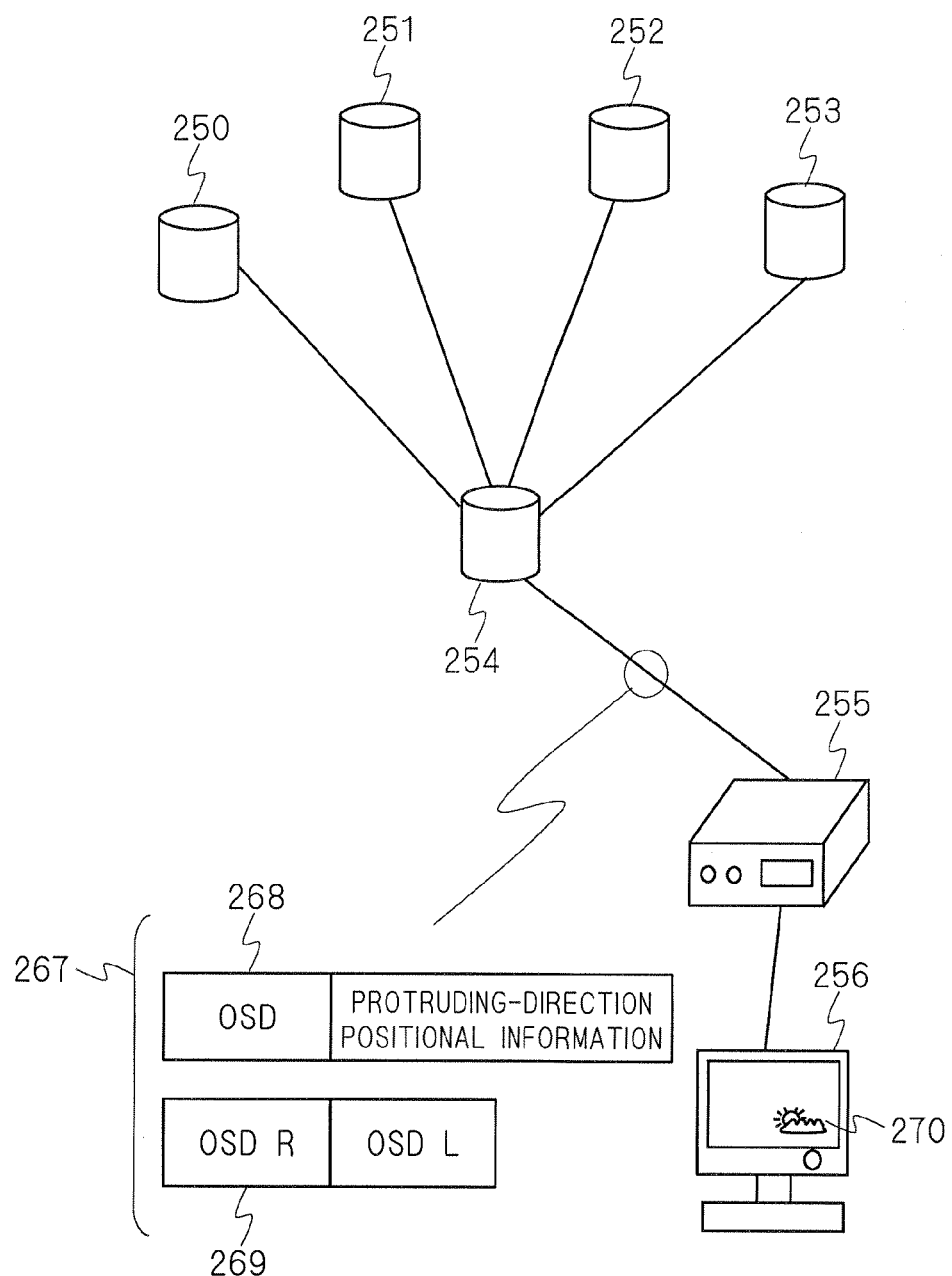

STEREOSCOPIC VIDEO DISTRIBUTION SYSTEM, STEREOSCOPIC VIDEO DISTRIBUTION METHOD, STEREOSCOPIC VIDEO DISTRIBUTION APPARATUS, STEREOSCOPIC VIDEO VIEWING SYSTEM, STEREOSCOPIC VIDEO VIEWING METHOD, AND STEREOSCOPIC VIDEO VIEWING APPARATUS

BACKGROUND OF THE INVENTION

1. Field of the Invention

The present invention relates to a stereoscopic video distribution system, a stereoscopic video distribution method, a stereoscopic video distribution apparatus, a stereoscopic video viewing system, a stereoscopic video viewing method, and a stereoscopic video viewing apparatus.

2. Description of the Background Art

Along with the progress of encoding techniques for compressing digital video signals, the record of compressed video signals to an optical disk have enabled implementation of an optical disk apparatus with excellent searchability and operability. Since such an optical disk apparatus records video as a digital signal, the optical disk apparatus is free from deterioration in dubbing compared with recording of an analog video signal, and achieves a higher reliability with its non-contact optical recording and reproduction.

Examples of encoding methods for compressing data of such digital video signal include the MPEG (Moving Picture coding Experts Group) method. This MPEG compression method achieves improved compression efficiency as compared with intra compression methods such as motion JPEG, but the MPEG compression method is still restricted by the following constrained conditions. For example, since the MPEG compression method uses a motion-compensated prediction in the temporal direction, the MPEG compression method allows searching only in units of videos consisting of group of pictures (GOPs), and in order to access a disk, it is necessary to initially access one picture made by the intraframe compression. In view of this problem, Japanese Patent Application Laid-Open No. 2005-260988 suggests an improvement to a data format on an optical disk.

The data format of Japanese Patent Application Laid-Open No. 2005-260988 is no more than a file format in which a two-dimensional flat video is stored as a file. When a stereoscopic video is recorded as a file, it is necessary to employ a method of Japanese Patent Application Laid-Open No. 2007-166651 for separately displaying a right-eye video and a left-eye video respectively based on a first field and a second field of a TV signal and showing field videos to the respective eyes with polarizing eyeglasses.

Japanese Patent Application Laid-Open No 2001-167180 describes a method for storing a stereoscopic image on a server and displaying the stored stereoscopic image. However, this is used to show a stereoscopic advertisement by displaying the image while rotating the image. A method using a plurality of cameras described in Published Japanese Translation of PCT Application No. 2003-532346 also relates to a mere improvement in showing a stereoscopic image by rotating the image. On the other hand, Published Japanese Translation of PCT Application No. 2002-517840 relates to a method for generating a motion character within a server and describes a type of uploading of a three-dimensional image to a server by using right and left images. Japanese Patent Application Laid-Open No. 2006-101329 describes a medical three-dimensional image rendering processing method during remote control operation, but Laid-Open No. 2006-101329 is silent on signal formats and the like according to which a stereoscopic image is distributed by a server. Japanese Patent Application Laid-Open No. 2005-175566 indicates that a conversion from 2D video to 3D video is carried out by video information transmission means, but Laid-Open No. 2005-175566 is silent on specific conversion methods and the like. Japanese Patent Application Laid-Open No. 2006-31665 and Published Japanese Translation of PCT Application No. 2007-500883 mention a method for realizing a stereoscopic virtually-realized space, but they do not relate to the system for viewing stereoscopic video contents and the signal format, which are explained in this application.

Various methods such as the followings have been suggested as a signal format for viewing stereoscopic video: a method for respectively MPEG-compressing and transferring right and left videos; a method for dividing a screen into both sides; and a method for dividing a screen into an upper portion and a lower portion. Accordingly, many methods are coexisting for an original video of a distributed video content, and it has been difficult to unify video distribution servers which are owned by various companies and provide services so as to unify the servers into a particular type.

Therefore, it has been desired to achieve a method adapted to integrally handle processing, including even billing processing, of these plurality of servers of different types.

Even in a case where a video distribution source server owns stereoscopic video contents, user's viewing environment may not be necessarily ready for stereoscopic viewing. When a stereoscopic video based on a parallactic video is distributed, the stereoscopic video may appear as double images on an ordinary two-dimensional video viewing TV. Even a stereoscopic viewing-enabled TV results in the same problem when the TV setting is set to a flat video viewing mode Further, in a viewing menu of contents, a stereoscopic viewing-enabled environment and a flat video-only environment respectively require distribution of different menus, i.e., a menu with 3D contents and a menu without 3D contents. With regard to this issue, there is a problem in that the above cannot be achieved unless the state of viewing environment is recognized.

With regard to multi-angle video distribution, there is a problem in that, e.g., it takes too much time to respond to an angle-switching instruction given by an apparatus and contents cannot be viewed upon angle-rotation.

When widget information is viewed in such a manner that the widget information is overlaid on a TV screen or the TV screen is divided, and the widget information originally made for the two-dimensional video is now displayed in a stereoscopic video as it is, the user may feel awkward in viewing the widget information whose position in a depth and protruding direction is always fixed to a default position. For example, when the entire video is protruding, there is a problem in that the user feels awkward in seeing the widget information appearing to be positioned at a deeper side.

Further, most of the normal video distribution contents are generally made of flat videos, but users who have stereoscopic viewing environment desire a method for viewing the contents upon converting two-dimensional video into three-dimensional video. In addition, it has been desired to achieve a method for varying the amount of protrusion of video with consideration paid to viewing safety such as eye fatigue.

Likewise, it has been desired to achieve a method for viewing contents upon converting, into three dimension, two-dimensional contents personally recorded by the user with a movie and the like. In this respect, there is a problem in that a private content uploaded by the user can be viewed by the general-public.

SUMMARY OF THE INVENTION

It is an object of the present invention to provide a stereoscopic video distribution system, a stereoscopic video distribution method, and a stereoscopic video distribution apparatus that convert stereoscopic video signal formats into a integrated format that can be reproduced by a player or a TV, even where there are a plurality of stereoscopic video signal formats provided by video distribution source servers. Therefore, all kinds of stereoscopic video contents owned by the video distribution source servers can be reproduced and viewed by a household video viewing apparatus.

The present invention is a stereoscopic video distribution system for distributing, from a server, a stereoscopic video including a left-eye video and a right-eye video utilizing parallax video.

Video content that contains stereoscopic video is constituted by digital video information including an I picture that is data-compressed within a frame, a P picture that is data-compressed with motion compensation from the I picture in a preceding direction in time, and a B picture that is data-compressed with motion compensation from the I picture or P picture in a preceding/following direction in time.

The video information is a stereoscopic video distribution content that includes a flat video constituted by only one of the left-eye video and the right-eye video and enables viewing a stereoscopic video made using information about a video of the eye on the side opposite to the eye of the flat video. The stereoscopic video distribution content is stored in a plurality of video distribution servers.

During video distribution, the stereoscopic video distribution content is distributed from one of the plurality of video distribution servers that has a desired content selected according to an external instruction.

The stereoscopic video distribution content to be distributed is once input to a transcoding server, and is subjected to a format conversion in the transcoding server, so that the stereoscopic video distribution content is made into a video signal format that can be decoded by a stereoscopic viewing-enabled player or a TV, and the converted stereoscopic video distribution content is redistributed to the stereoscopic viewing-enabled player or the TV.

According to the above configuration, even where there are a plurality of stereoscopic video signal formats provided by video distribution source servers, the plurality of stereoscopic video signal formats are once converted by the transcoding server into an integrated format that can be reproduced by a player or a TV. Therefore, all kinds of stereoscopic video contents owned by the video distribution source servers can be reproduced and viewed by a household video viewing apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a schematic diagram illustrating a stereoscopic video according to the first embodiment of the present invention;

FIG. 6 is a schematic diagram illustrating a stereoscopic video including display of subtitles according to the first embodiment of the present invention;

FIG. 16 is a diagram illustrating arrangement information in the supplementary information according to the second embodiment of the present invention;

FIG. 17 is a diagram illustrating video information in the supplementary information according to the second embodiment of the present invention;

FIG. 18 is a conceptual diagram illustrating a TV display using the supplementary information according to the second embodiment of the present invention;

FIG. 20 is a diagram illustrating OSD information according to the second embodiment of the present invention;

FIG. 26 is a diagram illustrating the structure of a video stream according to the third embodiment of the present invention;

FIGS. 28A and 28B are conceptual diagrams of parallactic images used to illustrate the principles of compression with difference information according to the third embodiment of the present invention;

FIG. 37 is a block diagram of a stereoscopic video reproducing apparatus according to the fourth embodiment of the present invention;

FIG. 42 is a figure for illustrating a viewing selection screen during network-based viewing according to the fifth embodiment of the present invention;

FIG. 43 is a figure for illustrating a stereoscopic widget display system according to the fifth embodiment of the present invention.

DESCRIPTION OF THE PREFERRED EMBODIMENTS

First Embodiment

Figure 1:
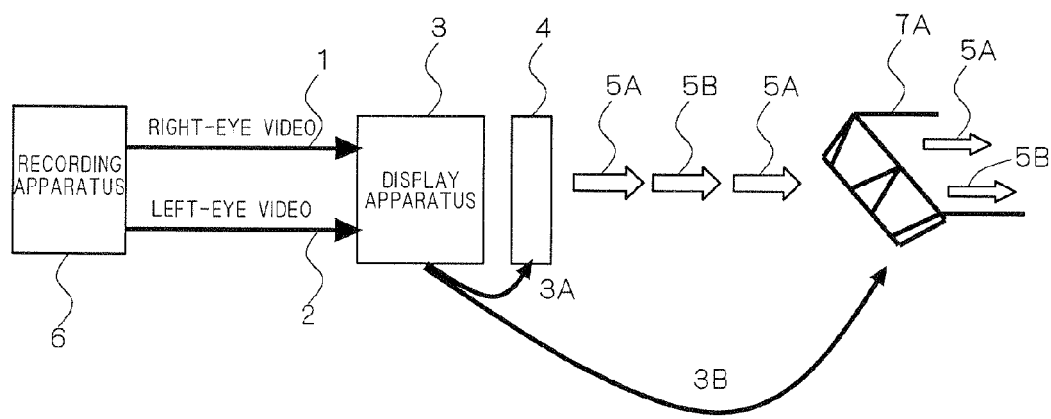
FIG. 1 is a conceptual diagram of a stereoscopic video display system using a shutter according to a first embodiment of the present invention.
Figure 2:
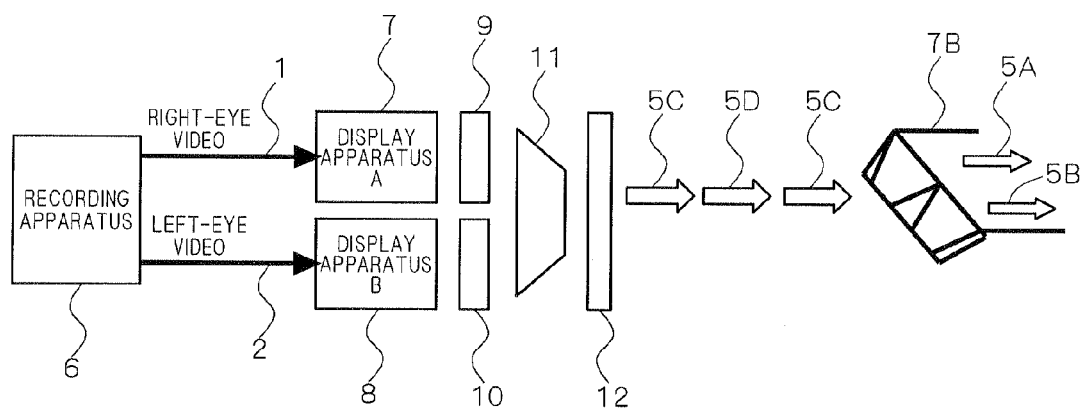
FIG. 2 is a conceptual diagram of a stereoscopic video display system using polarizing filters according to the first embodiment of the present invention.

The first embodiment of the present invention will be hereinafter described with reference to the figures. FIG. 1 is a block diagram showing the overall configuration of a stereoscopic video system according to the present embodiment. The stereoscopic video system shown in FIG. 1 includes a stereoscopic video recording apparatus 6 (hereinafter simply referred to as recording apparatus 6) for outputting right-eye videos 1 and left-eye videos 2 upon reproducing a medium recording stereoscopic videos, a display apparatus 3 such as a TV or a projector, a shutter 4 that is made of liquid crystal and the like and can switch two transmissive polarized lights, and eyeglasses 7A including right and left liquid crystal shutters or right and left polarizing plates, each being different from each other, in order to view a frame sequence of videos 5A and 5B via the shutter 4. FIG. 2 shows another example of configuration of the stereoscopic video system according to the first embodiment. The stereoscopic video system shown in FIG. 2 is different from that of FIG. 1, and it has two display apparatuses A and B, polarizing plates 9 and 10 that allow passage of particular polarization light components each being different in direction from each other. In addition, the stereoscopic video system shown in FIG. 2 includes an optical system 11 for projecting light onto a display panel 12 and eyeglasses 7B including right and left polarizing plates, each being different from each other, in order to view a frame sequence of videos 5C and 5D via the polarizing plates 9 and 10.

Figure 3:
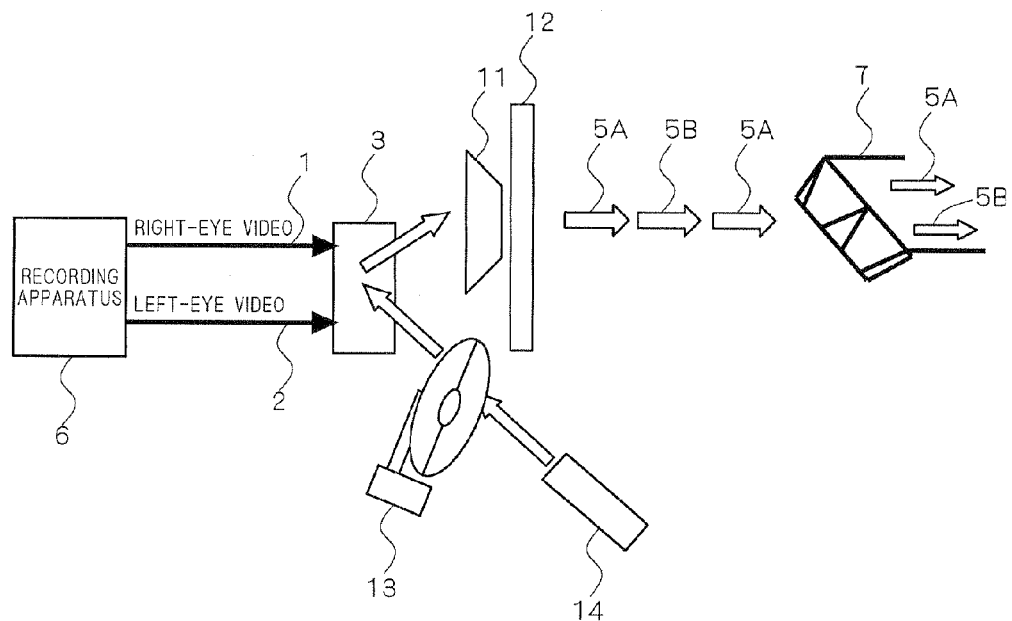
FIG. 3 is a conceptual diagram of a stereoscopic video display system using a rotary polarizing filter according to the first embodiment of the present invention.
Figure 4:
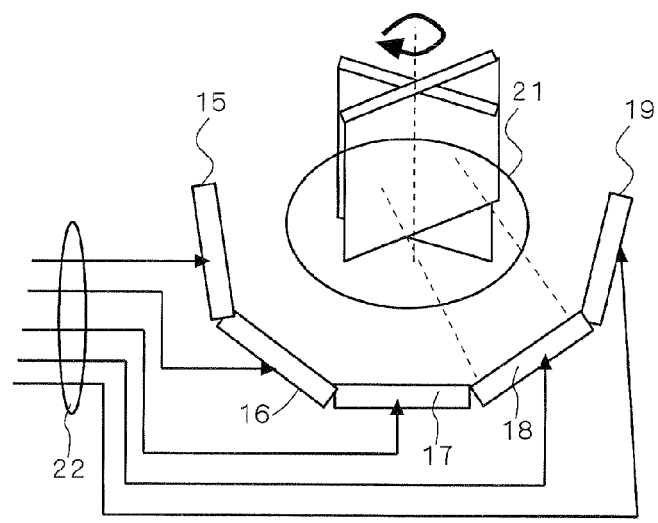
FIG. 4 is a conceptual diagram of a stereoscopic video display system using multiple information according to the first embodiment of the present invention.

FIG. 3 shows still another example of configuration of the stereoscopic video system according to the first embodiment. The stereoscopic video system shown in FIG. 3 is different from that of FIG. 1, and it includes a synchronous rotating member 13 having a circular rotary disk made of semicircular polarizing plates attached with each other so as to allow passage of lights having particular polarization components each being different in the direction, and a light source 14 for projecting light onto the synchronous rotating member 13. FIG. 4 shows still another example of configuration of the stereoscopic video system according to the first embodiment. The stereoscopic video system shown in FIG. 4 is different from that of FIG. 1, and it includes display devices 15 to 19 for projecting a plurality of videos based on a video signal 22 and a rotational mirror 21 for reproducing the projected stereoscopic videos.

FIG. 5 schematically shows a stereoscopic video perceived by a person. In FIG. 5, depth positions 112 to 117 are arranged in order from a infinite direction 111, and an depth position 117 is arranged at the most protruding position (nearest to the eyes). FIG. 5 also shows a person 118 displayed on the depth position 115, a person 119 displayed on the depth position 114, a river 120 flowing from a distance, and a mountain 121 viewed at a distance FIG. 6 shows the video shown in FIG. 5 to which subtitles are added. FIG. 6 shows subtitles 122A to 122C displayed at the respective depth positions and subtitle depth ranges 123A to 123C.

Figure 7A:
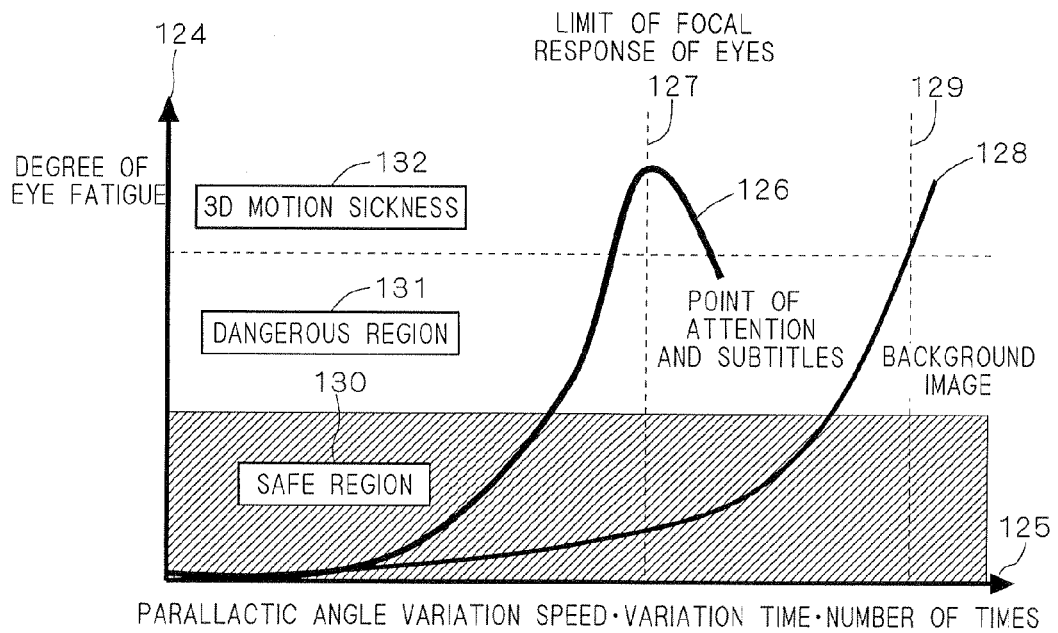
FIGS. 7A and 7B are diagrams used to illustrate the degree of eye fatigue according to the first embodiment of the present invention.
Figure 7B:
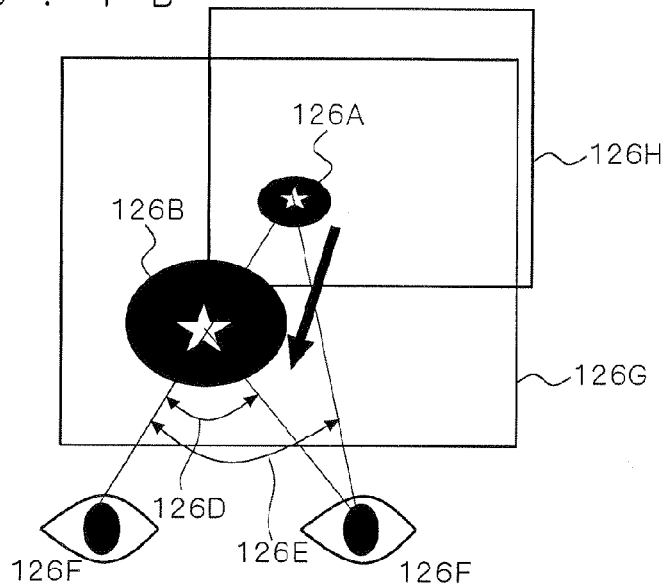

FIG. 7A and FIG. 7B show the degree of eye fatigue with respect to: acceleration of parallactic angle variation; a time taken for variation; and the number of times of variation. In FIG. 7A, the degree of eye fatigue 124 is adopted as a vertical axis, and a product 125 of angular variation acceleration and variation is adopted as a horizontal axis. FIG. 7A shows the degree of eye fatigue 126 about a point of attention and subtitles, a maximum-fatigue point 127 about the point of attention and subtitles, the degree of eye fatigue 128 about a background video, a limit 129 over which motion sickness is caused by the background video, a safe region 130 for human eyes, a dangerous region 131 for human eyes, and a region 132 in which human eyes suffer 3D motion sickness. FIG. 7B is a schematic diagram showing the parallactic movement of the eyes. FIG. 7B shows a far video 126A on which the point of attention is placed, a near video 126B to which the point of attention is placed, a vision line angle 126D where the point of attention is near, a vision line angle 126E where the point of attention is far away, human eyes 126F, a depth 126G at which the video 126B is displayed, and a depth 126H at which the video 126A is displayed.

Figure 8:
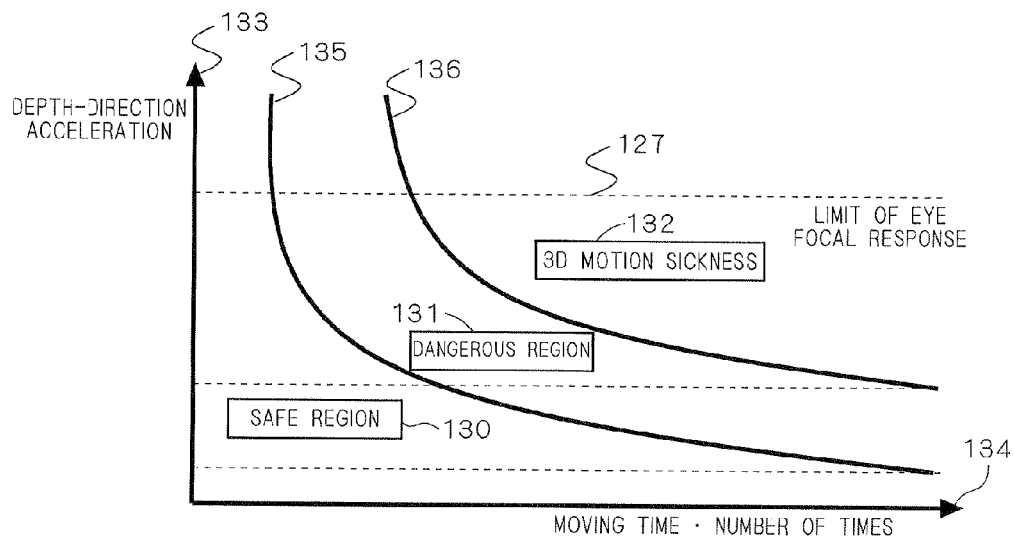
FIG. 8 is a diagram used to illustrate the degree of eye fatigue and depth-direction acceleration according to the first embodiment of the present invention.
Figure 9:
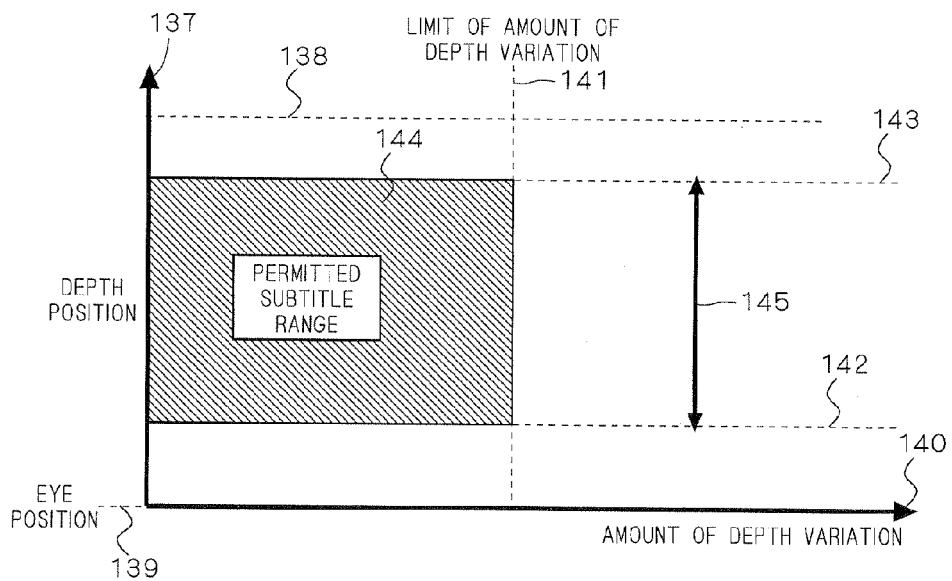
FIG. 9 is a diagram illustrating a range of display of subtitles according to the first embodiment of the present invention.

FIG. 8 is a graph showing relationship between an acceleration of the point of attention in the depth direction and the product of a moving time and the number of times. In the graph in FIG. 8, an acceleration 133 of the point of attention in the depth direction is adopted as a vertical axis, and a product 134 of the moving time and the number of times (the moving time multiplied by the number of times) is adopted as a horizontal axis. The graph of FIG. 8 shows a boundary 135 between the safe region 130 and the dangerous region 131, and a boundary 136 between the dangerous region 131 and the 3D motion sickness occurrence region 132. Further, FIG. 9 shows relationship between the amount of depth position variation and a depth position of subtitle displays. In FIG. 9, the depth position 137 is adopted as a vertical axis, and a depth variation amount 140 is adopted as a horizontal axis. FIG. 9 shows an infinite distance position 138, an eye position (closest to the viewer) 139, a limit 141 on the amount of depth variation, a depth limit 142 on the viewer-side (a limitation of protrusion), and a depth limit 143 on the far side.

As shown in FIG. 1 to FIG. 3, many of stereoscopic video systems using a TV and a projector generally make use of parallactic information of human eyes. In such stereoscopic video systems, video information is respectively projected onto right and left eyes through eyeglasses, so that the viewer perceives a stereoscopic video. In general, when videos are taken, two cameras are used to take videos that are input to the right and left eyes, which result in two streams. In such stereoscopic video systems, the right and left video information stored in the recording apparatus 6 is first input to a display apparatus such as a TV and a projector. At this occasion, when an analog method is used as information interface between the recording apparatus 6 and the display apparatus, it is necessary to separately transmit right and left information. However, when a digital interface such as HDMI is used, right and left information can be transmitted alternately as a serial transmission. Alternatively, the information may be compressed by the recording apparatus 6 side, and the compressed information may be transmitted to a TV side, so that the TV decompresses the information. By the way, when a television display is used, the right and left video information is displayed thereon in such a manner that the right and left videos are switched field by field. In this regard, a recently-available TV with a double-speed scan display can solve the problem of flickering that occurs when a reproduced video is separated field by field into right and left, thus achieving a smooth reproduction of stereoscopic videos.

As shown in FIG. 1, when the shutter 4 is arranged that is made of liquid crystal and the like and can switch two transmissive polarized lights, the shutter 4 can be controlled to switch field by field the polarizing angle of light, so that, for example the field video 5A passing through the shutter 4 is polarized vertically, and the video 5B is polarized horizontally. In this case, the eyeglasses 7A may be attached with polarizing plates, which are different for right and left (vertical polarization and horizontal polarization), and a cable 3B is not necessary. The cable 3B provides, from the display apparatus 3 to the eyeglasses 7A, a signal corresponding to the timing by which the display apparatus 3 controls the shutter 4 via a cable 3A. Alternatively, when the shutter 4 is not used, it is necessary to arrange a liquid crystal shutter on the eyeglasses 7A side, and the cable 3B, i.e., a field synchronization signal cable, is necessary. When the eyeglasses 7A side has the liquid crystal shutter, any polarization is not used. Therefore, even when, e.g., the user inclines his/her head to cause the angle of the eyeglasses to change, stereoscopic display is hardly affected.

In the method of FIG. 2, there are two display devices having PLD devices or a transmitting liquid crystal type, and different videos are displayed separately on right and left. In this case, the front surfaces of display apparatuses (A, B) 7, 8 are attached with polarizing plates 9, 10 having different polarizing directions. Accordingly, the lights emitted from the display light emitting sections have respectively different polarizations. When these lights are projected onto the display panel 12 via the optical system 11, the right eye can see, for example, the vertically-polarized video 5C, and the left eye can see the horizontally-polarized video 5D. In this case, the polarizing eyeglasses 7B are used to input parallactic video information into each eye.

In the method of FIG. 3, a polarization switching mechanism is arranged at a light-source section for emitting light to an optical devices such as PLD. The polarization switching mechanism has a synchronous rotating member 13 that rotates in synchronization with the timing of field display of the TV. In the method of FIG. 3, a light whose polarization is adjusted according to the timing of field display is input to the PLD device and the like. In this case, videos polarized differently for each field are projected onto the video display panel. When the viewer sees this with the polarizing eyeglasses 7 having the same method as that of FIG. 2, videos with parallax can be perceived by the eyes. Alternatively, there is another method as shown in FIG. 4 for reproducing a stereoscopic video by causing a plurality of display devices 15 to 19 to project videos taken from a plurality of angles. In this case, the number of stereoscopic video streams is not two. Instead, it is necessary to store and reproduce a plurality of streams.

In addition, the right and left videos may be perceived by the respective eyes as follows: the synchronous rotating member 13 rotating in synchronization with the timing of field display of the TV is made of optical filters that allow passage of only particular wavelengths of RGB; the half of the disk is used for the left eye, and the remaining half is used for the right eye; the wavelength of the light for the right eye and the wavelength of the light for the left eye are changed by shifting the wavelength of each of RGB; and the eyeglasses 7 are made of optical filters that respectively allow passage of only the wavelength for the right eye and the wavelength for the left eye. In this case, the shifts of right and left RGBs can be adjusted by color adjustment performed on the television display side, so that there is no disadvantage in color reproduction. Further, in the method for shifting the RGB wavelengths for right and left, the light from the eyeglasses 7 does not attenuate even when the eyeglasses are inclined.

In the method using the rotational mirror 21 of FIG. 4, the videos taken from the plurality of viewpoints are projected as the stereoscopic video onto the rotational mirror 21 by the display devices 15 to 19. Therefore, even when the viewer's viewpoint is changed, the actual stereoscopic video appears to be real (in an extreme case, the viewer can even see a section that could not be seen because the section is on the back side).

Subsequently, the actual stereoscopic video will be explained. Even in a case of video reproduction utilizing parallax, the human eyes perceive the video as shown in FIG. 5. In this case, when the depth from the infinite distance 111 in the depth position to the eye position 117 is expressed in an exploded manner, the videos are found to be displayed on depth planes from the depth position 112 to the depth position 115. For example, when a person, i.e., a point of attention, is close to the viewer, the person appears to be big and accordingly appears to be the person 118. When the person goes away from the viewer, the person appears to be the person 119. When, the river 121, i.e., background information, is closer to the viewer, the river 121 appears to be larger, and when the river 121 is away from the viewer, the river 121 appears to be smaller. The large mountain 121 appears to be big even though it is a background. For example, when subtitles are displayed on the stereoscopic video as shown in FIG. 5, they are shown as in FIG. 6. A subtitle 122A located close to the viewer goes away from the viewer little by little to be the subtitles 122B and 122C. In a case where the depth position of the person, i.e., the point of attention, is assumed to change between the persons 119A to 119C according to the scenes, the position of the subtitle is caused to change according to the position of the person, so that the movement of the eyes is reduced, and accordingly the eyes are less likely to be fatigued. Therefore, it is desirable to display the subtitle 122A in the scene of the person 119A, to display the subtitle 122B in the scene of the person 119B, and the subtitle 122C in the scene of the person 119C. This is because stereoscopic video, even though utilizing parallax, requires eye movements in accordance with the parallax, while conventional 2D video involves no movements of eye muscles in the focus direction because the depth position originally does not vary and the distance between the user and the TV corresponds to the focus of human eyes.

As shown in FIG. 7A, as a point of attention, e.g., a person appearing in the video, moves in the focal direction, eye fatigue occurs in proportion to the acceleration of parallactic angle variation, the time the variation takes, and the number of times that the variation occurs. Especially, a point of attention causes intensive eye fatigue because the eyes have to follow it, and it is thought that the fatigue reaches a peak before the speed of parallactic angle variation, the time of variation, and the number of times become too large. In particular, as shown in FIG. 7B, a near object involves a larger parallactic angle as shown by the viewing angle 126D, while a distant object involves a smaller parallactic angle as shown by the viewing angle 126E. Parallactic angle varies as the distance varies, and then both eyes 126F have to focus to the target at an appropriate angle, in order to follow the variation of parallactic angle caused by the variation of distance. Conventional TVs for displaying flat video do not provide images that vary in the distance direction, and therefore the parallactic angle required for eye perception in the depth direction always remains constant. However, stereoscopic video requires eye movements not only in a flat plane but also in the depth direction (with parallactic angle), resulting in an increased burden on the eyes. However, it is estimated that, when the video has movements faster than eye response, the degree of eye fatigue varies as shown by the curve 126, because the eyes cannot follow the movements and the fatigue decreases. Also, as to the background information, though the eyes originally do not follow it, it is estimated that the fatigue increases as the speed of parallactic angle variation, the time of variation, and the number of times increase as the distance varies. FIG. 8 illustrates this with a relation between the depth-direction acceleration and the product of moving time and the number of times. Even at lower depth-direction accelerations, a dangerous region exists and motion sickness occurs as the number of times and distance increase, but it is estimated that the fatigue does not occur below a certain level even when the product of moving time and number of times increases.

With respect to the degree of eye fatigue, larger-sized screens require increased eye movements in the plane direction and therefore cause increased eye fatigue. Two evaluation functions are possible accordingly, one with screen-size consideration and the other with no screen-size consideration. First, with an evaluation function 1, a value "a" at which the eyes' following movements can be ignored<parallactic angle variation speed of a point of attention<a range "b" of the eyes' following movements, and the evaluation value (the degree of eye fatigue) is proportional to the product of: parallactic angle variation speed; variation time; and the number of times. With an evaluation function 2, a value "a" at which the eyes' following movements can be ignored<parallactic angle variation speed of a point of attention<a range "b" of the eyes' following movements, and the evaluation value (the degree of eye fatigue) is proportional to the product of: parallactic angle variation speed; variation time; the number of times; and screen size. The evaluation function 2 is used when the TV screen size is detectable, and the evaluation function 1 is used when it is not detectable. In the second and following embodiments, the evaluation value (the degree of eye fatigue) is described as the degree of depth variation.

In the production of one piece of stereoscopic video, "the amount of variation of parallactic angle", "the time that the variation takes", and "the number of times that the variation occurs" are provided as evaluation factors for the stereoscopic video in that one piece of video content, and it is then possible to make stereoscopic video content by re-encoding it so that the value does not enter the dangerous region 131 of FIG. 7. Also, the degree of depth variation, i.e., an evaluation function, is described in the stereoscopic video content, and it is then possible to present the degree of eye fatigue before the user views the movie, so as to prompt the user to select between 2D reproduction and 3D reproduction. In this case, examples of the re-encoding include: a filming scheme in which parallactic images are filmed with cameras located at a reduced parallactic interval (the distance between the two cameras is reduced); an image-processing scheme in which parallax is reduced by pixel conversion processing using parallax information, as will be described later; and a scheme in which the amount of protrusion (the degree of three-dimensionality) is limited in the production of content by CG for animation etc.

As to the display of subtitles that the user necessarily has to read to understand the story of the movie or the like, it is necessary to place a limitation on the amount of depth-direction variation as shown in FIG. 9. This is because of the fact that, as shown in FIGS. 7 and 8, eye fatigue increases and 3D motion sickness is likely to occur when the eyes follow very fast in the focal direction. Also, it seems that a limitation should be placed also on the distant position of subtitles, because very distant subtitles cause an unnatural impression due to the subtitle size with respect to the background as shown in FIG. 6. A limitation will be necessary also on the near side close to the eyes. This is because positions very near to the eyes involve larger amounts of angular variations of the eyes due to the viewing angle, resulting in an increased degree of eye fatigue. Also, a larger amount of protrusion (in this sense, a representation that is seen as if it protruded very close to the viewer, for example) may "surprise" or "startle" the viewer. Also, it is desirable to place stricter limitations when the TV display has a larger screen, because the eyes have to move more busily in the plane direction, and also because the psychological effects like "surprising" and "startling" also increase. When the reproducing apparatus and the TV are connected in a linked manner, information about the TV screen size is exchanged with the reproducing apparatus, so as to increase the limitations on the range of protrusion of subtitles etc. When a plurality of streams with different amounts of protrusion are provided, the system may be configured such that a stream with a smaller amount of protrusion can be selected when the TV screen is larger, and a stream with a larger amount of protrusion can be selected when the TV screen is smaller, for example. Also, when the amount of protrusion can be varied by a setting on the equipment side, as will be described later, the setting may be automatically made by considering TV size information, the user's conditions (age etc.) and the like.

It is then possible to define stereoscopic video parental levels based on the above-described evaluation value and the maximum amount of protrusion that corresponds to the viewing angle, and then an age limit for viewing may be set, or a warning against danger may be given to elderly or sick people, according to the stereoscopic video parental level. For example, the stereoscopic video parental levels may include Level 1 indicating severe fatigue and danger, with the evaluation value (the degree of eye fatigue)>c, the amount of maximum protrusion>d, and the ordinary parental level being high. Level 2 would indicate relatively severe fatigue and danger, with the evaluation value (the degree of eye fatigue) >c, the amount of maximum protrusion>d, and the ordinary parental level being normal or lower, or with the evaluation value (the degree of eye fatigue)>e, the amount of maximum protrusion>f, and the ordinary parental level being high. Level 3 would indicate intermediate fatigue and danger, with the evaluation value (the degree of eye fatigue)>e, the amount of maximum protrusion>f, and the ordinary parental level being normal or lower. Level 4 would indicate no fatigue and no danger, with the evaluation value (the degree of eye fatigue)>g, the amount of maximum protrusion>h, and the ordinary parental level being normal or lower.

In the above-described example of stereoscopic video parental levels, there is a relation of c>e>g and a relation of d>f>h, and the ordinary parental levels (flat-video parental levels) indicate the restrictions on viewing for ensuring safety that are defined about horror movies and the like in existing 2D video DVDs etc. It will be useful when the setting of such stereoscopic video parental levels can be determined or changed at the time of purchase or at the time of initialization, and can be cancelled and changed at a later time by using an identification number etc.

Second Embodiment

Next, a second embodiment will be described referring to the drawings. When stereoscopic images utilizing parallax information, as shown in FIGS. 1 to 3, are intactly broadcasted on television, they are displayed like superimposed images. They cannot be viewed without a dedicated stereoscopic display apparatus constructed as described above. Thus, the broadcasting of stereoscopic video is limited by infrastructural facilities of equipment on the viewer side, and it is necessary to provide a dedicated channel that is not intended to be seen by people in general, or to superimpose a flag on the broadcasted information to indicate that it is 3D. Accordingly, it is generally convenient to distribute such stereoscopic video in the form of a recording medium, and to reproduce it with a dedicated player or with a player having this function. Considering such circumstances, methods and formats for storing stereoscopic video in a recording medium will now be described.

Figure 10:
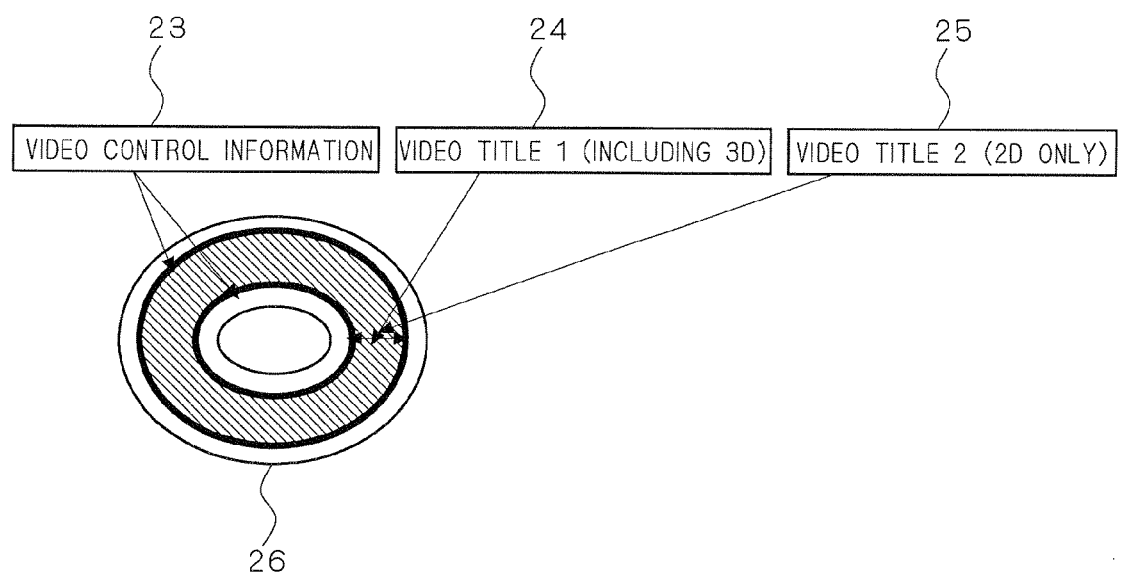
FIG. 10 is a diagram illustrating information recording regions on a recording medium according to a second embodiment of the present invention.

FIG. 10 shows a recording medium 26 according to the second embodiment. The recording media (video media) of this invention can be optical disk media, such as DVDs, BDs, HD-DVDs, MOs, etc., and can also be HDD media, of course. HDDs are usually not portable themselves, but are advantageous in terms of capacity when recording broadcasted stereoscopic video information. On the other hand, optical disk media, such as ROM media, are advantageous for the distribution of stereoscopic killer content before broadcasted or for the distribution of chargeable stereoscopic content. The disklike recording medium 26 shown in FIG. 10 is divided into a region that stores control information about the video information (video control information 23), a region that stores a stereoscopic video (a video title 24), and a region that stores an ordinary 2D video (a video title 25).

Figure 11:
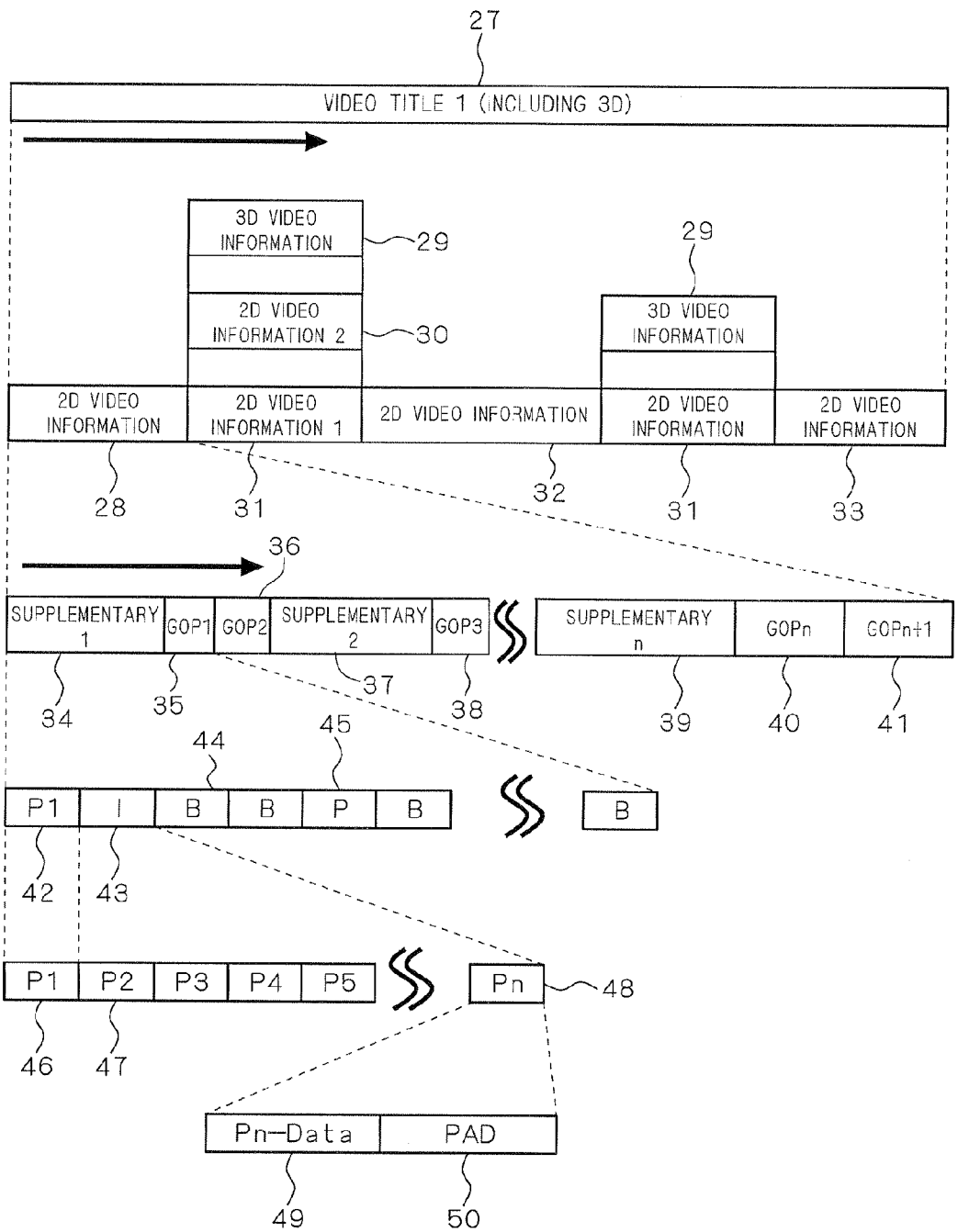
FIG. 11 is a diagram illustrating the structure of a video stream of a video title according to the second embodiment of the present invention.

FIG. 11 is a diagram showing an exemplary structure of the video stream in the region of the video title (video content) 24 of FIG. 10. The video title 27 shown in FIG. 11 includes 2D video information 28, user-selectable 2D video information 30 and 31, 3D video information 29 that is automatically selected or user-selected when the display apparatus is capable of displaying stereoscopic images, 2D video information 32 that is reproduced following the video information 29 to 31, and 2D video information 33 provided at the end of the video title 27. FIG. 11 also shows GOP-layer stream information including a supplementary information region 34 that is located at the head of the following GOP video information 35 and 36 and that describes supplementary information related to the GOP video information, a supplementary information region 37 that is located at the head of GOP video information 38 and that describes supplementary information related to the GOP video information, and a supplementary information region 39 that is located at the head of GOP video information 40 and 41 and that describes supplementary information related to the GOP video information.

FIG. 11 also shows picture-layer stream information including a packet data portion 42 that describes supplementary information, I picture data 43 composed of intra-encoded data, a B picture 44 as encoded data predicted from the I picture data 43 and a P picture 45 in the temporal direction, and the P picture 45 as encoded data predicted from the I picture data 43 only in one temporal direction. FIG. 11 also shows a transport packet data layer including a packet 46 as a transport packet data portion that describes supplementary information and that is identical to the packet data portion 42, a first packet 47 carrying the I picture data 43 divided into transport packets, a transport packet 48 storing the last data piece of the I picture data 43, a last portion 49 of the I picture data in the transport packet 48, and a padded portion 50 in the transport packet 48.

Figure 12:
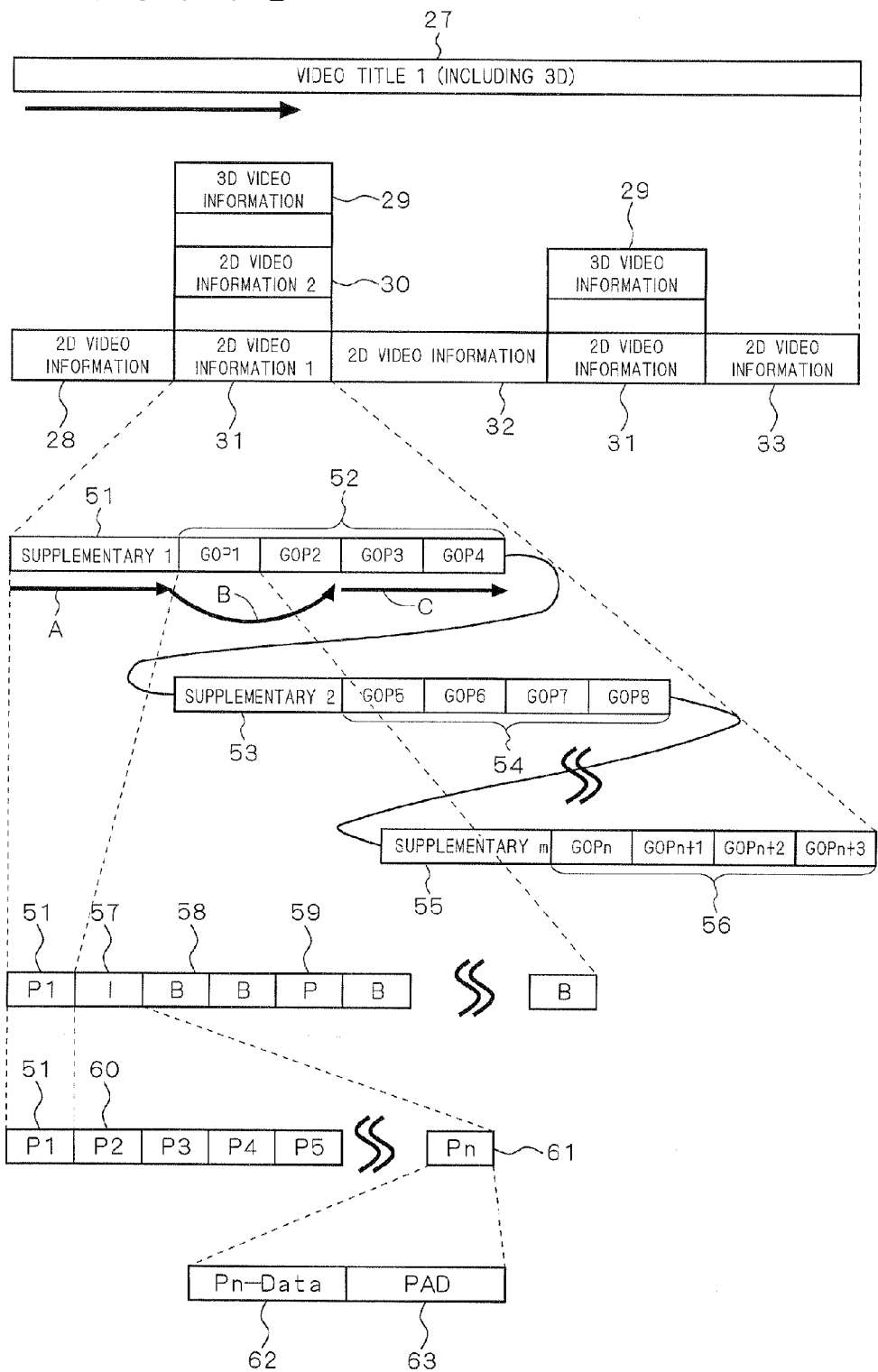
FIG. 12 is a diagram illustrating the structure of the video stream of the video title according to the second embodiment of the present invention.

FIG. 12 illustrates the hierarchical data structure of the region of the video title (video content) 27 where a selection can be made among the 3D video information 29 and the 2D video information 30 and 31. FIG. 12 shows supplementary information 51 that is located at the head of the region where the 3D video information 29 and 2D video information 30 and 31 are selectable and that stores information related to the video sequence, a GOP video information sequence 52 in this region, supplementary information 53 that stores information related to a GOP video information sequence 54, and supplementary information 55 that stores information related to the GOP video information sequence 56 at the last of this region. FIG. 12 also shows picture layer stream information including I picture data 57 composed of intra-encoded data, a B picture 58 as encoded data that is predicted from the I picture data 57 and a P picture 59 in the temporal direction, and the P picture 59 as encoded data that is predicted from the I picture data 57 only in one temporal direction.

Figure 13:
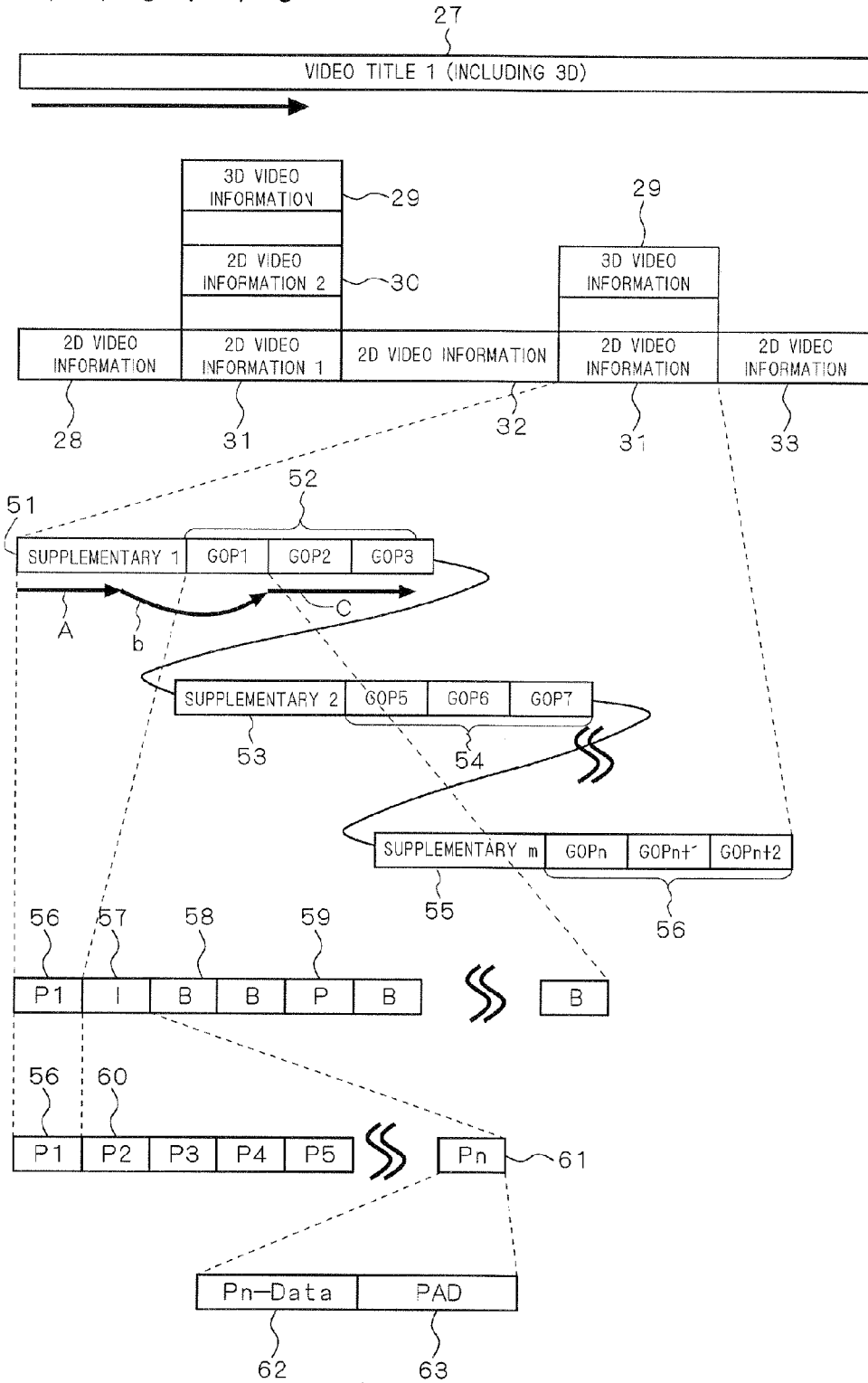
FIG. 13 is a diagram illustrating the structure of the video stream of the video title according to the second embodiment of the present invention.

FIG. 12 also shows a transport packet data layer including a first packet 60 carrying the I picture data 57 divided into transport packets, a transport packet 61 storing the last data piece of the I picture data 57, a last portion 62 of the I picture data in the transport packet 61, and a padded portion 63 in the transport packet 61. Also, in FIG. 12, the arrow A indicates a reproduced portion, the arrow B indicates a portion that is skipped when 3D reproduction is performed, and the arrow C indicates a portion that is reproduced for 3D reproduction, where right-eye GOP video information and left-eye GOP video information are provided. FIG. 13 illustrates the hierarchical data structure of the region of the video title 27 where a selection can be made between the 3D video information 29 and the 2D video information 31. This structure is basically the same as that of FIG. 12, and therefore like components are designated by like reference characters and not described again here.

Now, as shown in FIG. 10, the structure of data recorded in an optical disk or HDD medium includes a region for the video control information 23 for recording video-related supplementary information, sequences, etc., and a region for actual video titles (video content) 24, 25. In this case, 3D video is not always totally 3D from the beginning to the end, but it may be a mixture of 3D and 2D, or such video streams may be switchable by user selection. In particular, DVD standards allow for display of user-selectable and switchable video information streams, such as multi-angle, and 3D video information is produced by supplementaryly constructing a 3D video stream on a 2D video stream, since users' facilities are not always 3D-compatible. When a user's display equipment is compatible with 3D, it may be automatically recognized, e.g., by the link function of HDMI terminal, and a 3D video stream may be displayed selectively, or the user may operate a button to select and display 3D video. Needless to say, some content may be totally 2D or 3D, but consideration should be given to such composite formats.

It is desired that supplementary information regions about the video information stream of the video title 24 be provided also on the video information stream, so as to allow access to the information, management of the information, switching of settings of equipment, etc. In particular, when content includes a mixture of 2D and 3D video streams, it is necessary on the TV side to detect whether the video stream is 2D or 3D. When supplementary information regions are provided on the stream, the settings on the TV side can be readily and automatically changed on the basis of the information. When a player/recorder for reproducing/recording a recording medium controls all settings in a closed manner, it will be satisfactory to describe the control information only in the video control information 23 where the control information is collectively recorded in a part of the disk. However, when it is connected to a TV, especially when the TV is switched in the course of reproduction, superimposing necessary minimum control information on the video information itself allows the settings on the TV side to be automatically switched. When such control information is absent in the video information, the procedure requires detecting the switching of TV, separately sending control information from the player/recorder, changing the settings on the TV side, and then sending the video information. Needless to say, as to the change of settings on the TV side, it is necessary to provide a mechanism for quickly changing the settings of the display apparatus, since the stereoscopic video reproduction processing itself, like the switching of polarized light, is conducted on the display apparatus side.

The supplementary information 51 can be used also for access and management of information, and it has become established as Navi information in DVD standards. When both 2D video and 3D video exist in a mixed manner, they exist in parallel in the time sequence of the content, as shown by the 3D video information 29 and 2D video information 30 and 31 in FIG. 11. Accordingly, the first supplementary information 34 should be located at the head of the GOP data information group. Then, by reading the contents of the supplementary information first, it is possible to know whether the information of the next GOP sequence is 2D or 3D, and if it is 3D, it is possible to know whether it is for the left eye or for the right eye, and to know their locations in the GOP video information group (where to access). The GOP video information group having the supplementary information 51 at the head is defined as a video unit that is larger than the GOP video information.

In the case of video information data that is compressed also in the temporal direction, such as MPEG, the information exists in units of GOP information having an I picture at the beginning, and therefore access to the video data has to be made in units of GOP video information. Also, the supplementary information, which has to be read in the first place, should be located at the head of the GOP video information group. For example, when a 3D video information portion is reproduced as shown in FIG. 12, the supplementary information 51 is reproduced first (the arrow A in the diagram), and the 2D video information 30 and 31 are skipped, and then the 3D video information 29 is reproduced. In this way, the 2D video information 30 and 31 are skipped as shown by the arrow B so that the memory of the reproducing equipment does not capture unnecessary information (the 2D video information 30 and 31 in this case) and an increase of unwanted storage is avoided, and then the 3D video information 29 is reproduced as shown by the arrow C without interruption of video.

At the picture layer underneath, the supplementary information 51 at the beginning of GOP video information is located before the I picture 57. Also, in the lowermost-layer data, the compressed video data is divided into transport packets 60, 61 as shown in FIG. 12, since dividing compressed video data into transport packets is convenient to provide compatibility with digital broadcasts such as groundwave, satellite, and cable digital broadcasts. In this case, too, the supplementary information 51 is described in the transport packet at the head of the GOP video information group 52. Needless to say, a private packet that has been newly defined for transport packets is used. In the transport packet 61 at the end of the I picture 57, the data does not always end to fit the fixed transport packet unit, and so it is preferable to pad the last portion 63 with "00" or "FF" so that the packet data completes to fit the GOP video information unit. When the sequence branches out into two streams including one 2D video stream 31 and one 3D video stream 29 as shown in FIG. 13, the arrow B skips a smaller amount of GOP video information than in FIG. 12, but the operation is basically the same as that shown in FIG. 11.

The contents of the supplementary information will be described in more detail. The supplementary information 51 shown in FIG. 14 includes content information 64, time code 65, arrangement information 66, information 67 about video information, information 68 about audio information, and information 69 about OSD information. The content information 64 shown in FIG. 14 includes content name 70, copyright 71, encryption information 72, presence/absence of 3D images 73, and available region information 74.

Figure 15:
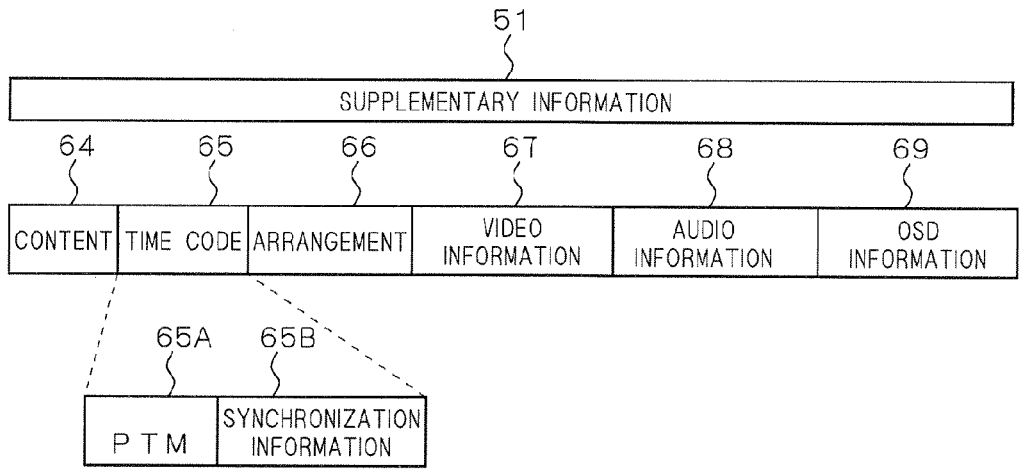
FIG. 15 is a diagram illustrating time code information in the supplementary information according to the second embodiment of the present invention.

The time code information region 65 shown in FIG. 15 includes presentation time 65A and synchronization information 65B. The arrangement information 66 shown in FIG. 16 includes seamless information 75, jump destination information 76, angle information 77, and in-GOP arrangement information 78. The video information 67 shown in FIG. 17 includes resolution information 79, frame rate information 80, 3D video information 81, parental information 82, angle information 83, encryption information 84, information 85 about a 3D video scheme and presence/absence, 3D video frame rate information 86, the number of 3D video information 87, information 88 about depth resolution, information 89 about the degree of depth variation, information 90 about permitted subtitle depth, information 100 about depth limitations, and information 101 about parallax limitations.

Figure 14:
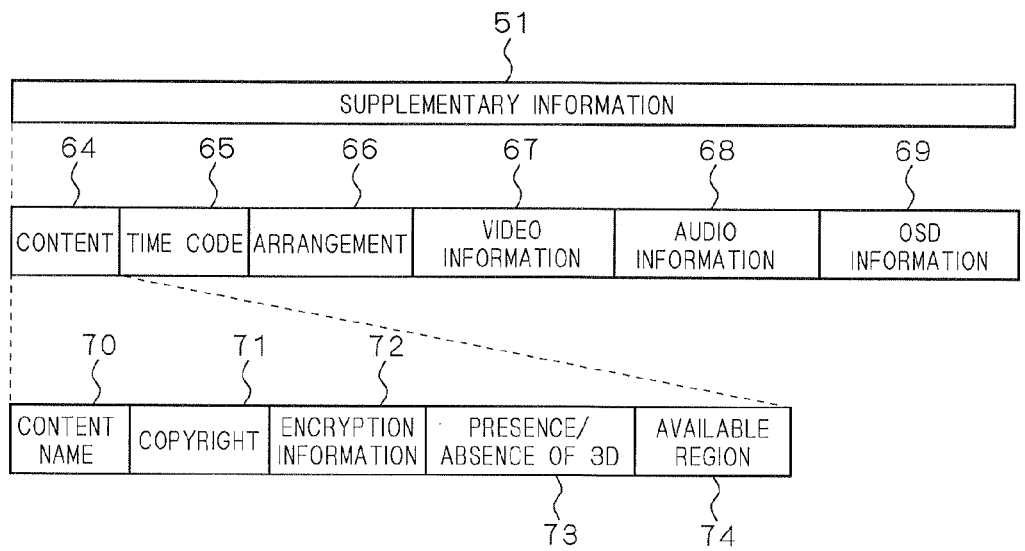
FIG. 14 is a diagram illustrating content information in the supplementary information according to the second embodiment of the present invention.
Figure 19A:
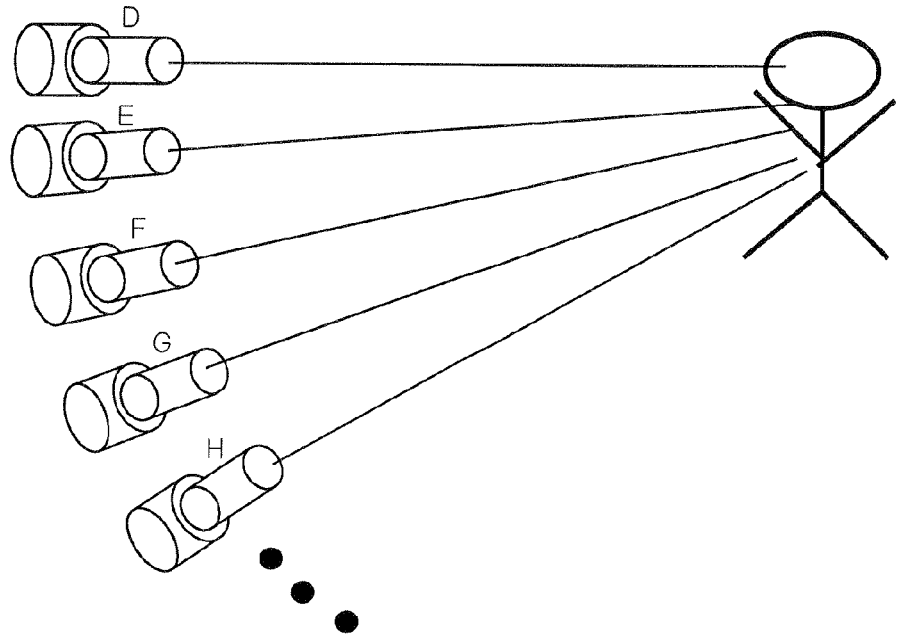
FIGS. 19A and 19B are schematic diagrams used to illustrate multi-angle information according to the second embodiment of the present invention.
Figure 19B:
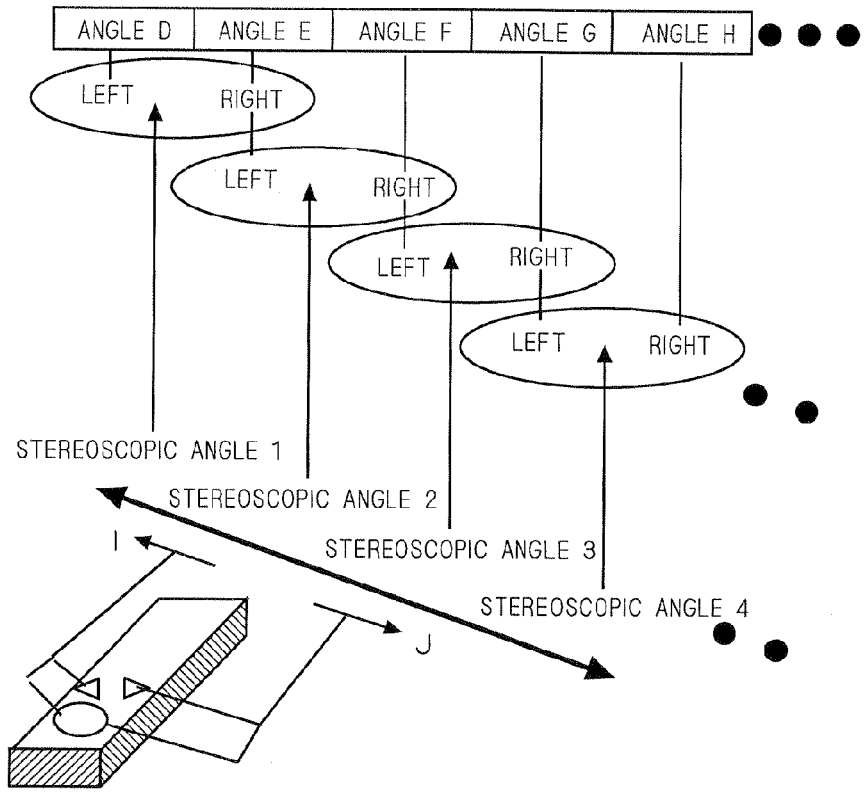

FIG. 18 is a schematic diagram illustrating display of the supplementary information on a TV as a display apparatus. FIGS. 19A and 19B are schematic diagrams illustrating a multi-angle filming with a plurality of cameras. The OSD information 69 shown in FIG. 20 includes OSD arrangement information 69A, OSD storage arrangement information 69B, font and character size designation 69C, in-plane OSD arrangement information 69D, depth-direction OSD arrangement information 69E, depth position 69F, permitted-depth limitation 69G, and depth zooming speed 69H Now, the supplementary information 51 shown in FIG. 14 is first described for each GOP video information group on the stream, and it is sent together with the video information in HDMI transmission to a TV etc. Accordingly, needless to say, it includes information necessary for settings on the TV side, especially about 3D video display.

Next, the content information 64 shown in FIG. 14 will be described. The content name information 70 may be displayed as OSD information on the TV side, including (1) content name, (2) cast, (3) time of production, (4) distributor, (5) names of relevant works, and (6) summarized story. When the supplementary information 51 superimposed on the video stream is included, it is possible to display the contents of the content name information 70 even when the input on the TV side is switched to 3D video information in midstream.

The copyright information 71 shown in FIG. 14 describes (7) copyright owner, (8) distributor, (9) importer, and (10) capital participant, whereby the information about the copyright owner of the video stream can be distributed at the same time, allowing the copyright owner to claim against illegal use of the reproduced data. Also, since this information is superimposed on the video stream, it is always distributed to the TV side and the copyright information can be displayed even when the TV is changed.

The encryption information 72 shown in FIG. 14 includes (11) presence/absence of encryption and (12) encryption scheme, whereby the destination equipment can be informed whether the information is encrypted and requires a high level of security, or the information requires no security, like commercials.

The 3D video information 73 shown in FIG. 14 describes (13) whether ready for 3D, (14) whether ready for totally 2D display (whether it can be reproduced to the end only with 2D video display), and (15) when 3D-ready, whether 3D video reproduction has priority, whereby information can be displayed to the user of a 3D-incompatible TV to let the user know that the user TV is 3D-incompatible. Also, when link-connected with a TV by HDMI, it is possible to automatically switch the TV side to 3D (for example, to automatically display two video streams field by field as shown in FIGS. 1 to 3). When the TV side does not have a 3D video function, measures can be taken by indicating, on the TV or reproducing apparatus side, that the TV is incompatible, or by ejecting the disk, for example.

The available region 74 shown in FIG. 14 can describe (16) a 2D video reproduction permitted region and (17) a 3D video reproduction permitted region, whereby it is possible to permit the reproduction of this disk only in a limited region, and also to permit 2D only and permit 3D compatible display only in a limited region. This is because, in some cases, 2D video reproduction only is permitted in a particular region when the conditions for license about 3D video reproduction are not established. In a region where 3D video reproduction is not permitted, measures can be taken by allowing even a 3D video display apparatus to reproduce 2D video only, or by ejecting the disk, for example.

Next, the time code information 65 shown in FIG. 15 will be described. With video content that contains a mixture of 2D and 3D, even when the user gives an instruction for switching in midstream (from 3D to 2D, for example), it is necessary to continuously reproduce the video information without interruption or omission. Also, the user may give an instruction for a time search to move forward or backward, e.g., to 10 minutes before. It is therefore necessary to record the presentation time 65A at the beginning of the GOP video information group, so as to provide reproduction time information from the start of the video title. It is possible to display the remaining time on the TV side, by recording information about the remaining time to the end of the reproduction of the title, or the total title reproduction time.

Also, 3D video is likely to cause eye fatigue etc., as described in the first embodiment. Accordingly, it is possible to give an instruction to take a break to prevent eye fatigue, or to warn about the danger, by displaying a time code from the start of 3D video reproduction (how long 3D video has been viewed continuously), or by displaying how long 3D video has been viewed in total in this video content. Also, when there are right-eye and left-eye GOP video information for 3D, it is possible to make field designation corresponding to the order of reproduction. That is, the presentation time 65A describes (18) a time code from the start of the title (presentation time), (19) information about the remaining time to the end of the reproduction of the title, or a total title reproduction time, (20) a time code from the start of 3D video reproduction (3D presentation time), (23) total 3D reproduction time, and (24) the order of reproduction of right-eye and left-eye videos or field designation. The synchronization information 65B defines the synchronization of the video content, by the order of reproduction of right and left images or by field designation.

Next, the arrangement information 66 shown in FIG. 16 will described. In particular, when video content includes both 2D and 3D contents in a mixed manner, it is necessary to describe arrangement information about GOP video information groups, in order to skip information unnecessary for reproduction or to move to the beginning of required data. Also, in the case of special reproduction operation, it is necessary to consider the requirement that access has to be first made to an intra-compressed picture, because of the characteristics of temporally-compressed video, such as MPEG. Accordingly, the seamless information 75 records (25) absence/presence of seamless reproduction (to the next GOP video information group). Also, the jump destination information 76 records (26) jump destinations' (forward and backward) address 1, address 2, etc., (27) jump destinations' time code information 1, time code information 2, etc. (having multiple pieces of jump destination information as table information), and (28) presence/absence of 3D video information at jump destinations. When the information of (28) presence/absence of 3D video information at jump destinations indicates the absence of 3D video information at the jump destination, the setting of the TV can be returned to 2D during the reproduction of the stream.

The angle information 77 records (29) GOP video information address 1, address 2, etc., that correspond to a plurality of angles, and (30) time code information 1, time code information 2 etc., about the GOP video information corresponding to a plurality of angles. The in-GOP arrangement information 78 records (31) address information 1, address information 2 etc., as arrangement information about P pictures in each GOP. Thus, the presence of the seamless information 75 enables sequential reproduction by connecting necessary angles, and the arrangement information in GOPs enables fast forward and fast reverse reproduction by reproducing I pictures only or I and P pictures only.

Next, the video information 67 shown in FIG. 17 will be described. In the video information 67, the pieces of information shown below are especially necessary as stereoscopic video information. First, the resolution information 79 records (32) a resolution of 2D video reproduction (in-plane direction), a resolution of P in P images (in-plane direction), and (33) a resolution of 3D reproduction (in-plane direction). The 3D video presence/absence and scheme 85 records (34) presence/absence of 3D and (35) designation about the 3D video scheme (scan-doubling rate designation, presence/absence of the use of polarizing eyeglasses, presence/absence of the use of a liquid-crystal shutter mechanism). The 3D frame rate 86 records (36) a 2D video reproduction frame rate and a 3D video reproduction frame rate.

The number of 3D video information 87 records (37) the number of independent 3D video information streams that are reproduced in parallel. When there are n different angles, it is described as n=angle number. On the basis of this information, the number of angles is displayed during reproduction, and it is possible to switch the angle by user selection, and to recognize the angle numbers through display. The number of 3D video information 87 also records (38) the number of video streams and camera information about right and left images that are sequentially switched. For example, as shown in FIG. 19A, when images are taken by using cameras D to H having five shifted parallaxes, or when an animation is recorded by CG as five pieces of parallactic video information, this number and the intervals between the cameras or their angles are described. For example, the supplementary information is described as "general information—the number of video streams is five—the camera interval is ** mm", "camera D's image 1—angle 1", "camera E's image 2—angle 2", "camera F's image 3—angle 3", "camera G's image 4—angle 4", and "camera H's image 5—angle 5".

When there are five video streams with shifted parallaxes, it is possible, as shown in FIG. 19B, to reproduce four stereoscopic angle video streams with slightly different angles with the five pieces of parallactic video information, with the angle D as the left image of the image 1 and the right image of the image 2, the angle E as the left image of the image 2 and the right image of the image 3, the angle F as the left image of the image 3 and the right image of the image 4, and the angle G as the left image of the image 4 and the right image of the image 5. It is also possible to rotate images by sequentially shifting the angle information. Thus, one video stream does not indicate one angle information, but new angle information can be constructed by combining images having adjacent parallactic angles. In recent years, with the progress of CG techniques, it is easy to produce stereoscopic images in animation, and the point of view can be changed by shifting the angle, by preparing parallactic information of multiple angles and accessing the information according to the user's indication from a remote controller.

The depth resolution 88 records (39) 3D video depth resolution 1, resolution 2, etc. When there are a plurality of 3D video streams, it describes a plurality of depth-direction resolutions. For example, in CG video, when the depth resolution is extremely low and the image does not move smoothly in time, the depth can be complemented in the temporal direction on the basis of this information so as to produce smooth display. The degree of depth variation 89 records (40) the degree of 3D video depth variation 1, the degree of variation 2, etc. When there are a plurality of 3D video streams, a plurality of depth-direction variation degrees are described. In particular, the degree of variation is closely related to the fatigue of human eyes as described in the first embodiment, and it is recorded to ensure safety, and can be utilized to give a warning to the user, or to instruct the user to take a break, for example.

The permitted subtitle depth 90 records (41) the range of permitted subtitle depths (maximum viewing angle 1, minimum viewing angle 1, maximum viewing angle 2, minimum viewing angle 2, etc.). When there are a plurality of 3D video streams, a plurality of depth-direction variation degrees are described. Subtitle information is likely to affect eye fatigue, because the focus must be frequently adjusted alternately to the subtitles' focus position and the point of attention during the viewing of stereoscopic video as described later, and it is therefore necessary to sufficiently limit the range of display. Also, when the depth information is described in terms of real distance, it is difficult to represent it in numerical form because the far side is at an infinite distance, and therefore it is desirable to describe it in terms of viewing angle information. Also, it has no meaning to represent near-infinite distances with detailed numerals, and therefore a lower limit may be set, e.g., by omitting viewing angles of 1 degree or less. The player sets the depth positions of subtitles in OSD display on the basis of these pieces of information.

The depth limitation 100 records (42) depth limitation (maximum viewing angle 1, maximum viewing angle 2, etc.). When a stereoscopic image protrudes or moves extremely forward, it will cause a psychological impression like "surprising". Accordingly, the amount of protrusion of stereoscopic images, not of subtitles, is limited, so that the images are soft for the eyes or so that the images will not surprise the viewer too much. In this case, in the player, viewing angles corresponding to the maximum amounts of protrusion are previously recorded in the video content as shown in FIG. 17, making it possible, as shown in FIG. 18, to give a warning to young children, or to indicate restrictions on the viewing.

The parallax limitation 101 describes (43) limitations of the amount of parallax (for filming, maximum viewing angle 1, minimum viewing angle 1, maximum viewing angle 2, minimum viewing angle 2, etc.). When there are a plurality of 3D video streams, a plurality of depth-direction variation degrees are described. This information corresponds to the distance between two cameras during filming. The amount of reference parallax differs depending on the interval between human eyes, and this information defines the range of reference angles. It is thus possible to previously grasp the degree of discomfort that a small child, having a short interval between the eyes, would feel when viewing the video.

Thus, it is possible to alleviate discomfort by preparing video content that contains a plurality of stereoscopic video streams with different reference parallax values so that a selection can be made on the basis of the interval between the viewer's eyes. In animation and the like, recent innovative CG techniques are capable of easily changing the reference parallax value with a computer. In this case, such parallax value limitation information is described in the supplementary information, whereby the player can provide select buttons, e.g., indicating " (age)", " (age)", and "adult", as shown in FIG. 18, and then a selection can be made with the buttons so that the reference parallax value of the original video content can be adapted to the viewer to present proper stereoscopic viewing. It is also possible to avoid eye fatigue etc., that would be caused by the viewing of video with improper parallax for a long time. Also, the parental 82 defines a stereoscopic video parental level for 3D viewing, as well as an ordinary flat-video 2D parental level. The parental 82 records (44A) a flat video parental level (a parental level like those defined for existing DVDs) and (44B) a stereoscopic video parental level (a stereoscopic video parental level as described in the first embodiment).

As shown in FIG. 20, the OSD information 69 records, first, arrangement information 69A as supplementary information about the OSD itself, and OSD information storage location 69B describing addresses where the information about the OSD itself is stored. With the OSD display 69, the supplementary information is first captured and understood by a microcomputer etc., and then the actual OSD is obtained and displayed on the basis of the storage arrangement information.

The information 69C about character size etc., records (45) character font, character size. The in-plane arrangement information 69D records (46) character arrangement information (X position, Y position).

The depth-direction OSD arrangement information 69E records (47) depth position 69F, (48) permitted-depth limitation 69G (limitations for alleviating eye fatigue as described in the first embodiment, such as a far-side limit position, a near-side limit position, a limitation on the amount of depth variation, etc.), and (49) depth zooming speed 69H (presence/absence of zooming, zooming speed). The depth zooming speed 69H defines zooming to alleviate eye fatigue, by gradually zooming from a certain subtitle to the next subtitle, instead of instantaneously varying the depth position.

The above-described pieces of supplementary information from (1) to (43) about 3D video information are superimposed on the video information stream and distributed together with the video information, and similar descriptions can be recorded also in the video control information 23 in a region separate from the video information itself, as described below. This allows all information to be read at the time when the player is started, and thus enables various initializations to be made. This also enables descriptions of more detailed control information, since a larger amount of information can be described regardless of bit rate and memory limit, than when it is superimposed on the video information.

Figure 21:
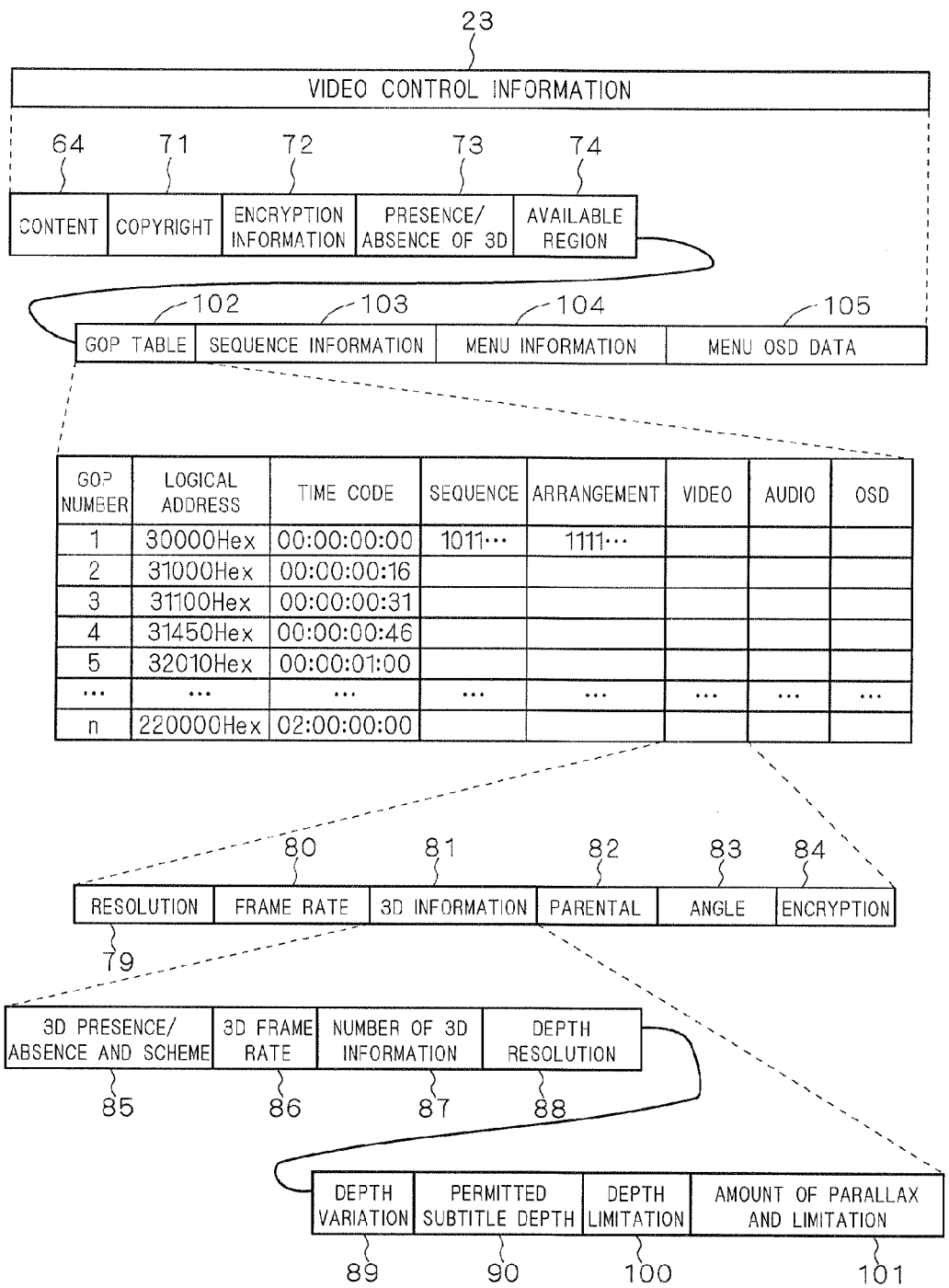
FIG. 21 is a diagram illustrating GOP table information in video control information according to the second embodiment of the present invention.

Next, the structure of control information recorded in a certain region on the recording medium separately from the video information will be described. FIG. 21 is a diagram illustrating the details of a GOP table portion of collectively recorded video control information 23, and FIG. 21 also shows the video-related information recorded therein. The video control information 23 shown in FIG. 21 includes content information 64, copyright 71, encryption information 72, presence/absence of 3D images 73, available region information 74, GOP table information 102, sequence information 103, menu information 104, and menu OSD data 105. The GOP table information 102 is described in the form of a table as shown in FIG. 21, having sections for GOP number, logical address, time code, sequence, location, video, audio and OSD.

In particular, FIG. 21 shows the structure of the video section, which includes resolution information 79, frame rate information 80, 3D video information 81, parental information 82, angle information 83, and encryption information 84. FIG. 21 also shows that the 3D video information 81 includes 3D scheme and presence/absence information 85, 3D video frame rate information 86, the number of 3D video information 87, depth resolution information 88, depth variation degree information 89, permitted subtitle depth information 90, depth limitation information 100, and parallax limitation information 101.

Figure 22:
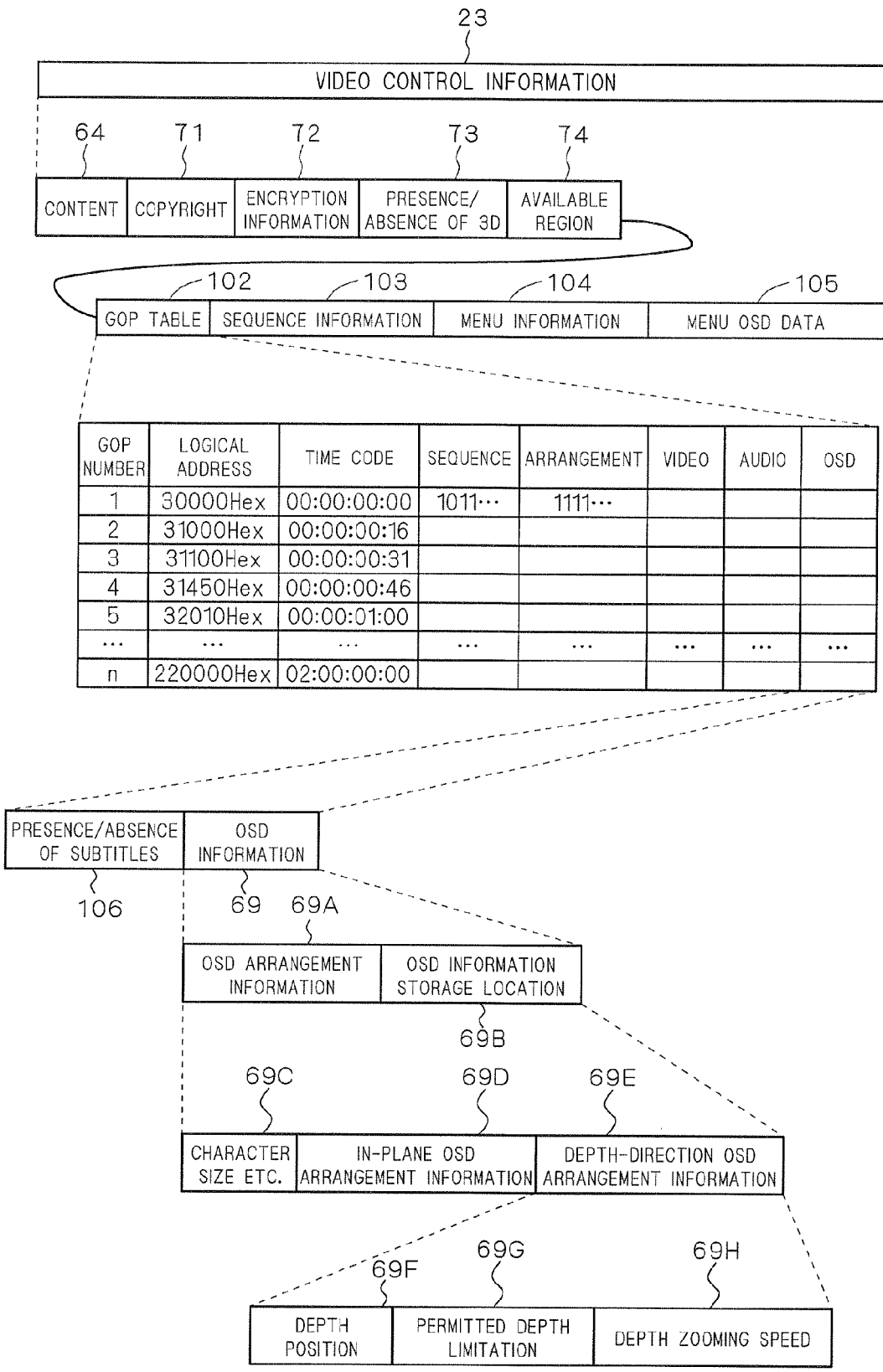
FIG. 22 is a diagram illustrating the GOP table information and OSD information in the video control information according to the second embodiment of the present invention.

FIG. 22 is also a diagram illustrating the GOP table portion of the collectively recorded video control information 23, and FIG. 22 shows the details of the video-related information recorded therein. In particular, FIG. 22 shows the structure of the OSD section, including presence/absence of subtitles 106 and OSD information 69. The OSD information 69 includes OSD arrangement information 69A and OSD storage arrangement information 69B, where the OSD arrangement information 69A includes font and character size designation 69C, in-plane OSD arrangement information 69D, and depth-direction OSD arrangement information 69E, and the depth-direction OSD arrangement information 69E includes depth position 69F, permitted-depth limitation 69G, and depth zooming speed 69H.

Figure 23:
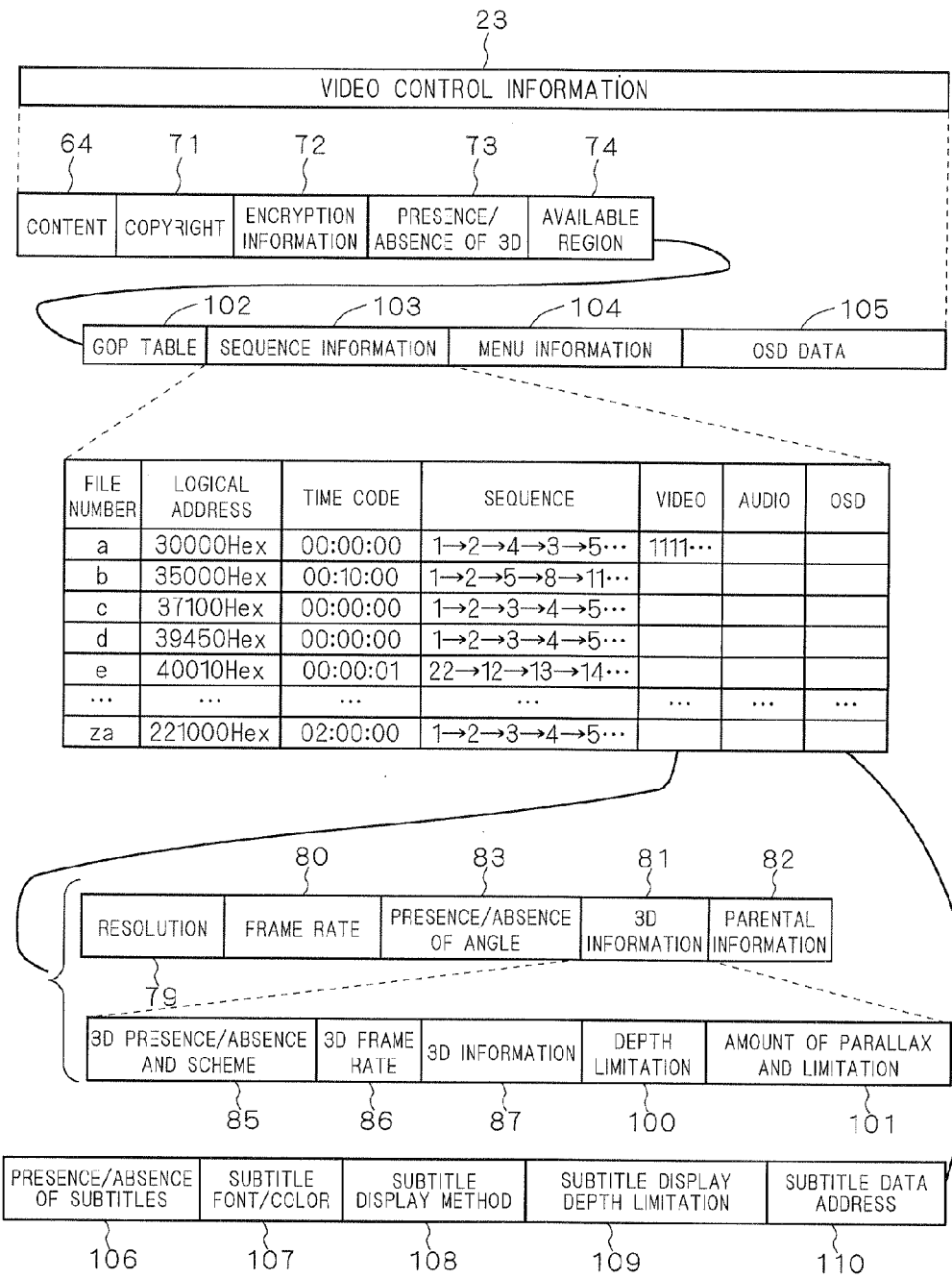
FIG. 23 is a diagram illustrating sequence information, OSD information, and video attribute information in the video control information according to the second embodiment of the present invention.

FIG. 23 illustrates the structure of the sequence information in the video control information collectively recorded in a region of the recording medium separately from the video information, and FIG. 23 illustrates that the sequence information 103 is recorded in the form of a table. The video section of FIG. 23 includes resolution information 79, frame rate information 80, angle information 83, 3D video information 81, and parental information 82. The 3D video information 81 includes 3D video scheme and absence/presence information 85, 3D video frame rate information 86, the number of 3D video information 87, depth limitation information 100, and parallax limitation information 101. The OSD section of FIG. 23 records presence/absence of subtitles 106, subtitle font, color 107, subtitle display scheme 108, subtitle depth limitation 109, and subtitle data address 110. The control information located in a certain region of the recording medium separately from the video information describes all information including the supplementary information 34 and 51 that are superimposed on the video information stream. By this, the control information is read first when the player/recorder is started so that various initializations can be made.

First, the video control information 23 is described as shown in FIG. 21. Like the supplementary information 51 superimposed in the video information of FIG. 14, it includes content information 64, time code 65, arrangement information 66, information 67 about video information, information 68 about audio information, and information 69 about OSD information. However, in the video control information 23 where a larger amount of information can be stored, it is possible to describe table information about all GOPs, like the GOP table 102, and so the contents of the information can be grasped in units of GOP video information without reproducing the video. The GOP table 102 is described like the table of FIG. 21, including logical addresses, and so data file identification information can be detected from a signal read from a given sector region, by utilizing the logical addresses. Then, on the basis of the detected data file identification information, the position of a data file recorded on the disk medium is identified. The data file corresponds to an encoded unit located at the position indicated by the position identification signal. Then, the data file is read on the basis of the identified position on the disk medium, and the video signal encoded in the unit in the read data file is decoded, and can thus be reproduced. Thus, for reproduction, the position where a certain video signal encoded in the unit is recorded can be readily and instantaneously specified at a desired point of time.

The supplementary information about video in the GOP table 102 includes 3D video information, and the same items as the items (32) to (43) described in the video stream can be described for each piece of GOP video information. Also, as shown in FIG. 23, the subtitle information describes the presence/absence of subtitles 106, subtitle font, color 107, subtitle display scheme 108, subtitle depth limitation 109, and subtitle data address 110, and thus the same information as the information (44) to (49) can be described as supplementary information about subtitles for each piece of GOP video information.

Also, as shown in FIG. 23, the video control information 23 can also describe sequence information for each piece of GOP video information. Thus, at the start of reproduction, a sector address is generated about a certain sector region where information about the order of data file reproduction is recorded, and the reproduction order information is read from the data read by data reading means, so as to detect the reproduction order information, and then the order of sector addresses are generated on the basis of the reproduction order information. It is thus possible to reproduce video signals recorded in sectors that are distributed on the recording medium. The sequence table information can also describe the supplementary information shown as (32) to (49).

Third Embodiment

Figure 24:
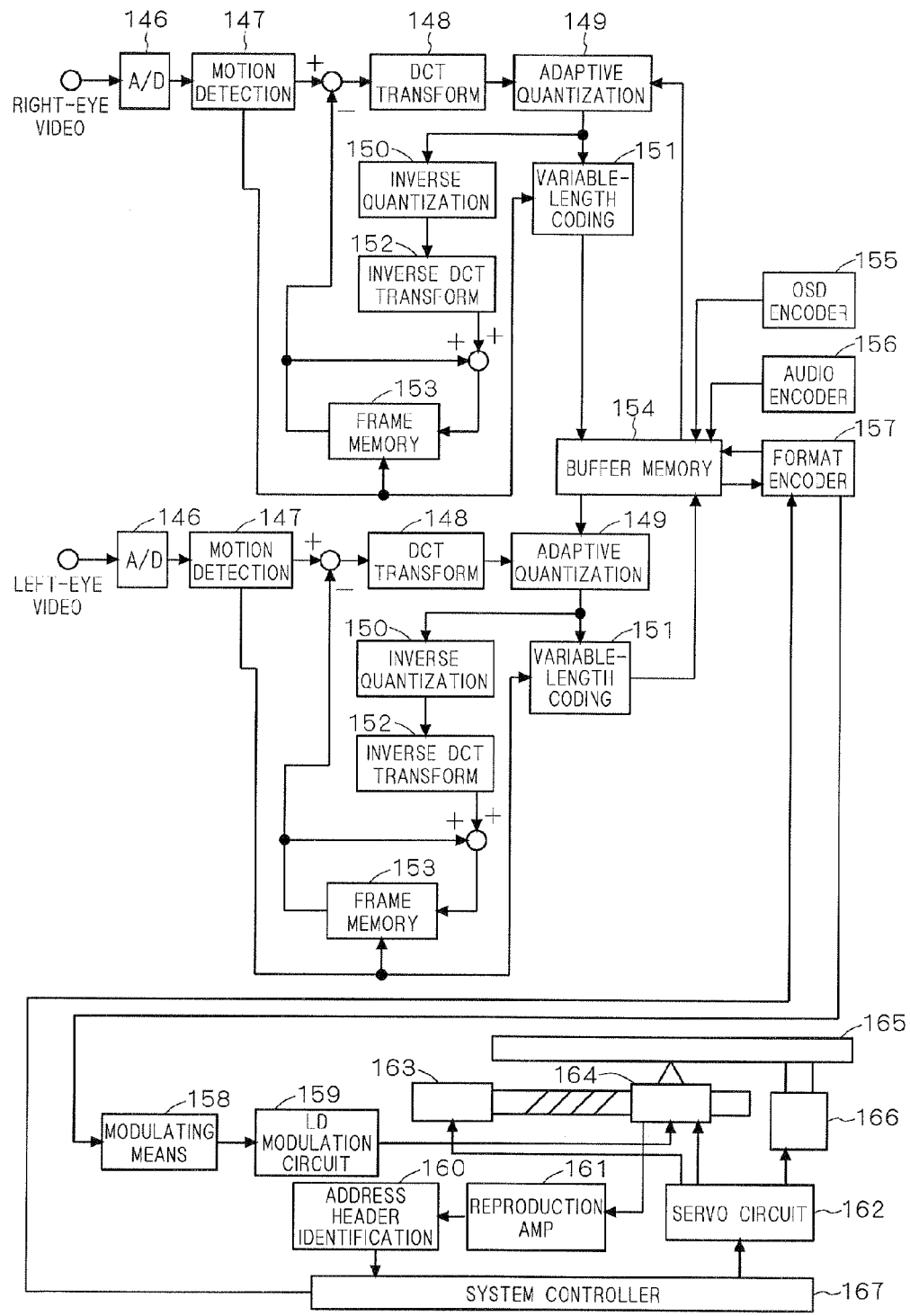
FIG. 24 is a block diagram of a stereoscopic video recording apparatus according to a third embodiment of the present invention.

Next, a third embodiment will be described. FIG. 24 is a block diagram of a stereoscopic video recording apparatus according to the third embodiment. The stereoscopic video recording apparatus shown in FIG. 24 includes AD converters 146 for digitizing video signals respectively for the right-eye and left-eye videos of stereoscopic video utilizing parallax information, motion vector detectors (motion detectors) 147 necessary for video compression in the temporal direction, DCT transform circuits 148 necessary for intra-compression, adaptive quantization circuits 149 necessary for intra-compression, and inverse quantization circuits 150 for local decoders. The stereoscopic video recording apparatus of FIG. 24 also includes variable-length coding circuits 151 necessary for intra-compression, inverse DCT transform circuits 152 for local decoders, frame memories 153 for local decoders, a buffer memory 154 for storing data after compressed, an OSD information encoder 155, an audio encoder 156, a format encoder 157, modulating means 158 for generating a signal to be written to an optical disk 165, and an LD modulation circuit 159. The stereoscopic video recording apparatus of FIG. 24 further includes an address header identification circuit 160 for extracting addresses for recording to the optical disk 165, a reproduction amp 161 for reproducing a signal from an optical head 164, a servo circuit 162 for controlling the optical head 164, a feed motor 163 and a rotary motor 166, and a system controller 167 for controlling and managing the sequence of the entire apparatus.

Figure 25:
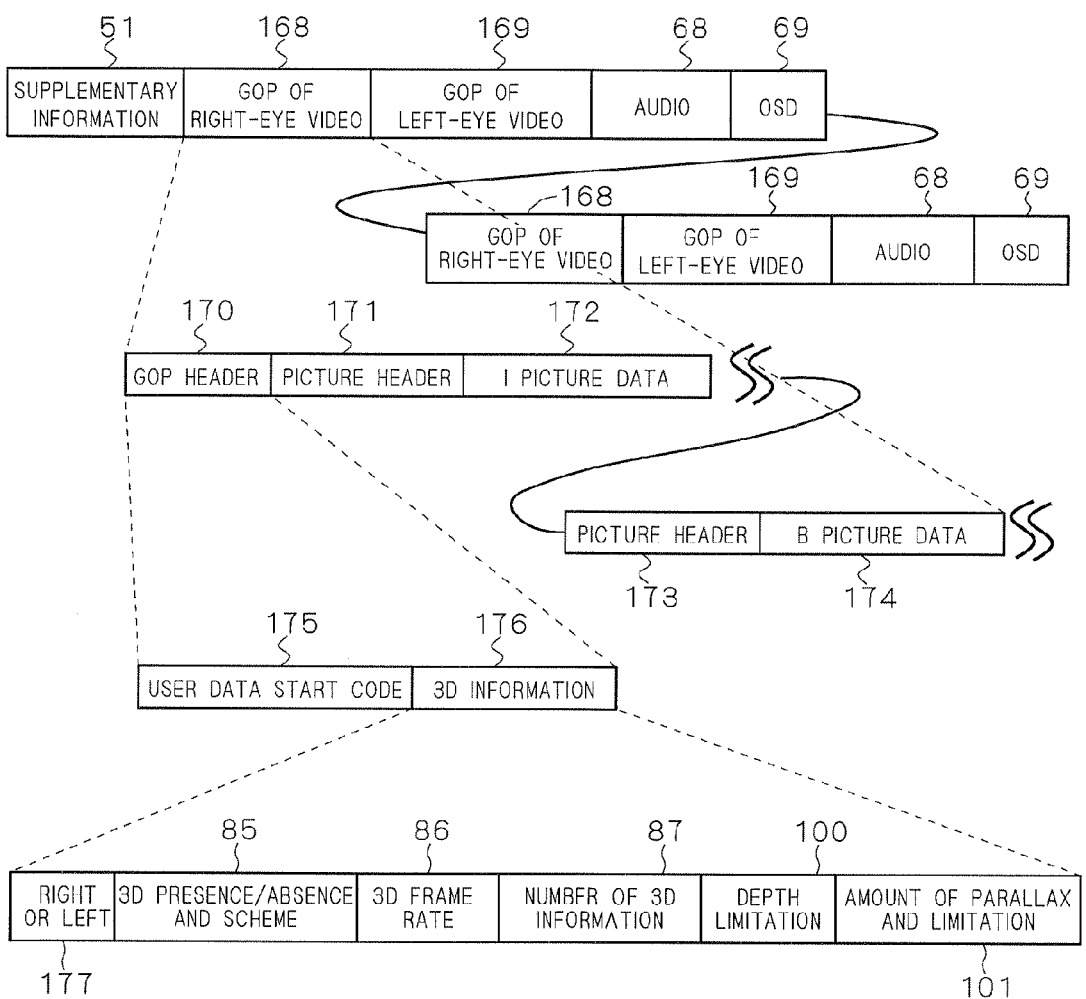
FIG. 25 is a diagram illustrating the structure of a video stream according to the third embodiment of the present invention.

FIG. 25 is a diagram illustrating the stream structure of a stereoscopic video signal generated on the basis of the stereoscopic video recording apparatus of FIG. 24. The stream structure of the stereoscopic video signal of FIG. 25 includes supplementary information 51, which is followed by repetitions of a right-eye video GOP 168, a left-eye video GOP 169, audio information 68, and OSD information 69. The right-eye GOP 168 of FIG. 25 includes a GOP header 170, picture headers 171 and 173, I picture data 172, and B picture data 174. Also, the GOP header 170 of FIG. 25 includes a user data start code 175 in the GOP header 170, and 3D video information 176 in the GOP header 170. Also, the 3D video information 176 of FIG. 25 includes information 177 indicating whether the pictures are for the left eye or the right eye, 3D video scheme and presence/absence information 85, 3D frame rate information 86, the number of 3D video information 87, depth limitation information 100, and parallax limitation information 101.

FIG. 26 illustrates a lower-order structure of the stereoscopic video signal stream generated on the basis of the stereoscopic video recording apparatus of FIG. 24. FIG. 26 shows the right-eye GOP 168 with transport stream packets 178 to 182, and the left-eye GOP 169 with transport stream packets 185 to 188. The data pieces 183 and 189 are the last data pieces respectively of the transport packets 182 and 188 where the last data pieces of the GOP video information are described, and padded portions 184 and 190 are attached respectively to the data 183 and 189.

Now, the stereoscopic video recording apparatus shown in FIG. 24 performs identical video compression for each of the left and right eyes, where the AD converter 146 digitizes right-eye pictures and the motion detector 147 extracts motion vectors on a macroblock-by-macroblock basis. Since the beginning of video data is intra-encoded, it is DCT-transformed in the DCT transform circuit 148, quantized in the adaptive quantization circuit 149, variable-length-coded in the variable-length coding circuit 151, and sent to the buffer memory. In this process, the video data after adaptive-quantized is processed in the local decoder formed of the inverse quantization circuit 150 and the inverse DCT transform circuit 152, and the original video signal is thus reconstructed and stored in the frame memory 153. Then, by making a comparison with motion-compensated pictures in the frame memory 153, the following pictures to be compressed in the temporal direction can be compressed by using difference information only. Such a compression scheme is a widely-used, basic scheme in compression methods like MPEG, H.264, etc.

In the configuration of FIG. 24, the right-eye videos and left-eye videos are input as independent video streams and encoded in separate encoder blocks. Accordingly, the configuration of FIG. 24 includes identical blocks arranged in parallel for the right eye and the left eye. However, the same processing can be achieved with a single encoder block, by providing a memory at the input to once store left-eye and right-eye videos, and processing them in the same encoder block at a doubled rate. The stereoscopic video information thus encoded is sent to the buffer memory 154, and provided with OSD information from the OSD encoder 155, audio information from the audio encoder 156, and supplementary information necessary for the format from the format encoder 157, and thus formed into a data format for recording to the optical disk 165 as a recording medium. The format encoder 157 also provides the supplementary information necessary for the recording of 3D video information according to the present invention, as well as Navi information and menu information necessary for conventional optical disk formats.

The video data in the format for recording to the optical disk is sent to the modulating means 158, and optically modulated and provided with error correcting code as information for physical writing to the optical disk 165. Then the LD modulation circuit 159 generates a signal for modulating the laser provided in the optical head 164. In this process, the servo circuit 162, for ensuring stable recording to the optical disk 165, controls the feed motor 163 for moving the optical head 164, the rotary motor 166 for rotating the disk 165, and the objective lens actuator in the optical head 164, to achieve tracking and focusing. During recording, it is necessary to read addresses on the optical disk 165, and a signal received at the optical head is photo-electrically converted to a fine signal, and the reproduction amp 161 reproduces the fine signal, and the address header identification circuit 160 generates address information. The address information is sequence-processed in the system controller 167 together with settings for activation of individual blocks, and processings for writing timing etc., especially requiring high-speed timing, are performed in dedicated hardware, and sequence setting portions requiring programming are performed in the CPU etc.

Now, the video stream generated by the stereoscopic video recording apparatus has a structure as illustrated in FIG. 25. First, generally compressed video data that includes temporally compressed pictures, such as MPEG, includes intra-compressed encoded pictures called GOP. For example, it is formed as a video block of about 15 pictures. Herein, there are two video blocks for the right eye and the left eye that utilize parallax information, and so the right-eye GOPs 168 and the left-eye GOPs 169 are sequentially arranged following the supplementary information 51 located at the beginning. In this example, one GOP is used for each of the right eye and the left eye, but a plurality of GOPs of the same number may be used in a range where video conditions are unchanged. Also, the supplementary information 51 is structured as described in the second embodiment, and a user data start code is newly defined in the GOP header portion, and 3D video information 176 may be described following it.

The 3D video information 176 first includes information (or a flag) 177 indicating whether it is for the left eye or the right eye, and further includes 3D video scheme presence/absence 85, 3D video frame rate 86, the number of 3D video information 87, depth information 100, and parallax limitation information 101, as described in the second embodiment. Also, as shown in FIG. 26, for the supplementary information 51, a private packet (TSP 1) 178 is provided at the transport packet layer, and it is separated and extracted in the transport decoder portion. Structuring the information as shown in FIG. 25 enables extraction of the same 3D information also at the MPEG data hierarchy level. When the reproducing apparatus and a TV are link-connected and 3D video settings are automatically made, or when the TV is switched in the course of reproduction, the supplementary information 51 is valid when the supplementary information extraction setting is valid on the TV side, and the 3D video information 176 is valid when stereoscopic video supplementary information at the MPEG layer is valid.

FIG. 25 describes the video stream in units of the MPEG information layer, and FIG. 26 describes it in units of transport packets that are one layer below. In FIG. 26, the video data in a block unit of the right-eye and left-eye GOPs 168 and 169 starts at the head of the transport packet 178, and it does not always fit an integer multiple of a transport packet at the end of the GOP video information. Accordingly, the remaining part of the last transport packet 182 is padded, and the padded data 184 is attached to the last data 183 to fill in information. Thus, the right-eye GOP 168 alone can be extracted by extracting the part from the transport packet 179 to the transport packet 182. The left-eye GOP 169 is processed in the same way as the right-eye GOP, and the left-eye video alone can be extracted by extracting the part from the transport packet 185 to the transport packet 188 including the padded data 190.

Figure 27:
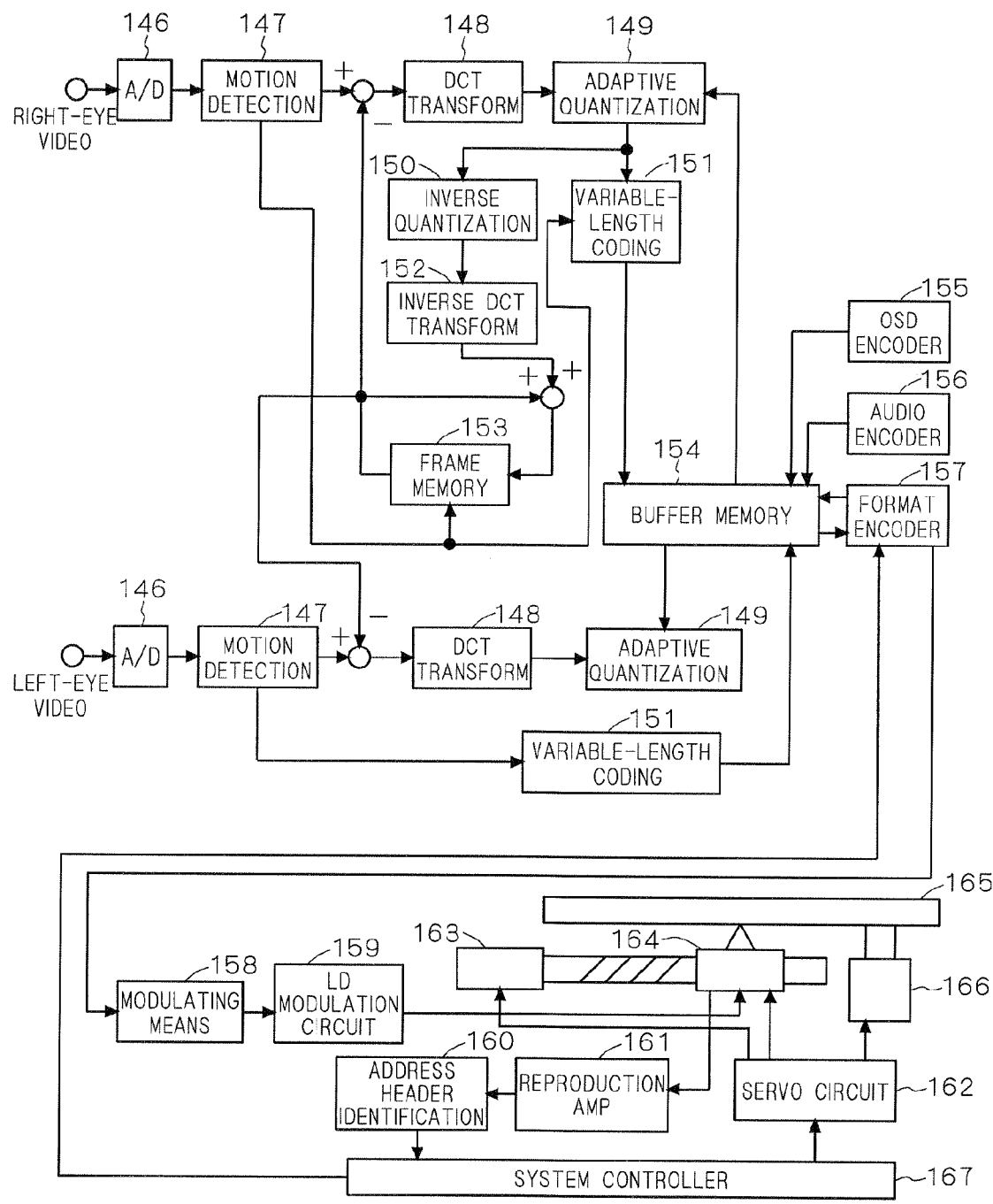
FIG. 27 is a block diagram of a stereoscopic video recording apparatus according to the third embodiment of the present invention.

The stereoscopic video recording apparatus shown in FIG. 24 encodes the intact left-eye and right-eye videos. However, basically, right-eye videos and left-eye videos are visual information shifted by parallax, and therefore they are very closely correlated. Therefore, the amount of entire information can be compressed by using a configuration that records only the difference information about the left-eye videos in relation to the right-eye videos, for example. FIG. 27 is a block diagram of a stereoscopic video recording apparatus configured for this purpose. In the stereoscopic video recording apparatus of FIG. 27, the right-eye video block is structured for primary videos, and it adopts the same configuration as the video compression blocks shown in FIG. 24. However, for the left-eye videos, a difference is taken between the output of the motion detector 147 for the left eye and the output of the frame memory 153 for the right eye, so as to solely extract the difference information between the right-eye and left-eye videos. The difference information is processed in the DCT transform 148 and the adaptive quantizer 149 in the left-eye video line, and further processed in the variable-length coder 151, and then the difference information for the left eye is recorded in the buffer memory 154. The following procedures, to the writing to the optical disk, are performed in the same way as shown in FIG. 24. The example of FIG. 27 uses right-eye videos as primary videos and left-eye videos as secondary videos as difference, but the right-eye videos and the left-eye videos can of course be used in the opposite manner (left-eye videos can be used as primary videos and right-eye videos can be used as secondary videos as difference).

The stereoscopic video recording apparatus of FIG. 27 takes a difference between the left-eye and right-eye videos to further compress the amount of video information on one side, but the information can be further compressed since the video information is based on parallax information. FIGS. 28A and 28B are schematic diagrams illustrating the principles of parallactic images. FIG. 28A shows an object 126G on the front side at a depth position 126M, an object 126H on the depth side at a depth position 126L, a depth position (most forward) 126N to the eyes 126F, a viewing angle 126D for the object 126H, and a viewing angle 126E for the object 126G. FIG. 28B shows a left-eye video 126GA of the object 126G, a right-eye video 126GB of the object 126G, a parallax 126I between the left-eye video 126GA and the right-eye video 126GB, and same pixel points 126K in the left-eye and right-eye videos. Also, FIG. 28B shows a left-eye video 126HA of the object 126H, a right-eye video 126HB of the object 126H, a parallax 126J between the left-eye video 126HA and the right-eye video 126HB, and same pixel points 126L in the left-eye and right-eye videos.

Figure 29:
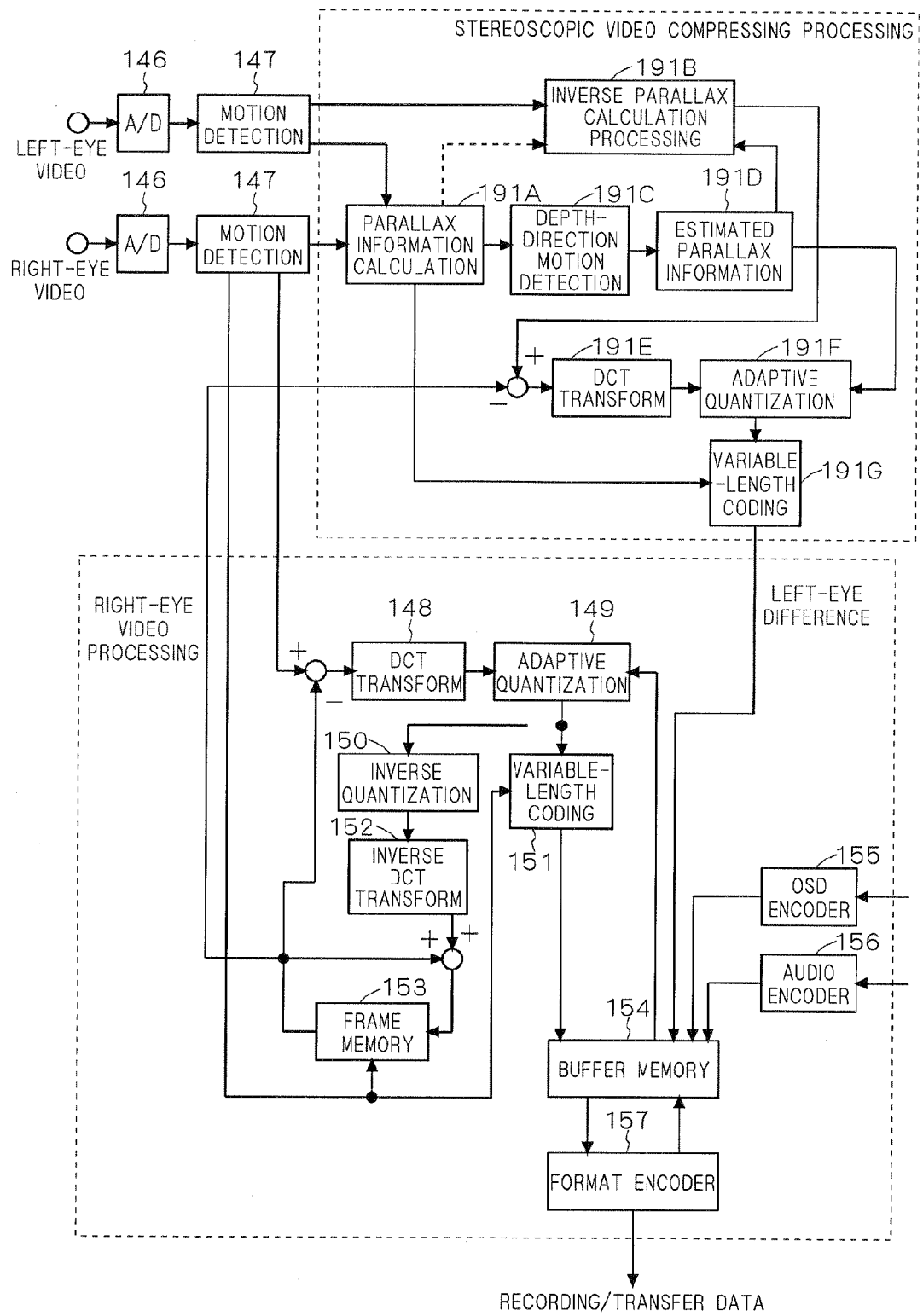
FIG. 29 is a block diagram of a stereoscopic video recording apparatus according to the third embodiment of the present invention.

FIG. 29 is a block diagram of a stereoscopic video recording apparatus for further compressing images on one side. The stereoscopic video recording apparatus shown in FIG. 29 includes a parallax information calculating circuit 191A for calculating the amount of parallax between right-eye and left-eye videos, a depth-direction motion detecting circuit 191C, and an estimated parallax information generating circuit 191D. Also, the stereoscopic video recording apparatus of FIG. 29 includes an inverse parallax calculating circuit 191B for converting-original left-eye videos to right-eye videos on the basis of the estimated parallax information, a DCT transform circuit 191E for performing DCT transform on the basis of the result of a comparison of a right-eye video with the right-eye video generated by the inverse parallax calculating circuit 191B, an adaptive quantization circuit 191F, and a variable-length coder 191G. The portion from the parallax information calculating circuit 191A to the variable-length coder 191G forms a block that performs stereoscopic video compression processing.

Figure 30:
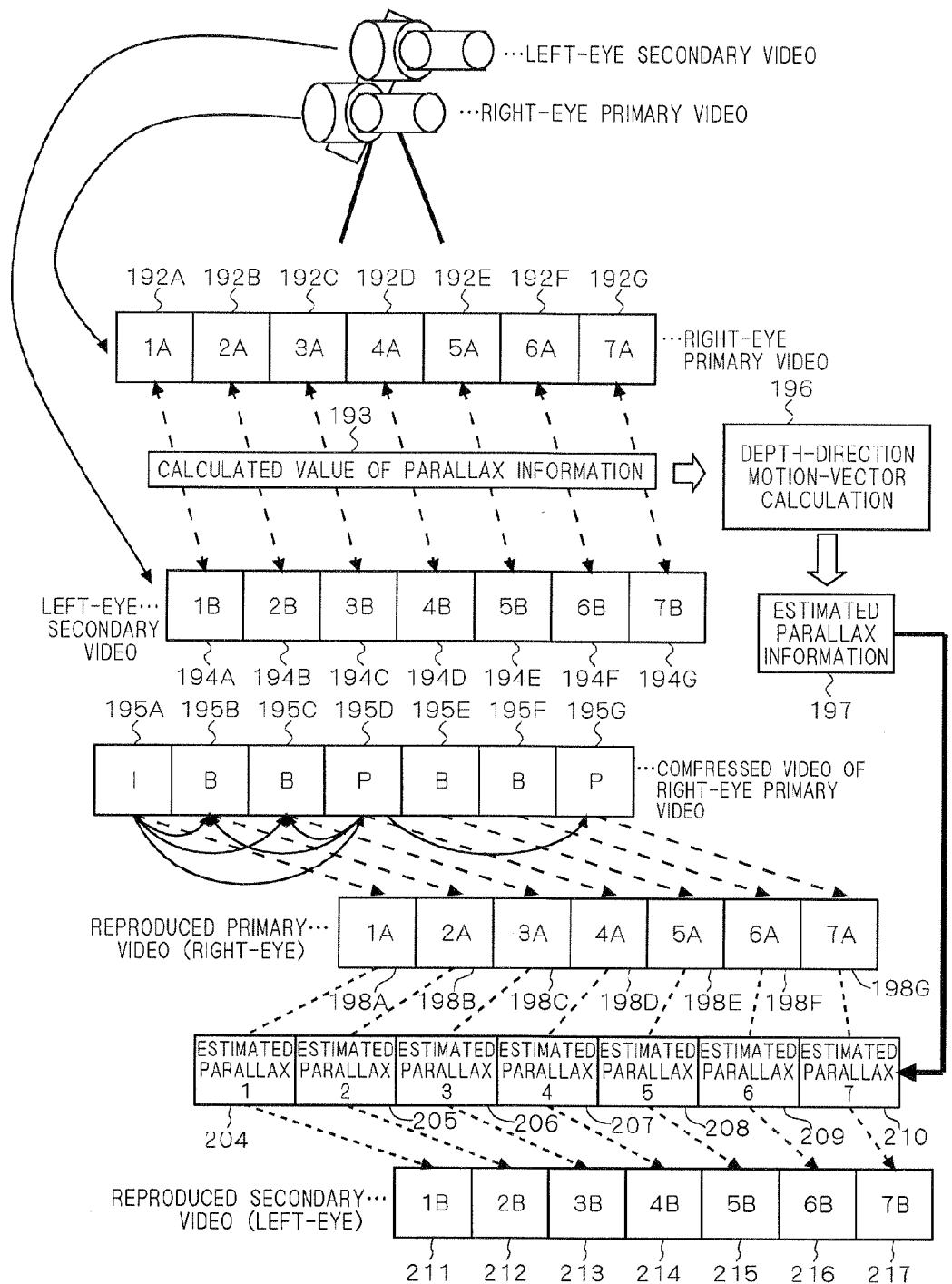
FIG. 30 is a schematic diagram illustrating a compression by image conversion with parallax information according to the third embodiment of the present invention.
Figure 31:
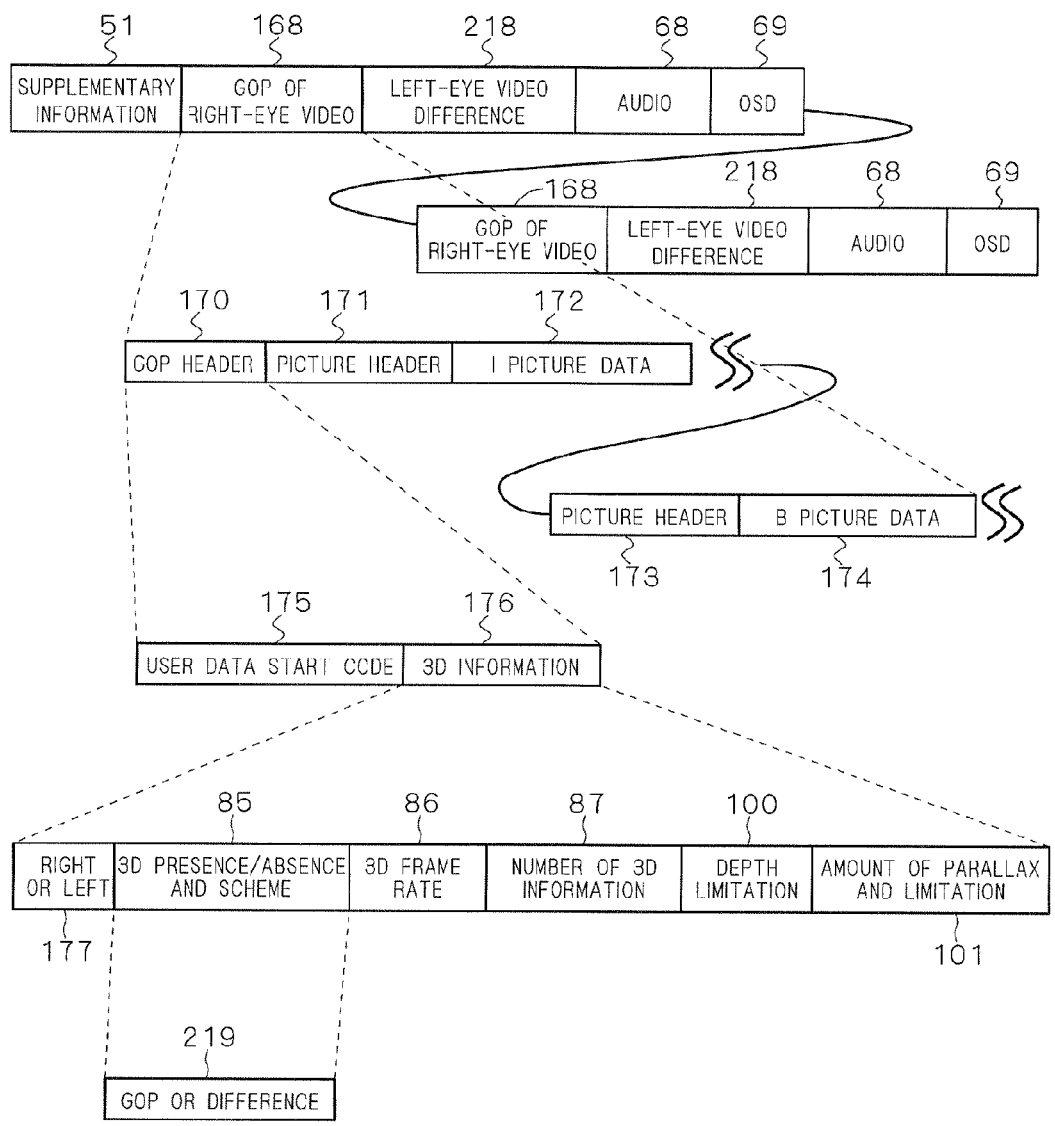
FIG. 31 is a diagram illustrating the structure of a video stream according to the third embodiment of the present invention.
Figure 32:
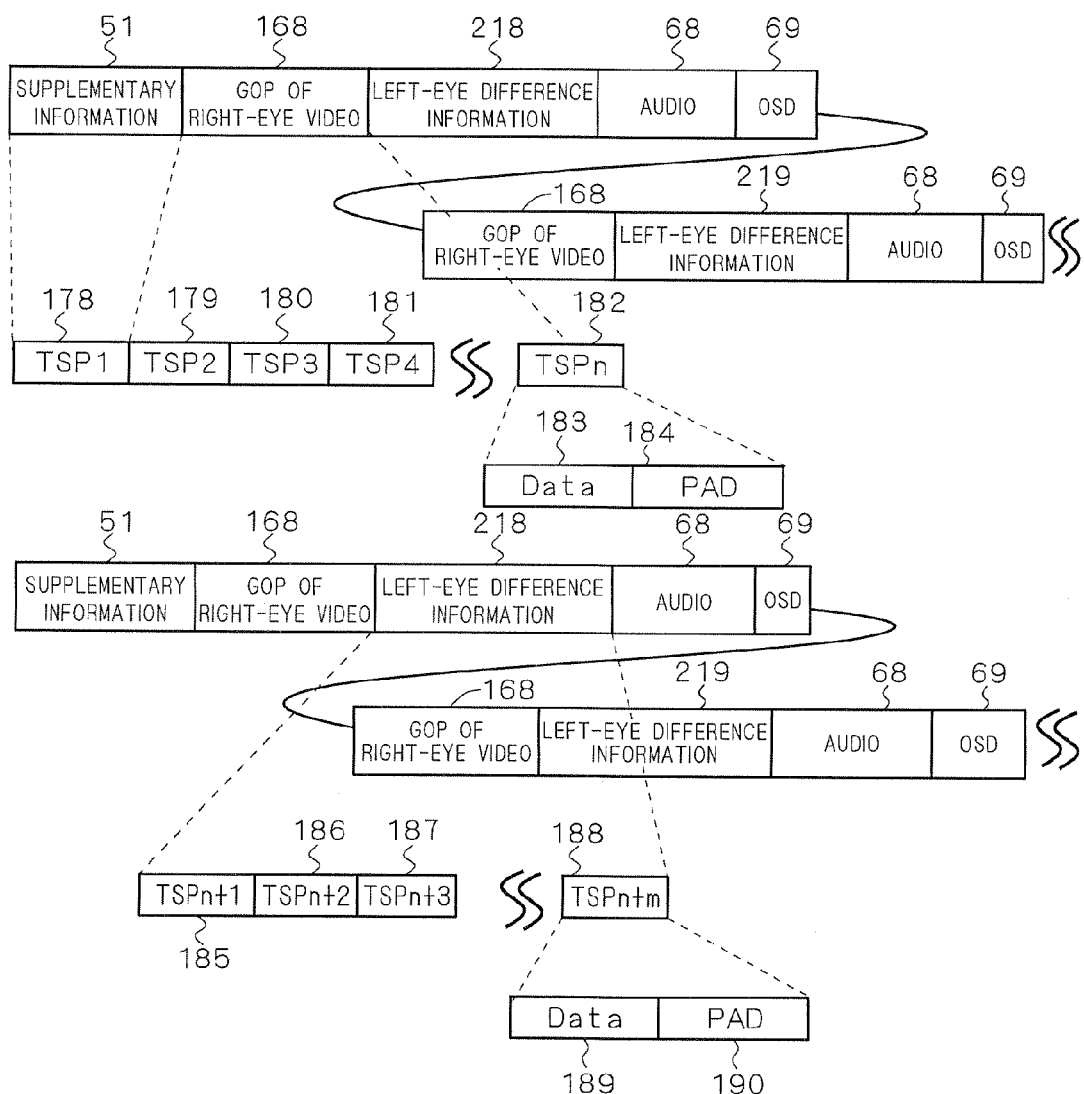
FIG. 32 is a diagram illustrating the structure of a video stream according to the third embodiment of the present invention.

FIG. 30 is a diagram illustrating the encoding and decoding of a video stream by the compression method of the stereoscopic video recording apparatus of FIG. 29. FIG. 30 shows right-eye videos 192A to 192G, parallax information calculated value 193 about the left-eye and right-eye videos, left-eye videos 194A to 194G, depth-direction motion vector calculated value 196, estimated parallax information 197, and compressed right-eye primary videos 195A to 195G. FIG. 30 also shows reproduced primary videos 198A to 198G based on the compressed right-eye primary videos 195A to 195G, estimated parallax information 204 to 210 respectively corresponding to the reproduced primary videos 198A to 198G, and reproduced secondary videos 211 to 217. FIG. 31 is a diagram illustrating the structure of a video stream generated by the compression method of the stereoscopic video recording apparatus shown in FIG. 27 or FIG. 29. The video stream structure shown in FIG. 31 is basically the same as that of FIG. 25, but it includes difference video information 218 in place of the left-eye GOPs 169, and supplementaryly includes information 219 in the 3D video scheme presence/absence 85 to indicate whether the information is GOP video information or difference information. FIG. 32 illustrates the stream structure at the transport level of the video stream generated by the compression method of the stereoscopic video recording apparatus of FIG. 29. FIG. 32 is basically the same as FIG. 26, but it includes difference video information 218 in place of the left-eye GOPs 169.

Now, FIG. 28A illustrates the stereoscopic direction with right-eye and left-eye videos utilizing parallax. In FIG. 28A, the parallactic angle seen from the eyes 126F appears different depending on the depth. Accordingly, in the right and left parallactic images shown in FIG. 28B, the object 126G on the near side is seen as being larger, and the left-eye video 126GA and the right-eye video 126GB are seen as being separated away, and the amount of parallax 126I is larger. On the other hand, the object 126H at a distance is seen as being smaller, and the left-eye video 126HA and the right-eye video 126HB are seen as being closer, and the amount of parallax 126J is smaller.

Accordingly, with information about the amount of parallax (126I or 126J) or with information about the parallactic angle (126D or 126E), it is possible, as shown in FIG. 28B, to estimate the right-eye video from the left-eye video (126K and 126L: image generation by conversion with parallax information). This estimation assumes that the brightness and color do not change depending on the angle of view, and therefore variations caused by turning-around of images, shades, etc., remain unpredictable by this estimation.

Now, in the stereoscopic video recording apparatus shown in FIG. 29, the parallactic angle is extracted on the basis of in-plane position information about objects that is obtained from the left-eye and right-eye motion detectors 147, and the parallax information calculating circuit 191A calculates parallax information on a macroblock-by-macroblock basis or a pixel-by-pixel basis. Also, for the compression in the temporal direction, the depth-direction motion detecting circuit 191C extracts motion vectors in the depth direction between pictures. The estimated parallax information generating circuit 191D generates estimated parallax information with the depth-direction motion information and the parallax information. Also, as mentioned above, when there is only the parallax information from an image on one side (described herein as a right-eye video), it is not possible to perfectly recover the image on the opposite side (described herein as a left-eye video), and therefore there remains unpredictable information, like variations caused by turning-around of images (e.g., a hidden portion becomes viewable).

Accordingly, in the stereoscopic video compression by the stereoscopic video recording apparatus shown in FIG. 29, the inverse parallax calculating circuit 191B first performs a local-decode reproduction of an image on the opposite side (described herein as the left-eye video), though not perfectly, by utilizing the estimated parallax information, and then a difference is obtained between it and the actually filmed image that has been compressed (the image in the frame memory 153 of the local decoder). The difference information is about the un-reproducible portion caused by variations due to turning-around of images as mentioned above, and it is possible to cover the portion that cannot be perfectly reproduced with the parallax information, in the compressed stream that utilizes parallax information. Also, though not shown, when depth-direction motion vectors are extracted, the amount of variation of parallax is also utilized as information. Thus, the depth-direction motion vectors can be utilized to increase the compression efficiency, by using an inverse quantization circuit, an inverse DCT transform circuit, and a frame memory, like an ordinary local decoder for information compression.

Now, FIG. 30 shows the image data in units of pictures. In FIG. 30, the right-eye primary videos 192A to 192G are extracted from the right-eye camera, and the left-eye secondary videos 194A to 194G are extracted from the left-eye camera. Then, the parallax information calculating circuit 191A of FIG. 29 calculates the parallax information 193 from the right-eye primary videos 192A to 192G and the left-eye secondary videos 194A to 194G. The depth-direction motion vector calculation 191C extracts the depth-direction motion-vector calculated value 196 from variations of the parallax information 193 between pictures, and the estimated parallax information 197 is generated. The estimated parallax information 197 itself may be on a macroblock-by-macroblock basis or a pixel-by-pixel basis.

On the other hand, in the reproduction of the images, the right-eye primary videos 192A to 192G are in the form of the compressed right-eye primary videos 195A to 195G that are encoded by the video compression. Specifically, the compressed right-eye primary videos include an intra-compressed I picture 195A, P pictures 195D and 195G compressed in the temporal direction with in-plane motion vectors, and B pictures 195B, 195C, 195E, and 195F. The compressed right-eye primary videos are reproduced into the reproduced right-eye primary videos 198A to 198G by a common compressed-video-decompressing circuit. Then, the reproduced secondary videos (left-eye videos) 211 to 217 are restored on the basis of the reproduced primary videos (right-eye videos) 198A to 198G; the estimated parallax information 204 to 210 about individual pictures; and difference information about individual pictures that are inverse-quantized and inverse-DCT-transformed. The image portions restored from the difference information work to complement the portions that cannot be reproduced with the estimated parallax information, caused by turning-around of images and the like.

FIG. 31 illustrates the video stream using the video compression by the stereoscopic video recording apparatus of FIG. 29 or FIG. 27, and it is necessarily provided as data in GOP video information units. This is because the right-eye videos are originally in units of GOP video information, and it is necessary to match the unit level of the images since the differencely-compressed data for the left eye utilizes the right-eye videos. Now, the GOP header 170 in the right-eye GOP 168 includes supplementary information related to the stereoscopic video, like those described with FIG. 25. However, as shown in FIG. 31, for the left-eye videos, it is necessary to describe the information 219 in the 3D video scheme presence/absence 85 to indicate whether it is GOP video information or difference information, so as to indicate whether it is compressed information that utilizes the estimated parallax information 197 shown in FIG. 29, or differencely-compressed information as shown in FIG. 27, or information that is not compressed as stereoscopic images as shown in FIG. 24. FIG. 32 illustrates the stream structure at the transport packet level, where the end of the GOP video data is padded in a transport packet in a manner as shown in FIG. 26, and the end of the stereoscopically compressed video data, too, is padded in a transport packet. The description above assumes the right-eye videos as primary videos and the left-eye videos as secondary videos that are compressed in the stereoscopic direction, but there is no problem at all when the images are processed in the opposite relation. Also, the video stream may include a mixture of right-eye videos as primary videos and left-eye videos as secondary videos, and left-eye videos as primary videos and right-eye videos as secondary videos. When such a mixture is permitted by standards, it is necessary to describe identification information indicating which constitutes primary videos and which constitutes secondary videos.

Figure 34:
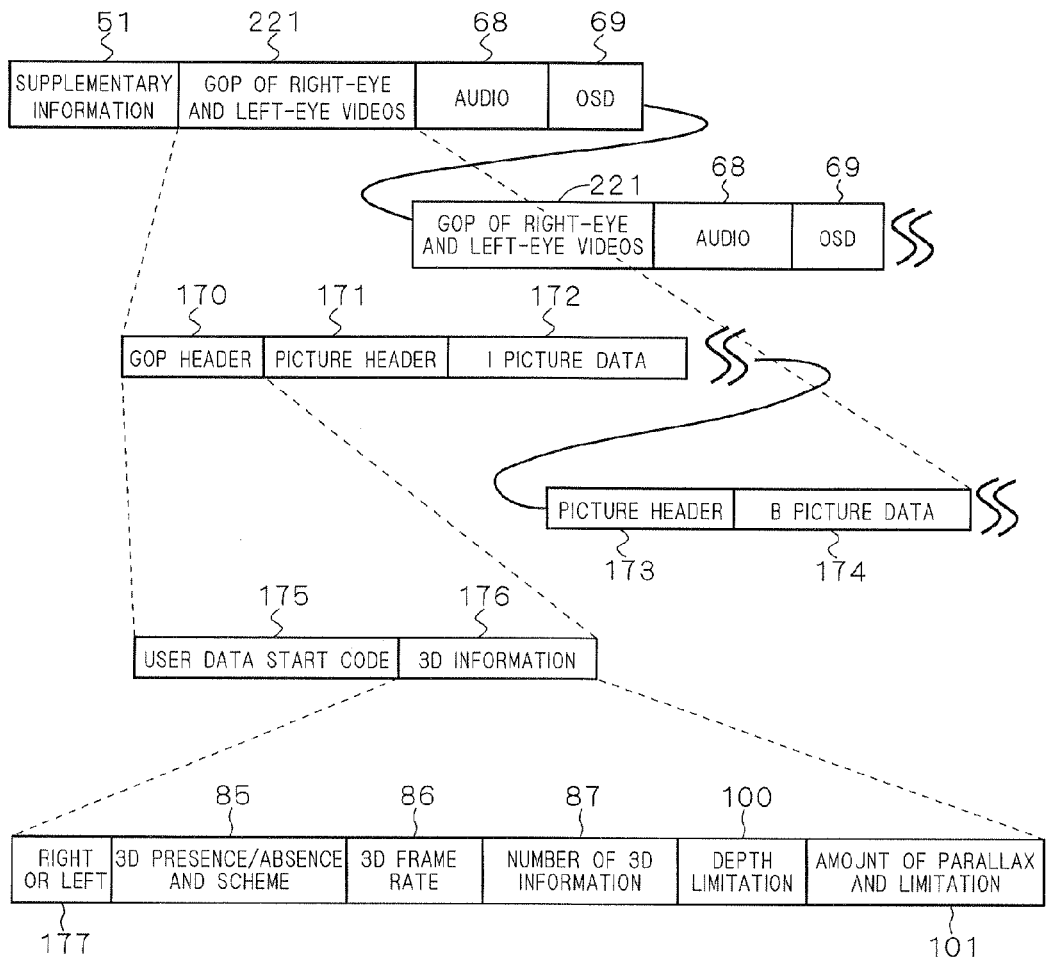
FIG. 34 is a diagram illustrating the structure of a video stream according to the third embodiment of the present invention.
Figure 35:
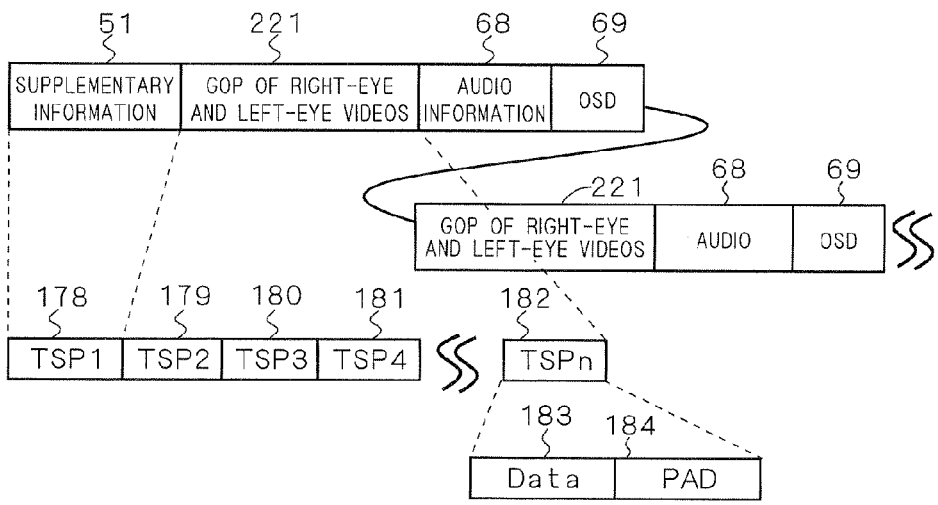
FIG. 35 is a diagram illustrating the structure of a video stream according to the third embodiment of the present invention.

It is also possible to more simply construct a video stream with stereoscopic images for the left eye and the right eye. For example, the stereoscopic video recording apparatus shown in FIG. 33 includes a synthesizing circuit 220 as a video constructing block for simply constructing a video stream. FIG. 34 illustrates the structure of a video stream by the stereoscopic video recording apparatus shown in FIG. 33, where a left-eye and right-eye GOP 221 forms a single GOP video information unit. FIG. 35 illustrates the structure at the transport packet level of the video stream by the stereoscopic video recording apparatus shown in FIG. 33.

Figure 33:
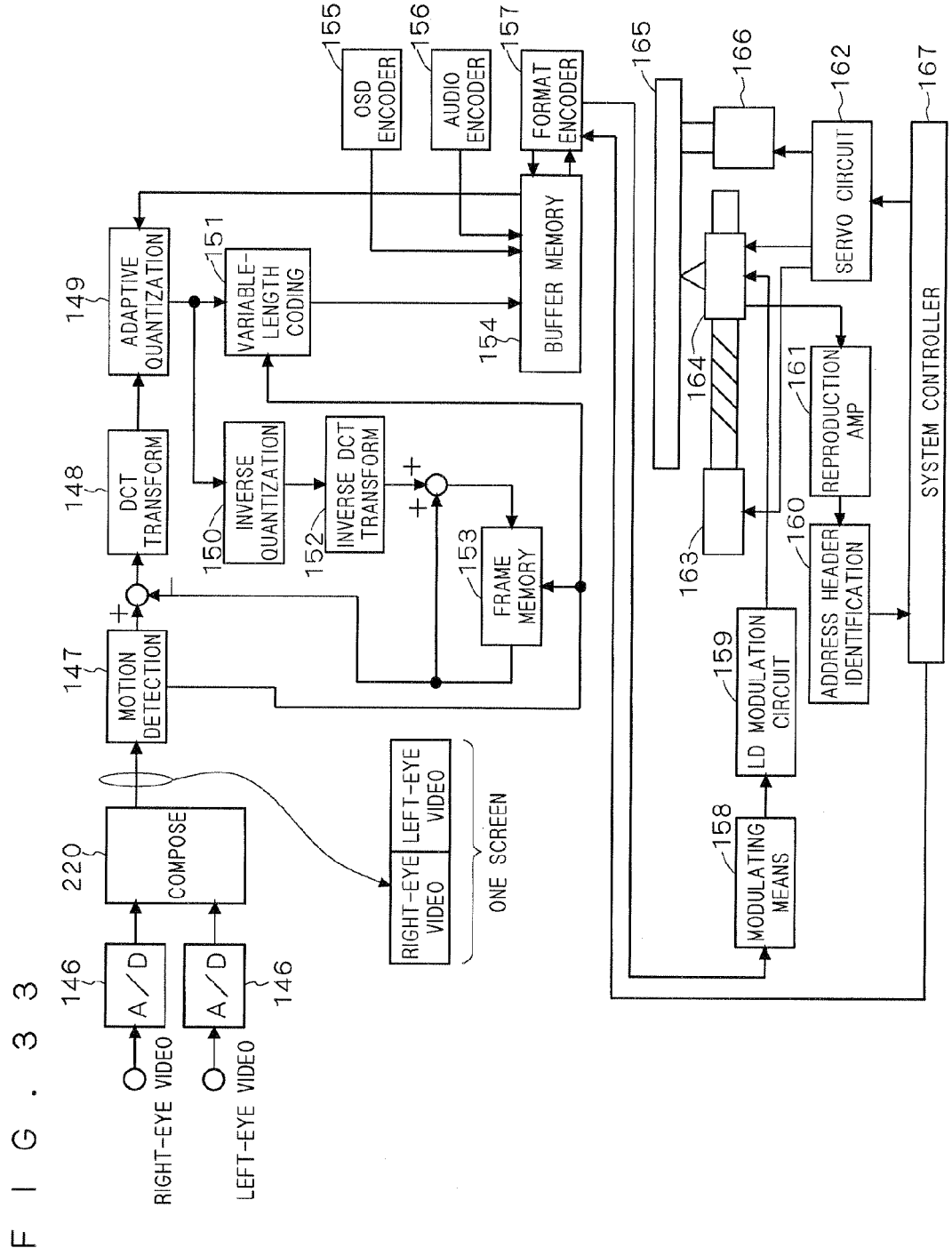
FIG. 33 is a block diagram of a stereoscopic video recording apparatus according to the third embodiment of the present invention.

Now, as shown in FIG. 33, the input parallactic images for the left eye and the right eye are once input to the synthesizing circuit 220, and inserted into one picture as two vertically-elongate images. In this process, the pixels of the images are not simply thinned in image lines, but are filtered and compressed in the horizontal direction, and then synthesized into a left-eye and right-eye picture. Thus, each picture is composed of two vertically-elongate images for the left eye and the right eye, and then formed into a stream by a common video compression scheme. In this case, too, in the video stream shown in FIG. 34, it is necessary that the supplementary information 51 or the 3D information region 176 in the GOP header 170 describe that the video information is compressed in the horizontal direction, so that it is not intactly reproduced in an ordinary TV. In the case of the video stream structure shown in FIG. 34, as in those shown in FIGS. 26 and 32, the padded data 184 for filling in information is attached to the last data 183 of the transport packet at the end of the GOP video information at the transport packet level. The invention has described stereoscopic video recording apparatuses and stereoscopic video recording methods for recording on an optical disk, but it is needless to say that entirely the same effects are obtained when a hard disk is used as a recording medium.

Fourth Embodiment

Figure 36:
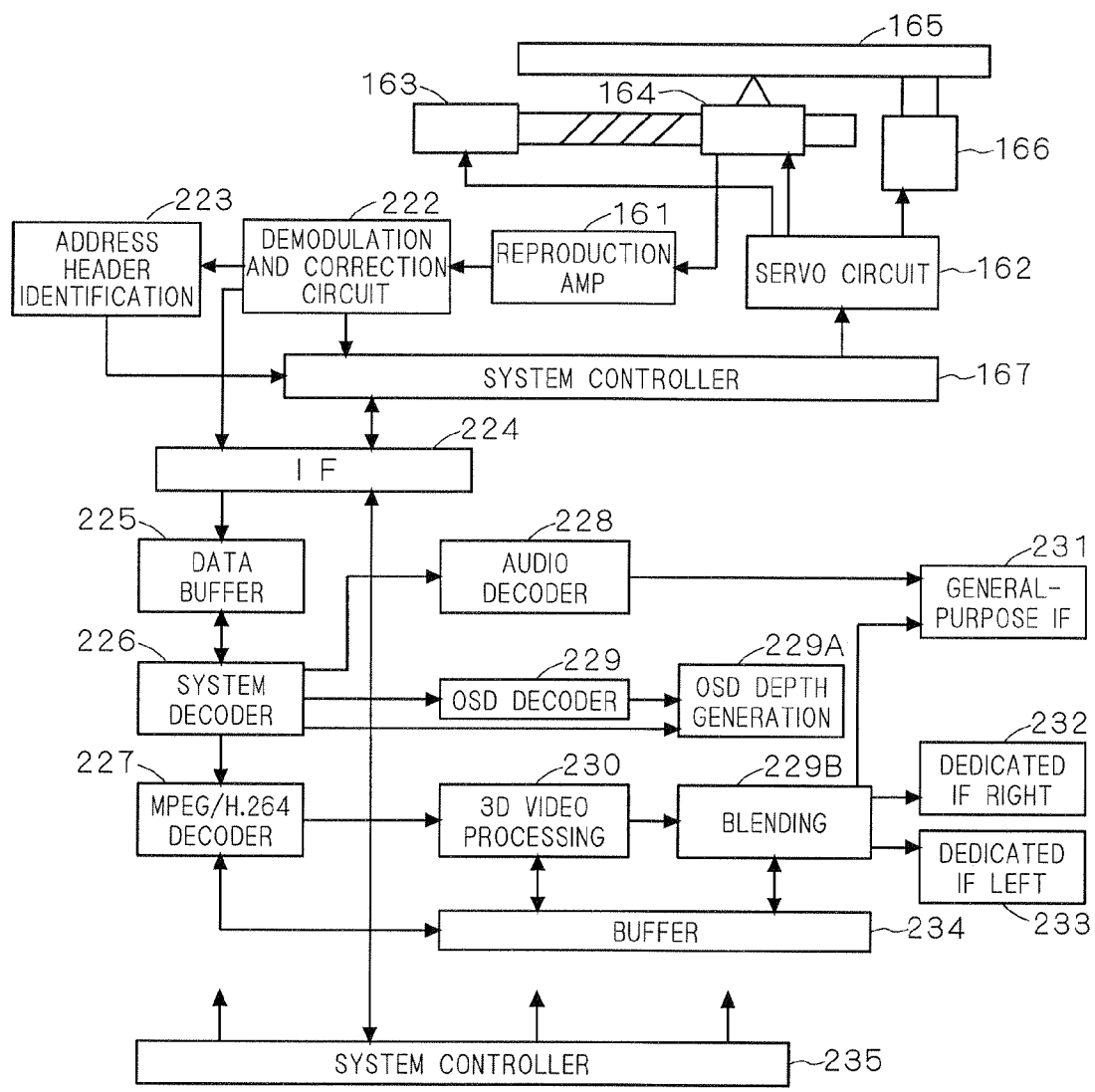
FIG. 36 is a block diagram of a stereoscopic video reproducing apparatus according to a fourth embodiment of the present invention.

Next, a fourth embodiment will be described referring the drawings. This embodiment describes stereoscopic video reproducing apparatuses, while the third embodiment has described stereoscopic video recording apparatuses. FIG. 36 is a block diagram of a stereoscopic video reproducing apparatus according to this embodiment. The stereoscopic video reproducing apparatus of FIG. 36 includes a demodulation and correction circuit 222, an address header identification circuit 223, an IF (interface) 224 for connecting the optical disk drive block and the back-end as a video audio processing block, and a data buffer 225 for once storing data from the optical disk drive block. The stereoscopic video reproducing apparatus of FIG. 36 also includes a system decoder 226 for separating streams of video data, audio data, etc., an MPEG H264 decoder 227 for decompressing compressed images, an audio decoder 228, an OSD decoder 229 for display of subtitles etc., and an OSD information depth generating circuit 229A. The stereoscopic video reproducing apparatus of FIG. 36 further includes a 3D video processing circuit 230, a blending circuit 229B for superimposing the OSD information on images, a general-purpose IF 231 for external connection, a dedicated right-eye IF 232, a dedicated left-eye IF 233, a buffer circuit 234, and a system controller 235 for the entire back-end.

FIG. 37 is a block diagram illustrating a block for decoding left-eye videos from stereoscopically compressed images, as described in the third embodiment. The apparatus shown in FIG. 37 includes a system decoder 236 for extracting parallax information and depth motion vector information from the video stream, an MPEG H264 decoder 237 for decoding a video stream compressed such as MPEG and H264, parallax information 238, motion vector information 239, a parallax information calculating circuit 240, and a left-eye video reproducing circuit 241. The parallax information 238, motion vector information 239, parallax information calculating circuit 240, and left-eye video reproducing circuit 241 form a 3D video processing circuit 230.

Now, in the stereoscopic video reproducing apparatus shown in FIG. 36, first, the demodulation and correction circuit 222 in the optical disk drive reproduces video audio data and supplementary data that are described on an optical disk 165. In this process, a servo circuit 162 operates such that the reproduction signal from the optical head 164 is continuously extracted with high quality, and the address header identification circuit 223 operates such that access can be instantaneously made to certain addresses. The data reproduced by the optical disk drive is once input to the data buffer circuit 225 through the IF circuit 224, and then input to the system decoder 226. The system decoder 226 separates the stream into video, audio, etc., and the audio information is input to the audio decoder 228, the OSD information is input to the OSD decoder 229, and the video information is input to the MPEG H264 decoder 227.

In the OSD depth generating circuit 229A, OSD information is generated as OSD information having depth, on the basis of supplementary information obtained from the system decoder 226. The video stream decoded in the MPEG H264 decoder 227 is processed as 3D video information in the 3D video processing circuit 230, and blended in the blending circuit 229B with the OSD images having depth, and it can be outputted from the general-purpose IF, such as HDMI, when the transfer rate is low, or the left-eye videos can be outputted from the dedicated left-eye IF 233 and the right-eye videos from the dedicated right-eye IF 232.

When images on one side are further compressed by using parallax information, as described in the third embodiment, the 3D video processing 230 of the stereoscopic video reproducing apparatus is configured as shown in FIG. 37. In FIG. 37, on the basis of the depth motion vector 239 and the parallax information 238 as compressed left-eye video information extracted by the system decoder 236, the parallax information calculating circuit 240 performs a parallax information calculation on a pixel-by-pixel basis or a macroblock-by-macroblock basis, so as to generate conversion coefficients for generating left-eye videos from right-eye videos. By using the conversion coefficients, the left-eye video reproducing circuit 241 reproduces left-eye videos on the basis of the right-eye videos generated by the MPEG H264 decoder. When the compressed left-eye videos are compressed only with parallax information, the processing only involves re-conversion based on the output of the parallax information calculating circuit 240. On the other hand, in the case of compressed information subjected to DCT transform and adaptive quantization in a manner as described with the stereoscopic video recording apparatus of FIG. 33, it is necessary to provide inverse quantization and inverse transform circuits in the left-eye video reproducing circuit 241.

Figure 38A:
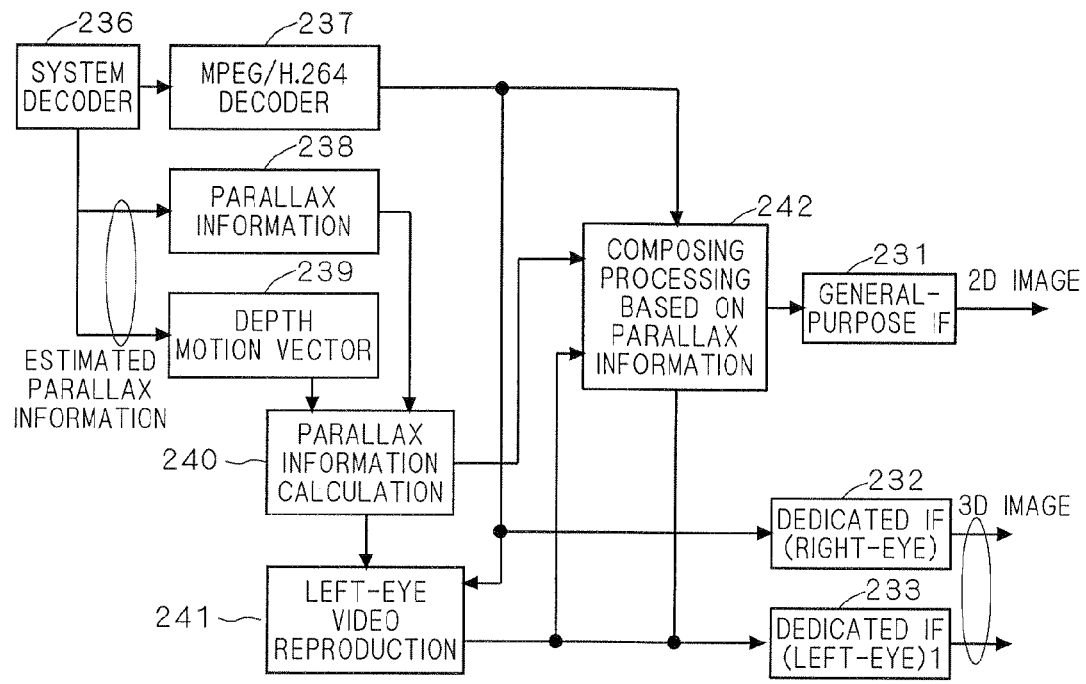
FIGS. 38A and 38B are diagrams illustrating a stereoscopic video reproducing apparatus according to the fourth embodiment of the present invention.
Figure 38B:
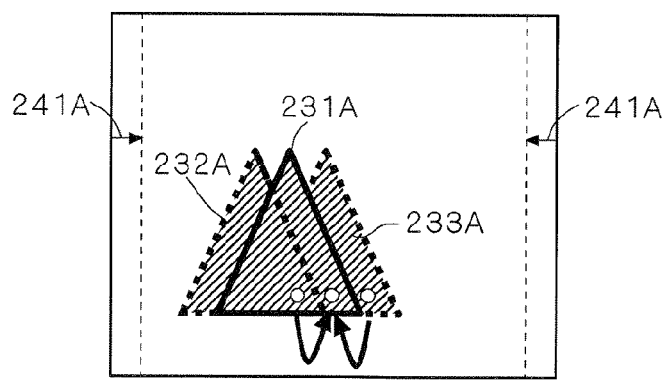

Next, a stereoscopic reproducing apparatus will be described which reproduces 2D images, not stereoscopic, from left-eye and right-eye stereoscopic images. FIG. 38A is a block diagram of the stereoscopic reproducing apparatus for reproducing 2D images. The apparatus of FIG. 38A includes a synthesizing circuit 242 based on parallax information. FIG. 38B is a diagram schematically illustrating an image constructed by the synthesizing circuit 242, where a left-eye video 232A and a right-eye video 233A are synthesized into a 2D image 231A. Now, common display apparatuses, such as TVs, are not always 3D-compatible, or they are more often 2D-compatible. Accordingly, it is desired that a medium that records only 3D images can be reproduced also two-dimensionally. The simplest method for this purpose is to reproduce 2D images by displaying right-eye videos or left-eye videos only. For example, when a TV is ready only for 2D, it is automatically detected in the link connection processing between the player and the TV, and the images on one side are continuously reproduced.

However, this method is problematic because an image having a depth close to the eyes (an image that appears protruding) involves a large amount of parallax, and then the position is shifted to the left or right as shown by the left-eye video 232A or the right-eye video 233A shown in FIG. 38B. Accordingly, it is possible to reproduce a natural 2D image by synthesizing left-eye and right-eye videos by using parallax information and reproducing an image in the middle position as shown by the 2D image 231A. However, the areas near both ends of the screen cannot be calculated when the parallax is large, and the areas 241A of the image (both ends of the screen) will be "cut", unless the original image is filmed such that the left-eye video is wide to the left and the right-eye video is wide to the right.

Figure 39A:
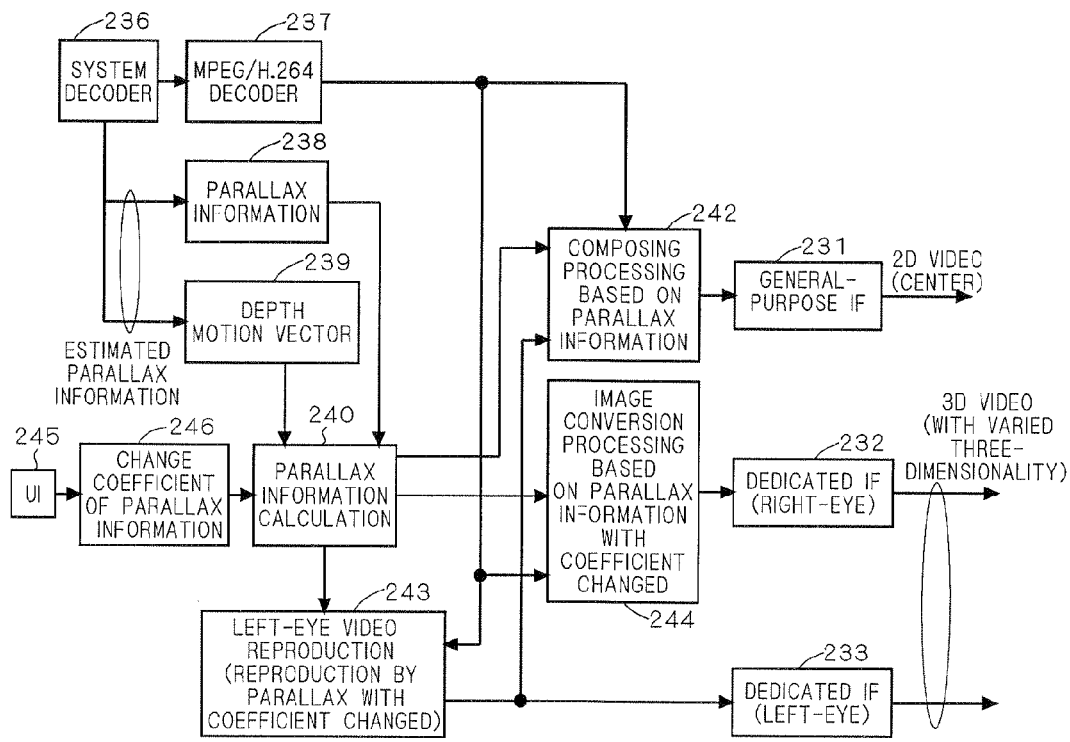
FIGS. 39A to 39D are diagrams illustrating a stereoscopic video reproducing apparatus according to the fourth embodiment of the present invention.
Figure 39B:
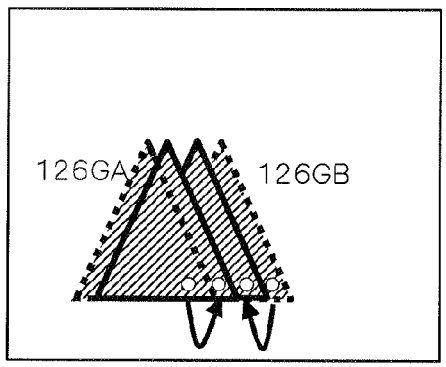
Figure 39C:
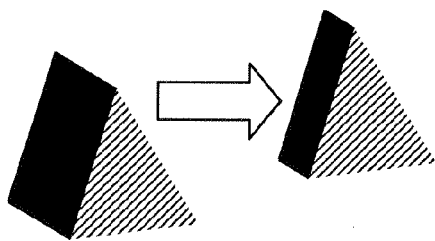
Figure 39D:
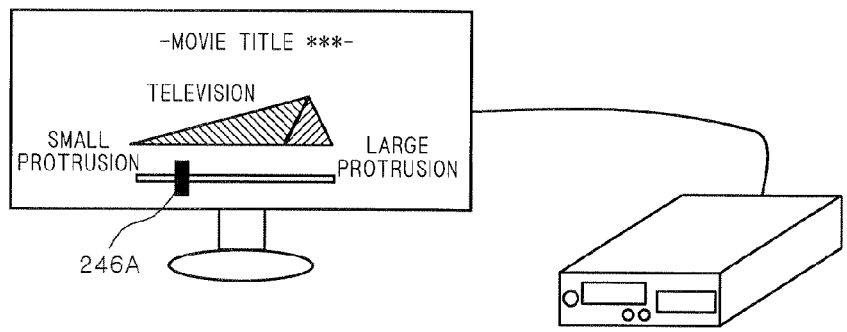

Furthermore, a large amount of protrusion (a high degree of three-dimensionality) might cause increased eye fatigue or an increased "surprising" impression as described in the second embodiment. To prevent this, FIG. 39A shows a block diagram of a stereoscopic video reproducing apparatus that is capable of varying the amount of protrusion. The apparatus of FIG. 39A includes a left-eye video reproducing circuit 243 using coefficient-varied parallax, a right-eye video converting circuit 244 using coefficient-varied parallax, a user interface 245 for the varying of the amount of protrusion, and a parallax information coefficient varying portion 246. FIG. 39B is a diagram illustrating the variation of the amount of protrusion by the stereoscopic video reproducing apparatus. Also, FIG. 39C is a diagram illustrating the effect obtained by varying the amount of protrusion by the circuits of FIG. 39A. FIG. 39D illustrates an OSD bar 246A for varying the amount of protrusion, which is displayed on a display apparatus connected to the stereoscopic video reproducing apparatus.

In a scheme in which images on one side are compressed with parallax information, as described with the stereoscopic video recording apparatus of FIG. 29, parallax information that is directly related to the amount of protrusion is linked on a pixel-by-pixel basis or a macroblock-by-macroblock basis. Accordingly, when an instruction for varying the amount of protrusion is given from the user, the instruction is input to the user interface 245 by using the OSD display of the OSD bar 246A on the TV screen as shown in FIG. 39D, for example. Then, the parallax information coefficient varying portion 246 determines a conversion coefficient to determine to what degree the amount of protrusion should be attenuated. This conversion coefficient determines the amount of the parallax calculation in the parallax information calculating circuit 240. Then, the left-eye videos are reproduced by the left-eye video reproducing circuit 243 on the basis of the coefficient-varied parallax, and the right-eye videos are converted by the image converting circuit 244 on the basis of the coefficient-varied parallax information, whereby the amount of parallax between the left-eye videos and right-eye videos is converted to be smaller in such a manner that, as shown in FIG. 39B, the left-eye video 126GA and the right-eye video 126GB are converted from the broken lines to the solid lines. As a result, the stereoscopic images obtained from the outputs of the dedicated IFs 232 and 233 are reproduced with a reduced amount of protrusion as shown by the stereoscopic triangular object of FIG. 39C.

Figure 40:
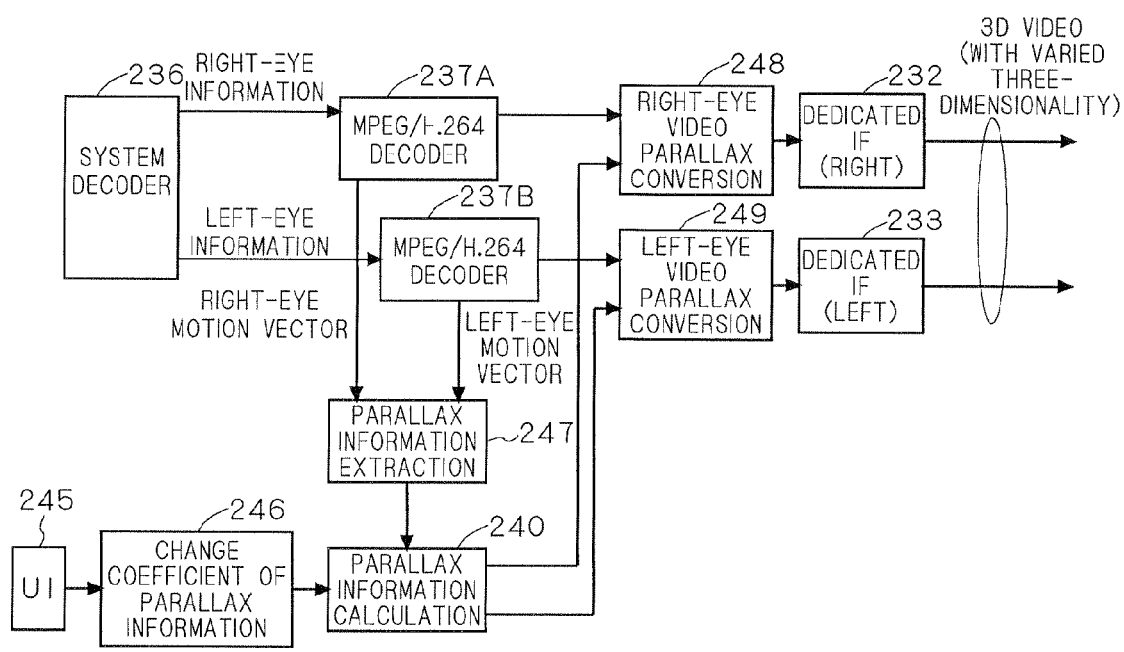
FIG. 40 is a diagram illustrating a stereoscopic video reproducing apparatus according to the fourth embodiment of the present invention.

The stereoscopic video reproducing apparatus of FIG. 39A converts the amount of protrusion by using parallax information, when the parallax information is recorded on the video stream. However, parallax information may be absent. Accordingly, the stereoscopic video reproducing apparatus shown in FIG. 40 is configured so that the amount of protrusion can be controlled even when parallax information is not recorded in the video stream. The stereoscopic video reproducing apparatus of FIG. 40 includes MPEG H264 decoders 237A and 237B respectively for left-eye videos and right-eye videos, a parallax information extracting portion 247, a right-eye video parallax converting portion 248, and a left-eye video parallax converting portion 249. In the stereoscopic video reproducing apparatus shown in FIG. 40, the parallax information extracting portion 247 newly detects parallax information from the decoded left-eye and right-eye videos. In this case, as in the apparatus of FIG. 39A, new parallax information is generated in the parallax information calculating portion 240, through the processing in the user interface 245 and the parallax information coefficient varying portion 246, and it is supplied to the right-eye video parallax converting portion 248 and the left-eye video parallax converting portion 249.

This embodiment has described apparatuses and methods for reproducing stereoscopic video information recorded on an optical disk, but it is needless to say that entirely the same effects are obtained when a hard disk is used as a recording medium.

Fifth Embodiment

In the fifth embodiment, when a flat video and a stereoscopic video according to the above first to fourth embodiments are present in a mixed manner, the video is distributed in a predetermined format, so that the user can view the video and listen to the audio with a realistic sensation. Accordingly, in the below explanation, detailed description about the flat image and the stereoscopic image will be omitted. However, this embodiment can be carried out in combination with the embodiments of the flat video and the stereoscopic video according to the first to fourth embodiments.

In the second to fourth embodiments, the user views stereoscopic video information recorded on an optical disk medium. In contrast, recent BD players have the standard for network connection. Accordingly, stereoscopic videos will become viewable via network instead of from information on a disk medium.

Figure 41:
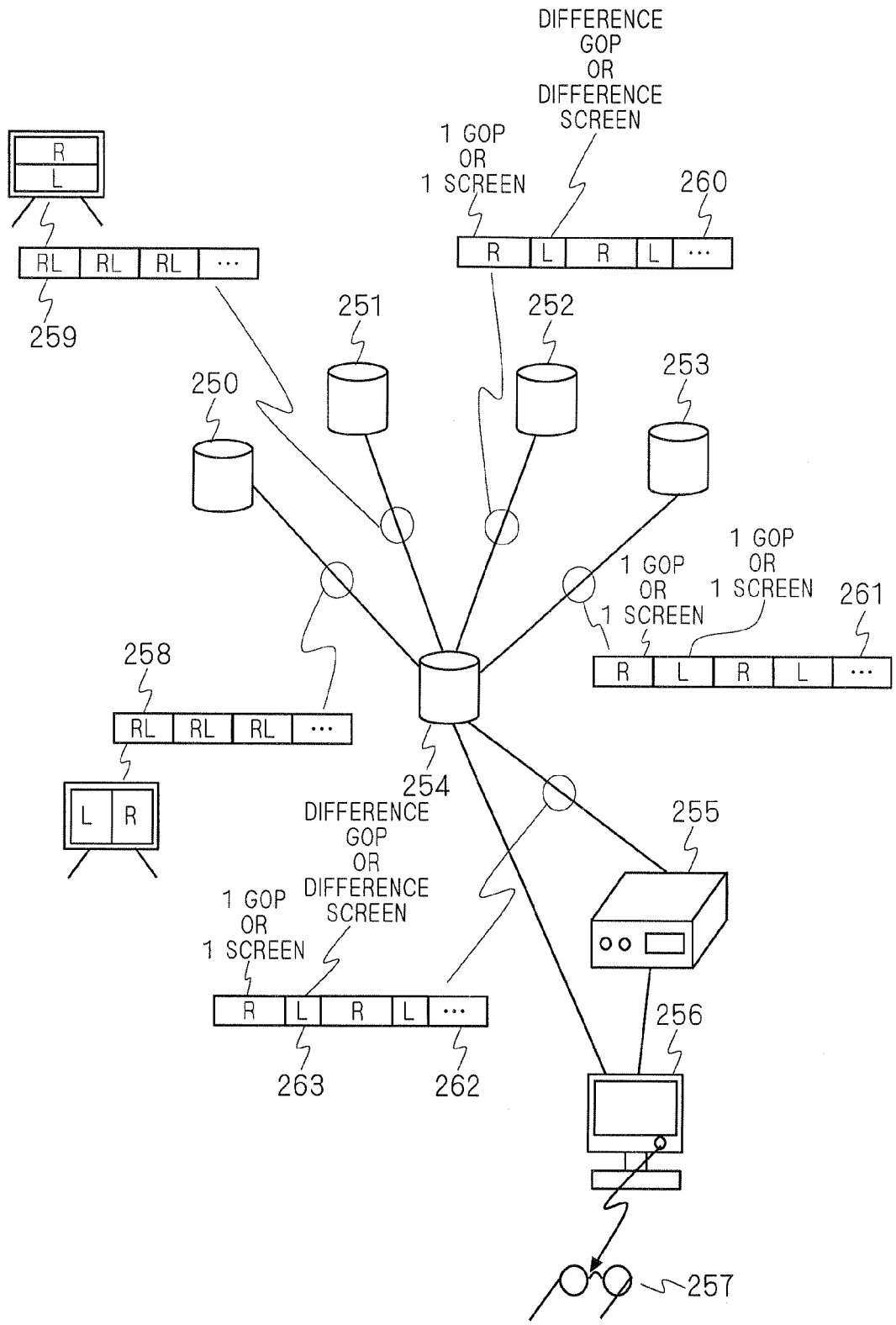
FIG. 41 is a figure for illustrating a stereoscopic viewing system with a network according to a fifth embodiment of the present invention.

FIG. 41 illustrates a system for stereoscopic viewing via network. FIG. 41 shows a group of a plurality of video distribution source servers 250, 251, 252, 253 which can be selected by the user, a transcoding server 254 which is arranged between the servers and a household AV apparatus and transcodes and relays video information provided by each of the video distribution source servers, a player or recorder 255 capable of reproducing stereoscopic video, a TV 256 capable of stereoscopic viewing, eyeglasses 257 for stereoscopic viewing, stereoscopic video signal 258, 259, 260, 261 transmitted from the video distribution source server, a right-eye video R, a left-eye video L, stereoscopic video information 262 distributed by the transcoding server, and a left-eye video 263 having been subjected to differential compression of right and left videos. The stereoscopic video information is stereoscopic video distribution contents that can be viewed as stereoscopic videos by using a flat video constituted by only one of the left-eye video and the right-eye video and information about a video for the eye opposite to the flat video.

FIG. 42 shows a viewing selection screen at a time of network viewing. FIG. 42 shows a title 264, a content 265, and identification information 266 indicating whether the content is 3D or 2D.

FIG. 43 shows a method for downloading stereoscopic widget information from a network and displaying the widget information on a TV screen. FIG. 43 shows a signal format 267 of OSD data downloaded from the transcoding server 254, a format 268 including positional information in a depth or protruding direction added to intra-frame OSD information, a format 269 in which the OSD itself serves as stereoscopic video information of the right eye and the left eye, and a widget 270 three-dimensionally displayed on a TV screen. When the widget information is downloaded, a widget information distribution request is output to the transcoding server 254, and the widget information 270 viewable as stereoscopic video in the transcoding server 254 is distributed, as an OSD signal format 267 capable of stereoscopic display, to a player and the like capable of stereoscopic viewing.

With the above configuration, stereoscopic widget distribution from the server can be carried out according to the TV viewing environment. Therefore, viewing can be carried out effectively according to the situation of stereoscopic video contents.

Subsequently, the embodiments according to the present invention will be described with reference to the figures. You-tube and the like, which has been widely used in the PC field, is designed to require a high performance CPU of a personal computer and the like in viewing the contents. Therefore, even though content distributers use different types of distribution formats of video, users can taken care of the formats by downloading and installing necessary decoding programs via network. However, most of the generally-available audiovisual apparatuses are equipped with low performance CPUs, and further, the user does not like to take the trouble to download necessary software for decoding. Accordingly, such audiovisual apparatuses is equipped with a dedicated decoder or a decode processing program, and is configured to connect to only services that can be handled by this decode processing program. Therefore, it is necessary to take care of different decode processings and different user interfaces.

In view of such circumstances, in the stereoscopic video viewing system of FIG. 41, the stereoscopic reproducing player or stereoscopic video recorder 255 checks, by way of a HDMI cable, whether the TV that the user watches (from the outside) is a stereoscopic video-enabled apparatus or not. Subsequently, when the TV is determined to be a stereoscopic video-enabled apparatus (capable of stereoscopic viewing), the stereoscopic reproducing player or stereoscopic video recorder 255 instructs the transcoding server 254 to transmit a content menu including stereoscopic videos. In this embodiment, even when the video distribution source servers 250 to 253 distribute videos in different types of video distribution formats (a case where the formats are different as shown by the stereoscopic video information 258 to 261 in FIG. 41), the transcoding server 254 once causes format conversion means to convert the formats (convert the formats as shown by the stereoscopic video information 262). Therefore, the transcoding server 254 redistributes the stereoscopic video information in the same format as the format used to record an optical disk, as described in, e.g., the second to the third embodiments, which is a video signal format that can be decoded by a player or a TV capable of stereoscopic viewing. As a result, the stereoscopic video information can be viewed by using a medium reproduction decoder circuit or a decode program originally arranged in a cheap player or recorder.

Further, in the present embodiment, any one of the right-eye video and the left-eye video, as described in, for example, FIG. 31 to FIG. 32 of the third embodiment, is adopted as a reference 2D video, and the present embodiment employs a signal method for performing further compression by calculating a difference between the video of the above 2D video side and the video for the eye opposite to the above 2D video. This method is a stereoscopic video signal format (compassion method) for recording a storage medium as described in the third embodiment. However, the transcoding server 254 of FIG. 41 converts (transcodes) the video contents provided by any one of the video distribution source servers into a stereoscopic image signal format for recording to a medium such as an optical disk, and the transcoding server 254 can distribute the converted video contents. Therefore, the player or recorder 255 can allow the user to view stereoscopic reproduction. Even a player for reproducing stereoscopic video such as an optical disk can decode the stereoscopic video provided by the server.

In this embodiment, one of the video distribution source servers of FIG. 41 may transmit 2-channel camera video of a stereo camera each in a compressed format of MPEG2 or H.264. In this case, the transcoding server 254 obtains difference between the right and left videos as described in the third embodiment of the present invention, so that the video information is converted into a format in which one of the channels of the video information is further compressed, and the compressed video information is transmitted to the player or recorder 255. In this case, since this difference between the right and left transmitted videos is obtained, the one of the channels of the video information is further compressed into video information of the same type of compression as the video format recorded to, for example an optical disk. Therefore, the same decoder circuit or decode software as that for an optical disk can perform reproduction processing of this further compressed video information.

The reason why attention is usually not paid to this kind of difference of the video format is that a storage medium needs to put data into a limited medium capacity and accordingly needs to select the compression method of the highest efficiency. In contrast, in exchange of information via a server, it is not necessary to pay attention to the capacity limitation, and for example, the right and left videos may be distributed in an ordinary image compression method as they are. However, as the variety of video distribution formats increase, the decoder side bears a heavier burden. In this circumstance, a single format or a fewer formats are employed by using the transcoding technique as described in the present embodiment, so that a TV or player equipped with a decoder having a cheap CPU can reproduce video information.

Not only the video and audio format but also OSD information and subtitle information may be redistributed in the same format as the format for recording a medium, so that the user can operate the same user interface as that used during reproduction of a disk medium.

When the stereoscopic player or stereoscopic recorder 255 of FIG. 41 is not a reproduction-only machine but is a recorder, the recorder 255 can directly download and record the stereoscopic video without converting into a medium-recording format (FIG. 43). However, needless to say, even when the stereoscopic video is downloaded to this recorder or directly watched on a player or TV, the video signal for network distribution is always encrypted to protect network contents. It is needless to say that, because of this encryption, exchange of keys and authentication operation are needed to be performed between the servers. There is an advantage in that download-recording is less likely to be affected by the environment of the network circuit. Therefore, a smooth reproduction without any interruption can be performed during reproduction, even when the video signal is interrupted in the middle due to the circuit environment. Further, as a result of these advantageous conditions, the download-recording allows the bit rate of the distribution to be set to a higher value as compared with only the reproduction.

As described in the second embodiment, when the stereoscopic video includes a plurality of angle videos, the amount of video data during reproduction becomes enormous. When a storage medium stores this kind of multi-angle stereoscopic videos, not so many angles can be stored in the storage medium due to the capacity limitation of the storage medium. However, when the multi-angle stereoscopic videos are stored on a server, much angle information can be stored on the server without almost any limitation. For example, when angel switching operation is performed with multi-angle switching means such as a TV remote controller and the like, the player or decoder transfers angle switching instruction information to the transcoding server, and a video data angle is switched on the server. Thereupon, format conversion is carried out, and the converted stereoscopic videos can be redistributed to the player or recorder. Needless to say, when the transcoding server needs to carry out format conversion, the video distribution source server first redistributes videos of different angles, and the redistributed stereoscopic videos are subjected to format conversion by the transcoding server. Thereafter, the converted stereoscopic videos are distributed to the player or recorder.

With this configuration, even a stereoscopic video having a large amount of information with a plurality of pieces of angle information can be stored on the server and can be viewed, without any capacity limitation of an optical disk medium and the like. Further, in response to an angle switching request given by the user (the outside), the angle of the stereoscopic video content stored in the server can be switched, and thereupon, the stereoscopic video content can be distributed.

The stereoscopic viewing-enabled player or the stereoscopic viewing-enabled TV preferably has a video distribution buffer having a capacity larger than a total time of a communication time between the transcoding server and the video distribution server, a switching time of the video distribution server to a video of another angle, a format conversion processing time taken in the transcoding server, and a communication time between the transcoding server and the stereoscopic viewing-enabled player or the stereoscopic viewing-enabled TV.

When the above multi-angle is moved in order (clockwise or counter-clockwise) by angle sequential switching means, an object may be rotated, and may be viewed from a different angle, as described in the second embodiment. At this occasion, the sequential switching of the angles may operate in an awkward manner, because there are usually a time delay between the player or decoder and the server and a time delay between the video distribution source server and the transcoding server. In this case, a continuous operation for continuously moving, with one command, an angle video having a plurality of rotational angles is defined as a command that can be operated in a single operation. When this is transmitted to the transcoding server or the video distribution source server, the continuous change of angle can be achieved on the video distribution system of the server, and a smooth movement can be reproduced.

The recorder or player 255 of FIG. 41 may not be arranged, and instead, the TV may be directly connected to the network. In this case, the TV 256 of FIG. 41 should be implemented with a decoder circuit or decoder software possessed by the player 255. In this case, however, it is necessary to perform decode processing on an LSI in the TV, and the decode processing may fail to catch up with the process depending on the processing speed of the LSI. If the decode processing fails to catch up, the player or recorder may be externally attached, so that the processed videos are viewed after the player or recorder performs decode processing.

In a network viewing screen of FIG. 42, after the apparatus authentication between the transcoding server and the player or recorder is finished, the player or recorder causes determination means to determine that the player or recorded is connected with a stereoscopic viewing-enabled TV on the basis of flag information and the like of the HDMI cable (the determination information about this viewing environment is stored in holding means). Thereafter, the player or decoder causes transfer means to transmit (transfer), to the transcoding server, viewing environment determination information indicating that the player or decoder is 3D viewing environment. In a video distribution menu made of a flat video previously prepared in the transcoding server, a suitable selection menu is transferred to the player or recorder. In a case of only the flat viewing, a viewing selection menu of the flat videos are transferred. In a case where the 3D viewing-enabled environment is available and where the stereoscopic viewing is also performed, a selection menu including 3D contents and 2D contents in a mixed manner is transferred. These selection menus are transferred as a list in which the flat vides and the stereoscopic videos can be distinguished from each other. For example, a remote controller of the TV, the user selects a desired content by pressing down a menu highlighted as a selection. Therefore, the content menu screen is distributed according to the viewing environment, and the user can select a content that the user wants to view from among the contents.

At this occasion, when the 3D content is selected, it may be necessary to display, on the TV screen, a message prompting the user to do necessary steps for viewing the contents, such as "please wear eye glasses."

Sixth Embodiment

Subsequently, conversion process from 2D video to 3D performed in the transcoding server, where the stereoscopic image is not distributed in advance, will be described with reference to FIG. 44.

Figure 44:
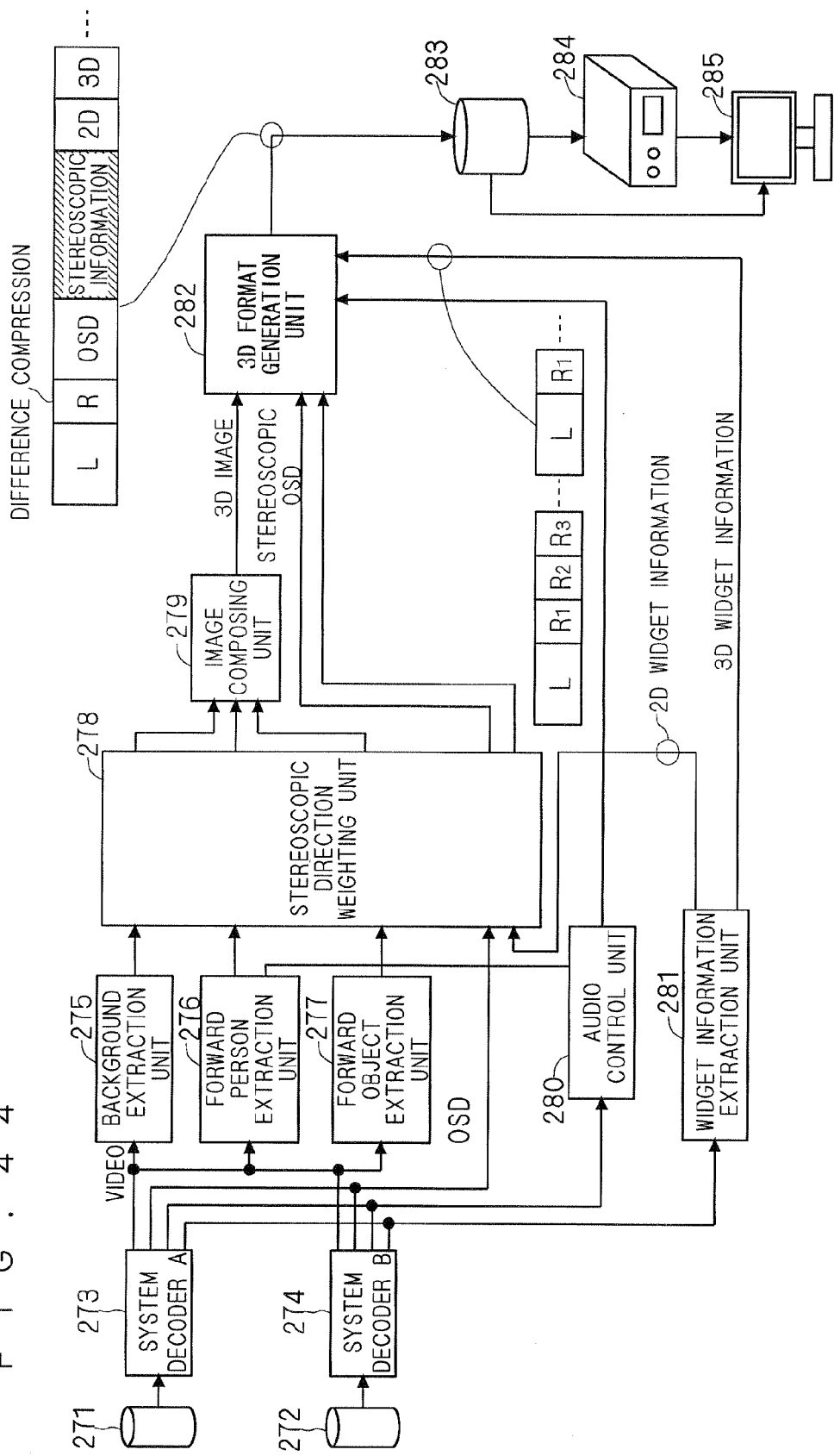
FIG. 44 is a block diagram showing a stereoscopic video viewing system according to a sixth embodiment of the present invention.

FIG. 44 shows 2D video distribution servers 271, 272 serving as video distribution sources, system decoders 273, 274 for separating a signal provided by the video distribution servers 271, 272 into a video and audio/supplementary information, a background extraction unit 275 for extracting only background information from video signals output from the system decoder 273 and the system decoder 274, a forward person extraction unit 276 for extracting a person in proximity to this side from the video signal outputs provided by the system decoder 273 and the system decoder 274, a forward object extraction unit 277 for extracting a thing, a house, and other objects on this side from the system decoder 273 and the system decoder 274, a front/back extraction and stereoscopic direction weighting unit 278 for extracting front/back relationship from how the extracted objects are overlapped with each other and weighting the extracted objects in the stereoscopic direction, a video composing unit 279 for compositing a video from outputs provided by the front/back extraction and stereoscopic direction weighting unit 278, a sound-image control unit 280 for controlling sound-image according to the outputs provided by the system decoder 273, the system decoder 274, and the forward person extraction unit 276, a widget information extraction unit 281 for extracting widget information from the outputs provided by the system decoder 273 and the system decoder 274, a 3D format generation unit 282 for generating a 3D format from the 3D widget information of the widget information extraction unit 281, the output provided by the sound-image control unit 280, the output provided by the front/back extraction and stereoscopic direction weighting unit 278, and the video composing unit 279, a transcoding server 283 receiving the output provided by the 3D format generation unit 282, a stereoscopic reproduction BD player 284 for communicating with the transcoding server 283, and a 3D-enabled television set 285 connected with the stereoscopic reproduction BD player 284. In this system, the 3D format generation unit 282 generates stereoscopic video information from flat video information obtained by the system decoders 273 and 274, and video information corresponding to the content of the video requested according to the viewing environment of the television set 285 is provided via the transcoding server 283.

Figure 45:
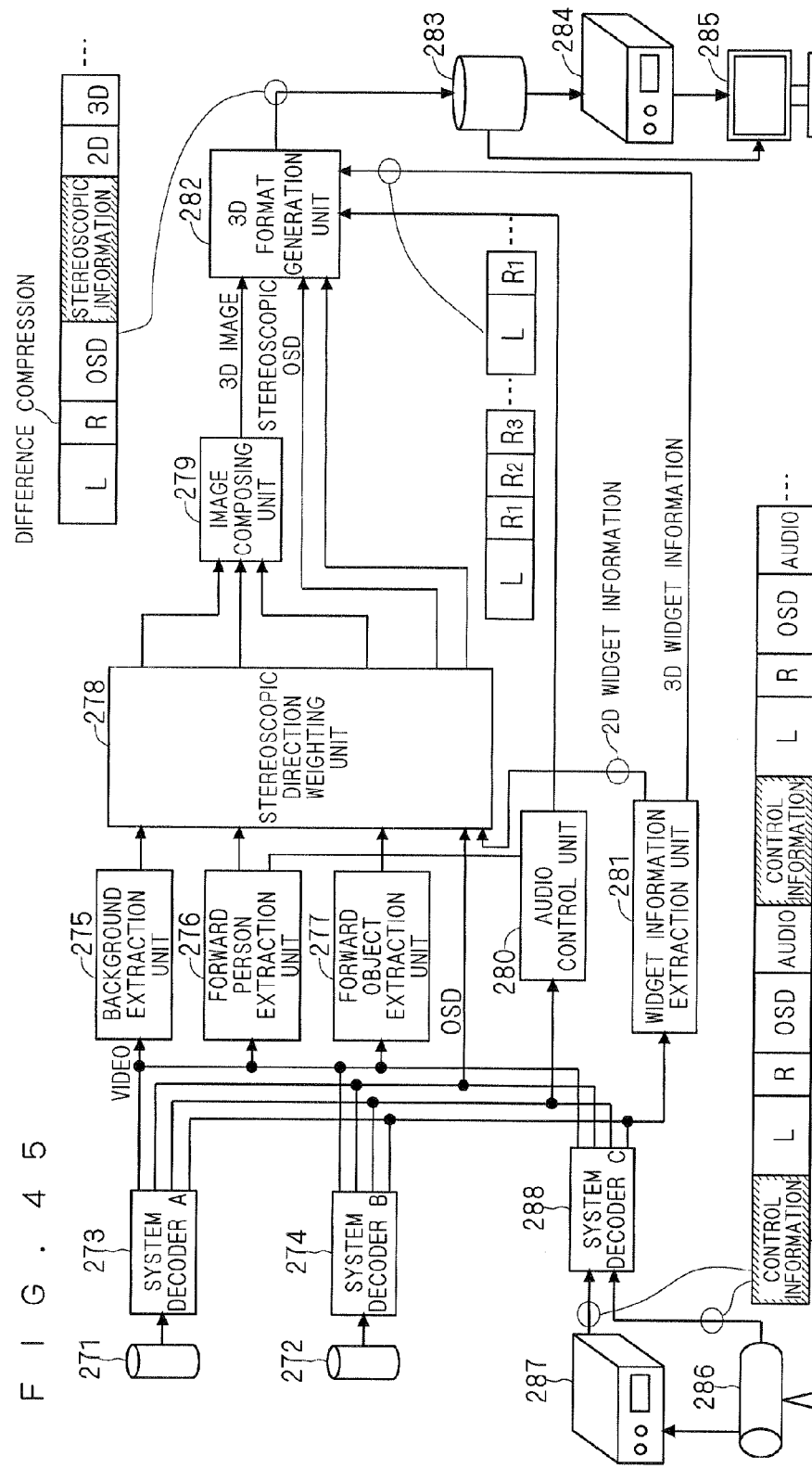
FIG. 45 is a block diagram showing a stereoscopic video viewing system according to the sixth embodiment of the present invention.

FIG. 45 shows a system for distributing, to the transcoding server, an external stereoscopic movie and stereoscopic video recorder information storing the video taken in the stereoscopic movie, so that they can be viewed later. FIG. 45 further shows a stereoscopic movie 286, a stereoscopic recorder 287, and a system decoder C288 for separating a signal provided by the stereoscopic movie or the stereoscopic recorder into a video and audio/supplementary information. The above 3D format is generated from not only the video information provided by the system decoders 273 and 274 but also the video information provided by the system decoder 288.

Figure 46:
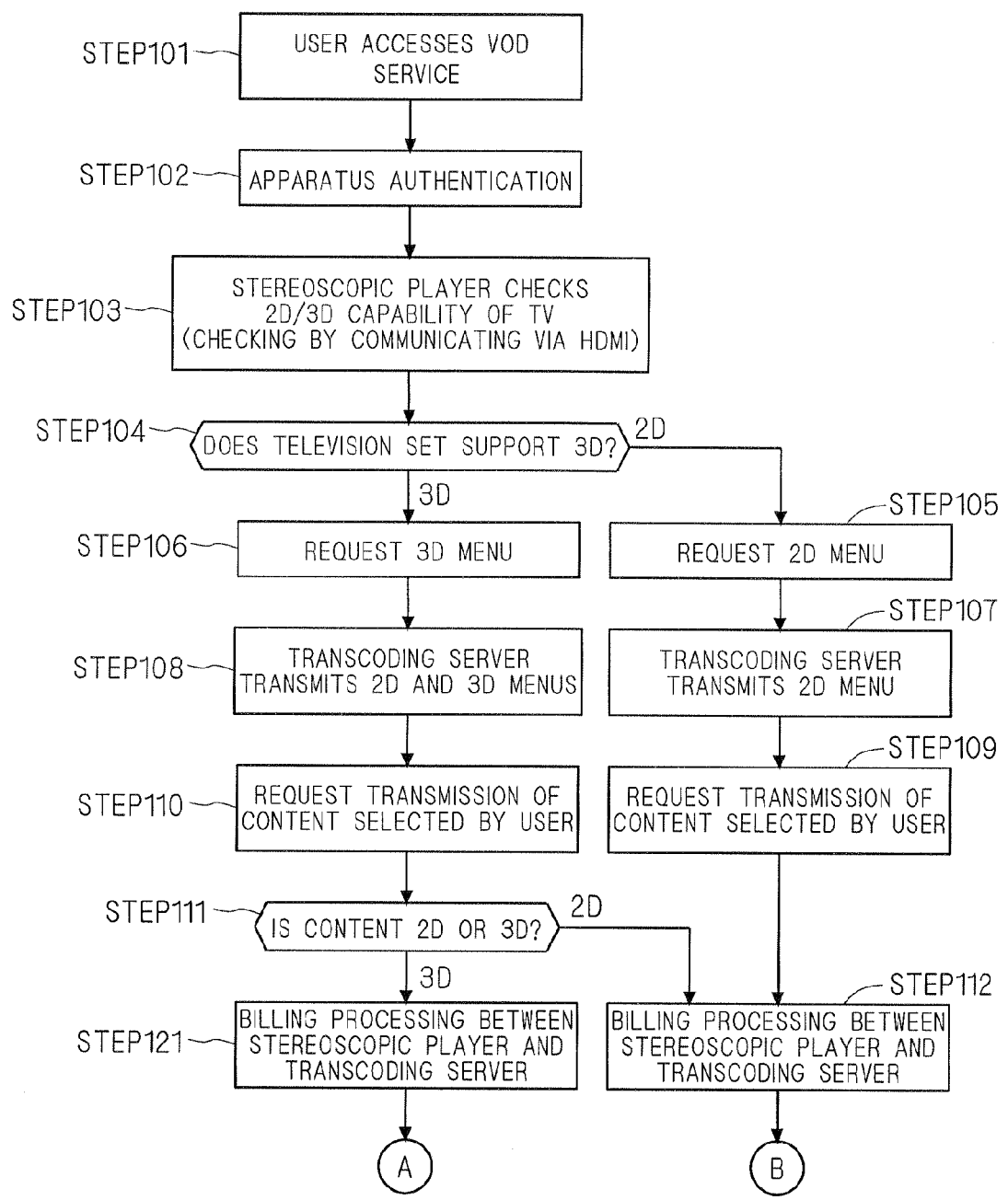
FIG. 46 is a figure for illustrating a flow of a stereoscopic video viewing according to the sixth embodiment of the present invention.
Figure 47:
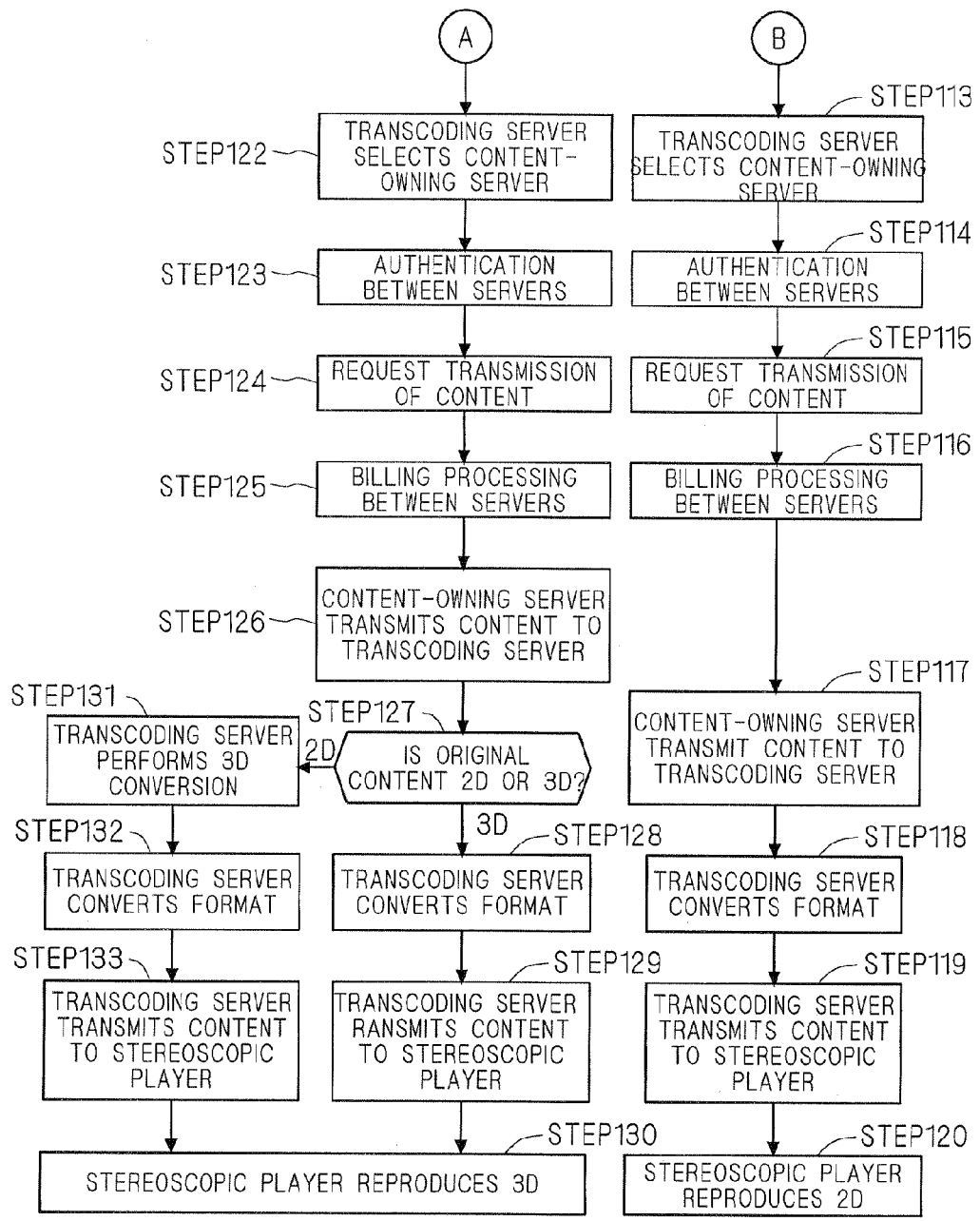
FIG. 47 is a figure for illustrating a flow of a stereoscopic video viewing according to the sixth embodiment of the present invention.
Figure 48:
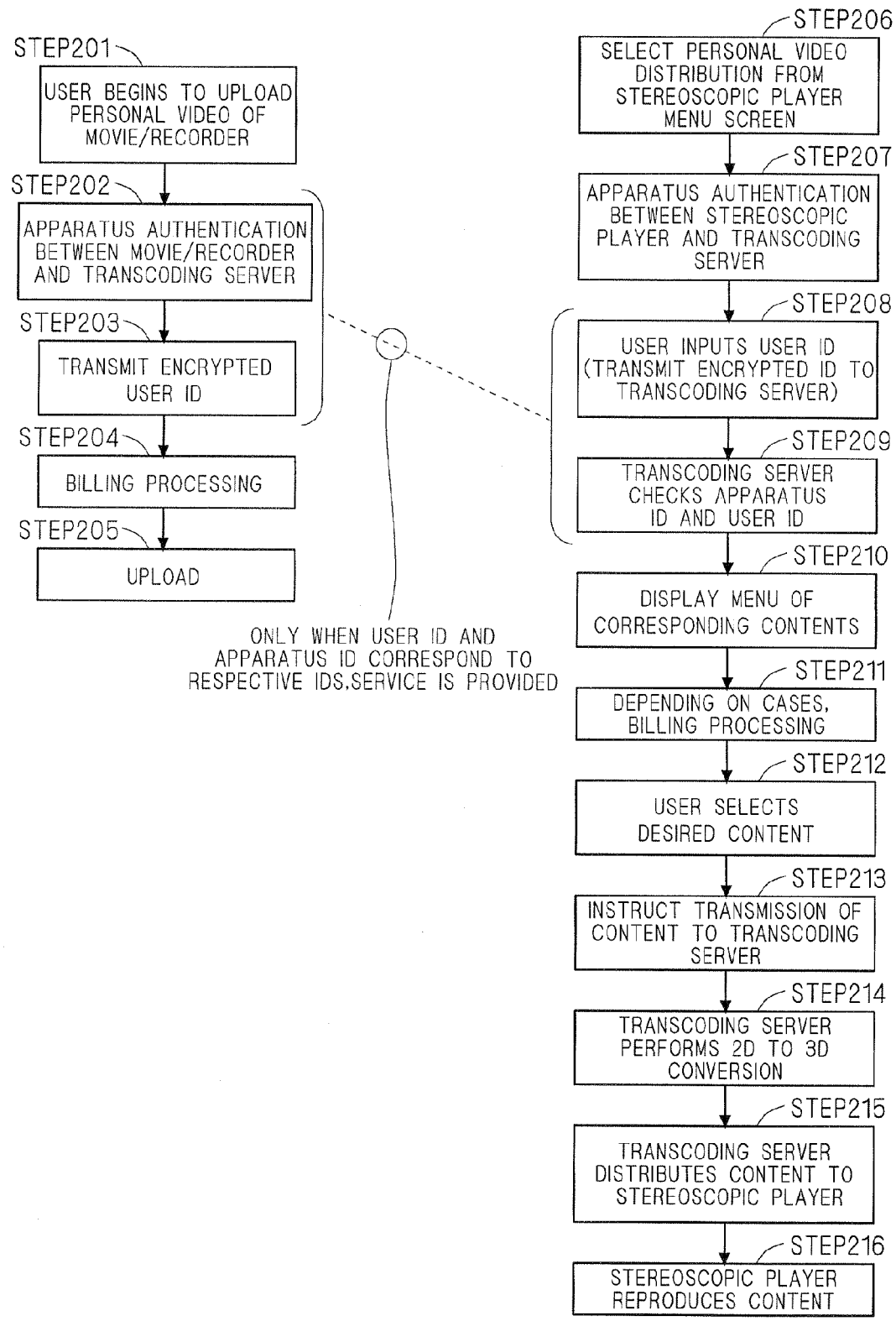
FIG. 48 is a figure for illustrating a flow of a stereoscopic video viewing according to the sixth embodiment of the present invention.

FIG. 46 and FIG. 47 show a flow of operation of FIG. 44. FIG. 48 is a flow illustrating a system for allowing upload of private videos such as movies from a recorder to the server, providing conversion service from 2D to 3D, and allowing the user to view the videos.

In FIG. 44, FIG. 46, and FIG. 47, operation will be explained.

First, the user controls the TV 285 by operating a remote controller and the like, switches to a reproduction screen of the stereoscopic BD player 284, and selects a VOD viewing service menu including interesting movies and the like (STEP 101). Subsequently, the stereoscopic player 284 performs apparatus authentication with the transcoding server 283 (STEP 102).

After the apparatus authentication, the stereoscopic player 284 checks information about the viewing environment by communicating via the HDMI cable (STEP 103). Whether the TV 285 can handle 3D or not is determined (STEP 104). When the viewing environment is 2D environment, the stereoscopic player 284 requests the transcoding server 283 to provide the 2D menu (STEP 105). When the viewing environment is 3D environment, the stereoscopic player 284 requests the transcoding server 283 to provide the 3D menu including 2D and 3D in a mixed manner (STEP 106).

When the transcoding serve 283 receives the request for the 2D menu from the stereoscopic player 284, the transcoding server 283 distributes the 2D menu to the stereoscopic player 284 (STEP 107). When the transcoding serve 283 receives the request for the 3D menu, the transcoding server 283 distributes the 3D menu including 2D and 3D in a mixed manner to the stereoscopic player 284 (STEP 108).

Subsequently, the user selects a viewing content from the distributed menu (STEP 109, STEP 110). Whether the selected content is a 2D content or a 3D content is determined (STEP 111). When the 2D content is selected, the stereoscopic player 284 first performs billing processing with the transcoding server 283 (STEP 112). Subsequently, the transcoding server 283 selects a content-owning server owning the selected content (STEP 113).

A server authentication is performed between this content-owning server and the transcoding server 283 (STEP 114). After the authentication, a content transmission request is placed (STEP 115), and billing authentication between the servers (second billing processing) is performed (STEP 116). As a result of this billing authentication between the servers, a portion of the amount that the user paid is taken as the expense of the transcoding server side, and the remaining amount is returned back to (distributed to) the content provider.

Subsequently, a desired content is transmitted from a content providing server to the transcoding server 283 (STEP 117). The trans coding server 283 performs format conversion processing into a form that can be reproduced by the stereoscopic player 284 (STEP 118). The converted stream is transmitted to the stereoscopic player 284 (STEP 119). The stereoscopic player 284 performs 2D reproduction processing (STEP 120).

On the other hand, when the user selects a 3D content, the stereoscopic player 284 first performs billing processing with the transcoding server 283 (STEP 121). Subsequently, the transcoding server 283 selects a content-owning server owning the desired content, in the same manner as the selection of the 2D content (STEP 122). Then, a server authentication is performed between the servers (STEP 123). Then, a content transmission request is placed (STEP 124), and billing processing is performed between the servers (STEP 125).

Subsequently, the content-owning server transmits the content to the transcoding server 283 (STEP 126). Whether the transmitted content is a 3D video or a 3D video is determined (STEP 127). When the content is distributed as a stereoscopic video, the transcoding server 283 performs format conversion into a form that can be reproduced by the stereoscopic player 284 (STEP 128). The converted stream is transmitted to the stereoscopic player 284 (STEP 129). The stereoscopic player 284 performs 3D reproduction processing (STEP 130).

In this format conversion, for example, any one of right and left images is compressed with difference between the right and left images, as described in the fifth embodiment, and the converted stream is distributed in the same signal format as the 3D contents recorded onto a medium.

Even when the 3D content is selected, and if the content-owning server includes only 2D contents, the transcoding server 283 causes conversion means to perform conversion from 2D to 3D (STEP 131). Then, the transcoding server 283 performs format conversion into a form that can be reproduced by the stereoscopic player 284 (STEP 132). The converted stream is transmitted to the stereoscopic player 284 (STEP 133). The stereoscopic player 284 performs 3D reproduction processing (STEP 130).

In this embodiment, the distributed stream is divided by the system decoder 273 and the system decoder 274 into a video signal, audio, widget information, and others. Subsequently, background section extraction means and forward video separation means extract, from the video signal, a background section, a person section on this side, a thing, a house, an object section on this side, and the like, and stereoscopic-direction position weighting means determines the forward/backward relationship in the stereoscopic direction and the amount of protrusion and depth of the above extracted objects, and arranges the determined information as stereoscopic video information.

Especially, with the forward/backward relationship in the stereoscopic direction and the amount of protrusion and depth, the sizes of objects and persons are determined based on the fact that a larger object is located close to this side, the forward/backward relationship is found by analyzing the movement of the video at an overlapping section, and positioning in the stereoscopic direction is performed by analyzing the fineness of the background in which finer section is estimated to be farther away. Subsequently, these stereoscopic video parts are once composed as a video signal, and thereafter, are made into a format along with the sound and the widget information. The video signal made into the format is distributed to the stereoscopic player in the same format as that of the 3D signal originally stored in the content server, and the stereoscopic video is reproduced.

In the above description, only the video signal is distributed upon being converted into three-dimension. However, the sound-image localization may be changed, so that the conversion processing into the stereoscopic audio signal may be performed. Further, the widget display information may be displayed upon being converted into three-dimension.

Generally-used widget information includes weather forecast marks, quick report of baseball match, news, and stock prices, which, e.g., may be overlaid as small images on the TV screen. Alternatively, the screen may be divided, and the widget information may be displayed in the region other than the content information screen. In this case, the widget information distribution request is output to the transcoding server, and a server having the desired widget information is selected from among the plurality of video distribution servers. Then, a second stereoscopic viewing content including a combination of the stereoscopic viewing content and the widget information is generated and redistributed, in such a manner that the widget information is overlaid or displayed in a divided section.

When the widget information is displayed during stereoscopic video viewing, how the widget information is displayed in the stereoscopic direction is essential, and therefore, it is desirable that the position in the stereoscopic direction can be changed. Accordingly, a position in the stereoscopic direction may also be added to the two-dimensional widget information as described in the embodiments of the present invention, and the two-dimensional widget information thus added may be transmitted as stereoscopic OSD information from the transcoding server. In this case, the widget distribution from the server allows stereoscopic widget distribution according to the viewing environment of the TV. Further, the position of the widget information of the stereoscopic video can be changed in the stereoscopic direction. Therefore, the widget position can be selective effectively according to the situation of the stereoscopic video contents, and the widget position may be changed to a deep position from the display panel so that eye fatigue is less likely to occur.

In this case, an offset in the depth or protruding direction may be applied to the two-dimensional image information, or the two-dimensional information may be transmitted as stereoscopic information of right and left videos (one of which is used as reference, and the other is subjected to difference compression) just like the three-dimensional image, so that the two-dimensional image information can be transferred as a signal format that can be decoded by the player and the TV. Alternatively, the transcoding server may overlay the two-dimensional image information on the stereoscopic video content in advance, and the overlaid stereoscopic video information may be transferred. In this case, the player and the TV does not need any special decoder for widget display, and therefore, the CPU load for the widget display can be reduced, but every time, e.g., the arrangement on the screen is changed, an instruction for the change of display position needs to be transmitted to the transcoding server, thus causing a time delay due to the access.

As described above, the transcoding server once receives the widget information, and the widget information distribution request is output to the transcoding server. Therefore, widgets of a plurality video distribution servers, i.e., widget service distribution sources, can be selected or used at a time, and the widget of the two-dimensional video can be converted into the OSD signal format that can be displayed three-dimensionally.

Further, the video distribution is not necessarily limited to the one from the content-owning server. Alternatively, 2D videos taken by a generally-available movie and data in a household recorder apparatus that are taken with a movie may be uploaded to the transcoding server, and the conversion processing from 2D to 3D may be performed in the transcoding server, so that the converted videos can be viewed on the stereoscopic player. In this case, a flat-to-stereoscopic conversion function in the transcoding server is used, and the stereoscopic video can be enjoyed. In addition, stereoscopic-direction-position variation input means for varying the degree of three-dimensionality sets the degree of three-dimensionality according to user operation, and a stereoscopicdirection-position variation control command can be transmitted. Therefore, it is possible to increase the stereoscopic sensation to increase the realistic sensation or reduce the stereoscopic sensation to reduce the amount of protrusion to a safe range that is not harmful to human eyes.

In this embodiment, the conversion from flat video into stereoscopic video is achieved by performing the steps of causing a image processing unit for extracting background component of the image, persons, objects on this side to extract individual image sections, causing stereoscopic direction weighting means to respectively give weights to them in the stereoscopic direction, and composing the images. Since the weighting in the stereoscopic direction in this stereoscopic conversion can be changed, the videos can be adjusted according to the health condition of the viewer, the size of the screen, a preferred realistic sensation, and the like, by changing the amount of depth and protrusion. It should be noted that this variation of the stereoscopic position, the weighting in the stereoscopic direction, and the composition of the widget information can also be performed in the same manner on the stereoscopic information obtained by converting the flat video and composing the videos.

Which image piece is located on this side may be determined by looking at how the extracted image sections are overlapped with each other according to the movement of the image, and the position in the stereoscopic direction can be determined. A 3D format conversion unit converts the stereoscopic video thus generated into a video format that can be reproduced by the player and the TV, and the converted video is distributed. The use of this method for arranging the position in the stereoscopic direction based on image piece extraction enables changing the degree of three-dimensionality by dividing the video into image pieces again and changing the weighting, even when the original video is stereoscopic video. Especially, when the original is stereoscopic video, there is parallax for each pixel, and the position of each pixel in the stereoscopic direction is identified. Therefore, the positions of these pixels can be easily changed in the stereoscopic direction according to, for example, the method described in the fourth embodiment.

Further, at this occasion, the apparatus authentication is performed between the movie, the recorder, and the transcoding server, and the user transmits, during the apparatus authentication, a user ID number obtained by subscribing to a membership in advance, so that the user can receive this stereoscopic conversion service. Regarding the belling processing, at the time of subscribing to the membership, the user may pay a fee for the stereoscopic service for a certain period or for a certain amount of data. Alternatively, the payment processing may be performed every time the user uploads data to the server.

These private 2D videos uploaded by the user is identified by the registered ID number of the user. When the user views a video, the stereoscopic player confirms, in the apparatus authentication, that the user provides the same ID number (i.e., the user enters the ID again). When the user is determined to have the same ID, the stereoscopic reproduction starts. At this occasion, the user enters the user ID to the stereoscopic player during stereoscopic viewing, and the authentication of the user ID and the apparatus ID is performed, so that the private information can be protected, and the user views only the videos uploaded by the user. Still further, a pass code for disclosure may be further added to each of the private videos uploaded by the user, so that this pass code for disclosure may be transmitted via, e.g., an e-mail to other people such as acquaintances, family members, and friends so as to allow the other people to view the private videos. The ID registered during uploading may be set to the stereoscopic-enabled player or the TV in advance, so that the registered ID may be automatically authenticated during the apparatus authentication.

Subsequently, the flow of recording, uploading, conversion, and reproduction will be explained with reference to the flowchart of FIG. 48. Specifically the flow is as follows. The 2D videos taken with a movie 286 and data in the household recorder apparatus 287 storing the videos taken by the movie 286 are uploaded to the transcoding server 283. Then, conversions means performs conversion processing from 2D to 3D, and the user views the videos on the stereoscopic player.

First, the user gives an instruction to upload a video taken with a movie and the like to the transcoding server directly or via a terminal connectable to a network such as a recorder apparatus and the like (STEP 201). The movie, the recorder apparatus, or the like performs the apparatus authentication with the transcoding server upon the upload instruction given by the user (STEP 202). After the apparatus authentication, the movie, the recorder apparatus, or the like transmits an encrypted user ID to the transcoding server (STEP 203), and performs the billing processing with the transcoding server (STEP 204). Upon completion of the billing processing, the upload of the video starts (STEP 205). The flat-to-stereoscopic conversion function of the transcoding server converts the uploaded video into a stereoscopic video.

Figure 49:
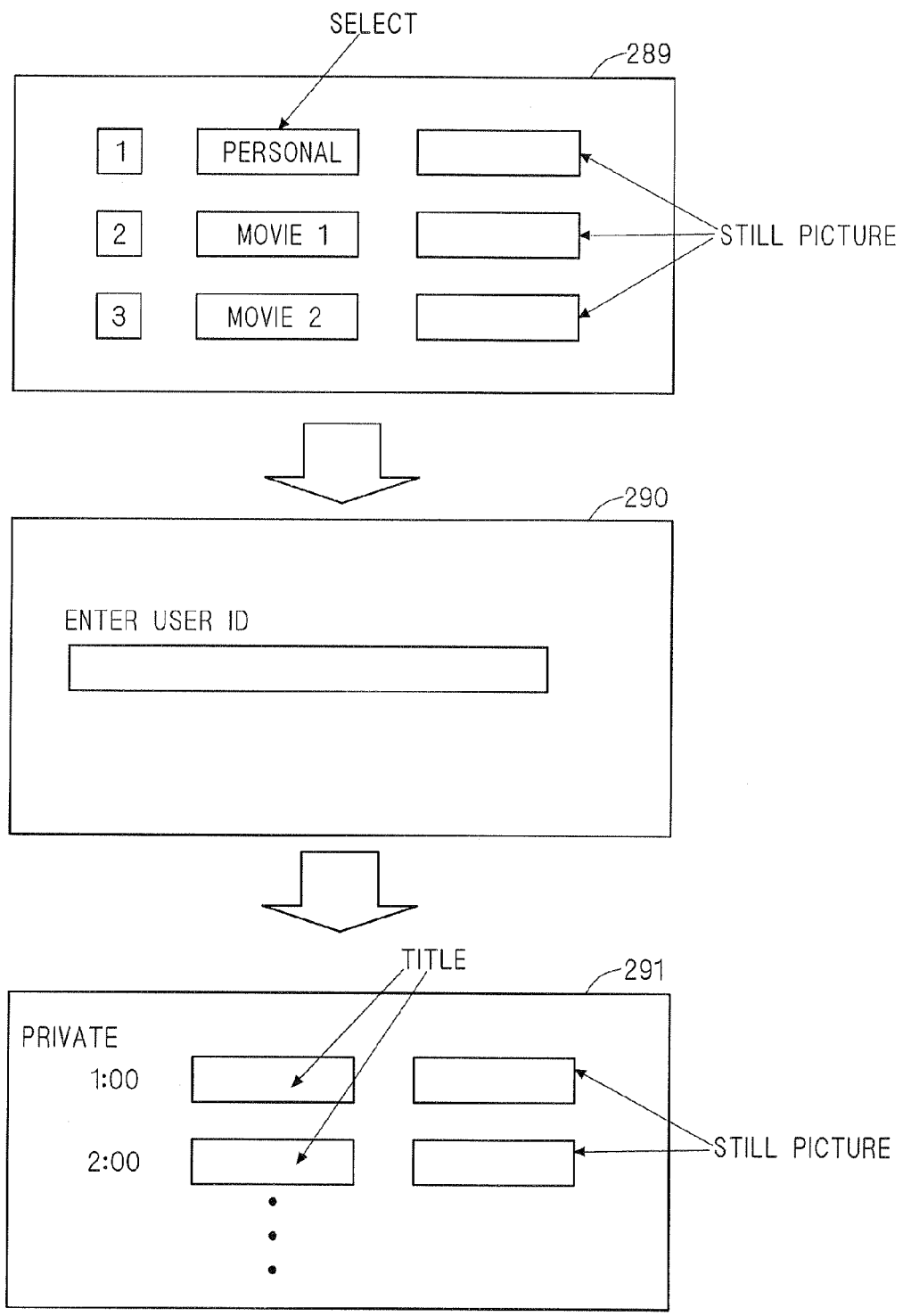
FIG. 49 is a figure for illustrating a stereoscopic video viewing according to the sixth embodiment of the present invention.

Subsequently, the flow from downloading of the video to viewing of the video will be explained with reference to FIG. 48 and FIG. 49. In downloading of the video, the user downloads the video from the transcoding server.

First, the user selects a personal video distribution from the menu screen 289 on the stereoscopic player (STEP 206). When the user selects the personal video distribution, the stereoscopic player performs the apparatus authentication with the transcoding server (STEP 207). After the apparatus authentication, the stereoscopic player displays a user ID input screen 290, and the user inputs the user ID (STEP 208). When the user inputs the user ID, the stereoscopic player transmits the encrypted user ID to the transcoding server. The transcoding server checks the apparatus ID of the stereoscopic player and the user ID, and where the apparatus ID and the user ID are determined to correspond to an apparatus ID and a user ID which are held in the corresponding content on the server, the information about the corresponding content is transmitted to the stereoscopic player (STEP 209). The stereoscopic player displays information about the received corresponding content on a personal content selection screen 291 (STEP 210). At this occasion, if necessary, the billing processing is performed between the stereoscopic player and the transcoding server (STEP 211).

The user selects a desired content from the personal content selection screen 291 (STEP 212). The stereoscopic player requests the transcoding server to transmit the selected content (STEP 213). At this occasion, the billing processing may be performed with respect to the content selected by the user. The transcoding server may perform flat-to-stereoscopic conversion, and converts the selected content into a stereoscopic video (STEP 214). The conversion into the stereoscopic video may be performed in advance. The transcoding server converts the selected content into the stereoscopic video, and distributes the converted stereoscopic video to the stereoscopic player (STEP 215). Therefore, the stereoscopic player reproduces the stereoscopic video distributed from the transcoding server, and the user can enjoy the video taken with the movie as the stereoscopic video (STEP 216).

The method for converting the video into 3D video and distributing the 3D video has been described hereinabove.

However, the player reproducing the movie may be an ordinary 2D reproducing player. In this case, 3D conversion service is not provided, and only the file storage function service is provided. In this case, the service merely provides, at the server side, the transcoding processing for converting videos into the format that can be reproduced by the player. Even when the 3D conversion is not performed, this can be sufficiently served as a so-called storage service. In this case, distributed contents including only 3D videos are distributed upon being converted by the transcoding server into 2D video format, so that likewise an ordinary 2D reproducing player can reproduce the videos.

As described above, the ID is attached to private videos, and a person who uploads the private videos to the server is assumed to view the recorded images or the images whose copyright is owned by the very person. However, when the user records a broadcast program, uploads the program to the server, and permits other people to see the program, there arises a problem of copyright issue. In this case, with regard to personal contents such as movies, the following mechanism may be arranged: an encrypted key is embedded into videos on private video side by applying a digital watermark technique; and only the person who has the encrypted key overlaid on this image is allowed to permit distribution to other people via the transcoding server.

A stereoscopic video viewing system capable of viewing stereoscopic videos may be embodied using the stereoscopic video distribution content that is distributed by the stereoscopic video distribution system according to the fifth and sixth embodiments.

A stereoscopic video viewing method capable of viewing stereoscopic videos may be embodied using the stereoscopic video distribution content that is distributed by the stereoscopic video distribution method according to the fifth and sixth embodiments.

A stereoscopic video viewing apparatus capable of viewing stereoscopic videos may be embodied using the stereoscopic video distribution content that is distributed by the stereoscopic video distribution apparatus according to the fifth and sixth embodiments.

While the invention has been shown and described in detail, the foregoing description is in all aspects illustrative and not restrictive. It is therefore understood that numerous modifications and variations can be devised without departing from the scope of the invention.

What is claimed is:

1. A stereoscopic video distribution system for distributing, from a server, a stereoscopic video including a left-eye video and a right-eye video utilizing parallax video, comprising:
   a plurality of video distribution servers; and
   a transcoding server,
   wherein video content that contains said stereoscopic video is constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time,
   wherein said video information is a stereoscopic video distribution content that includes a flat video constituted by only one of the left-eye video and the right-eye video and enables viewing a stereoscopic video made using information about a video of the eye on the side opposite to the eye of said flat video,
   wherein said stereoscopic video distribution content is stored in said plurality of video distribution servers,
   wherein during video distribution, said stereoscopic video distribution content is distributed from one of the plurality of video distribution servers that has a desired content selected according to an external instruction,
   wherein said stereoscopic video distribution content to be distributed is once input to said transcoding server, and is subjected to a format conversion in said transcoding server, so that said stereoscopic video distribution content is made into a video signal format that can be decoded by a stereoscopic viewing-enabled player or a TV, and said converted stereoscopic video distribution content is redistributed to said stereoscopic viewing-enabled player or said TV,
   wherein a stereoscopic reproducing player executes a determination processing to determine, based on information provided by an HDMI cable, whether a TV setting permits viewing of the flat-video and whether the TV setting permits viewing of the stereoscopic video, and stores the determination result as viewing-environment determination information,
   wherein when said stereoscopic viewing-enabled player performs an authentication processing with said transcoding server, said viewing-environment determination information is transmitted via said HDMI cable,
   wherein when the flat video can be viewed, said transcoding server distributes a flat video viewing menu of a video distribution menu made of a flat video previously prepared,
   and wherein when the stereoscopic video can be viewed, said transcoding server distributes a viewing menu enumerating a content for stereoscopic video-viewing and a content for flat video-viewing, which are present as a list in a mixed manner, wherein in the list, the content for stereoscopic video-viewing and the content for flat video-viewing can be distinguished from each other.

2. The stereoscopic video distribution system according to claim 1,
   wherein said stereoscopic video distribution content is distributed upon being transcoded by said transcoding server, so that the stereoscopic video signal format having been distributed has the same compression structure as a stereoscopic video signal format recorded on a storage medium in said stereoscopic viewing-enabled player.

3. The stereoscopic video distribution system according to claim 1,
   wherein the stereoscopic video signal format having been transcoded includes a stereoscopic video signal format including: a flat video including only one of the left-eye video and the right-eye video; and a video for the eye opposite to the eye corresponding to the flat video, wherein a compression efficiency is increased by obtaining a difference from the flat video.

4. A stereoscopic video distribution system for distributing, from a server, a stereoscopic video including a left-eye video and a right-eye video utilizing parallax video, comprising:
   a plurality of video distribution servers; and
   a transcoding server,
   wherein video content that contains said stereoscopic video is constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time, wherein said video information is a stereoscopic video distribution content that includes a flat video constituted by only one of the left-eye video and the right-eye video and enables viewing a stereoscopic video made using information about a video of the eye on the side opposite to the eye of said flat video, wherein said stereoscopic video distribution content is stored in said plurality of video distribution servers, wherein during video distribution, said stereoscopic video distribution content is distributed from one of the plurality of video distribution servers that has a desired content selected according to an external instruction, wherein said stereoscopic video distribution content to be distributed is once input to said transcoding server, and is subjected to a format conversion in said transcoding server, so that said stereoscopic video distribution content is made into a video signal format that can be decoded by a stereoscopic viewing-enabled player or a TV, and said converted stereoscopic video distribution content is redistributed to said stereoscopic viewing-enabled player or said TV, wherein a stereoscopic reproducing player executes a determination processing to determine, based on information provided by an HDMI cable, whether a TV connected to said stereoscopic viewing-enabled player is for viewing of the flat-video and whether the TV is for viewing of the stereoscopic video, and stores the determination result as viewing-environment determination information, wherein when said stereoscopic viewing-enabled player performs an authentication processing with said transcoding server, said viewing-environment determination information is transmitted via said HDMI cable, wherein when a TV for viewing the flat video is connected, said transcoding server distributes a flat video viewing menu of a video distribution menu made of a flat video previously prepared, and wherein when a TV for viewing the stereoscopic video is connected, said transcoding server distributes a viewing menu enumerating a content for stereoscopic video-viewing and a content for flat video-viewing, which are present as a list in a mixed manner, wherein in the list, the content for stereoscopic video-viewing and the content for flat video-viewing can be distinguished from each other.

5. A stereoscopic video distribution system for distributing, from a server, a stereoscopic video including a left-eye video and a right-eye video utilizing parallax video, comprising:

a plurality of video distribution servers; and
a transcoding server, wherein video content that contains said stereoscopic video is constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time, wherein said video information is a stereoscopic video distribution content that includes a flat video constituted by only one of the left-eye video and the right-eye video and enables viewing a stereoscopic video made using information about a video of the eye on the side opposite to the eye of said flat video, wherein said stereoscopic video distribution content is stored in said plurality of video distribution servers, wherein during video distribution, said stereoscopic video distribution content is distributed from one of the plurality of video distribution servers that has a desired content selected according to an external instruction, wherein said stereoscopic video distribution content to be distributed is once input to said transcoding server, and is subjected to a format conversion in said transcoding server, so that said stereoscopic video distribution content is made into a video signal format that can be decoded by a stereoscopic viewing-enabled player or a TV, and said converted stereoscopic video distribution content is redistributed to said stereoscopic viewing-enabled player or said TV, and wherein when said stereoscopic viewing-enabled player or said stereoscopic viewing-enabled TV outputs a desired widget information distribution request to said transcoding server, said transcoding server distributes stereoscopic viewing-enabled desired widget information as a stereoscopic viewing-enabled OSD signal format that can be displayed on said stereoscopic viewing-enabled player or said stereoscopic viewing-enabled TV.

6. The stereoscopic video distribution system according to claim 1, wherein when said stereoscopic viewing-enabled player or said stereoscopic viewing-enabled TV outputs a desired widget information distribution request to said transcoding server, said transcoding server selects one of the plurality of video distribution servers that has stereoscopic viewing-enabled desired widget information, and the video distribution server distributes said stereoscopic viewing-enabled desired widget information to said transcoding server, wherein said stereoscopic viewing-enabled desired widget information is converted by said transcoding server into a stereoscopic viewing-enabled OSD signal format that can be displayed on said stereoscopic viewing-enabled player or said stereoscopic viewing-enabled TV, and wherein said stereoscopic viewing-enabled desired widget information together with the stereoscopic video distribution content is transmitted to said stereoscopic viewing-enabled player or said stereoscopic viewing-enabled TV.

7. The stereoscopic video distribution system according to claim 1, wherein when said stereoscopic viewing-enabled player or said stereoscopic viewing-enabled TV outputs a desired widget information distribution request to said transcoding server, said transcoding server selects one of the plurality of video distribution servers that has stereoscopic viewing-enabled desired widget information, wherein the video distribution server distributes said stereoscopic viewing-enabled desired widget information to said transcoding server, wherein said transcoding server generates a second stereoscopic video distribution content including a combination of said stereoscopic video distribution content and said widget information, so that said second stereoscopic video distribution content is overlaid on a stereoscopic video distribution content screen or is displayed in a region other than a screen-divided content information screen, and wherein said second stereoscopic video distribution content is redistributed to said stereoscopic viewing-enabled player or said stereoscopic viewing-enabled TV.

8. The stereoscopic video distribution system according to claim 1,
- wherein when said stereoscopic viewing-enabled player or said stereoscopic viewing-enabled TV outputs a desired widget information distribution request to said transcoding server, said transcoding server positions in a stereoscopic direction and arranges a desired widget information made of a flat video owned by the video distribution server or said transcoding server,
- wherein a video composing unit in said transcoding server combines said stereoscopic video distribution content and said widget information to generate a second stereoscopic video distribution content,
- and wherein said second stereoscopic video distribution content is distributed as a video signal format that can be displayed on said stereoscopic viewing-enabled player or said stereoscopic viewing-enabled TV.

9. The stereoscopic video distribution system according to claim 8,
- wherein a stereoscopic-direction position of said combined widget information is set by a stereoscopic-direction position variation input unit in accordance with an external input from said stereoscopic viewing-enabled player or said stereoscopic viewing-enabled TV,
- wherein a weighting parameter of a stereoscopic-direction weighting unit in said transcoding server is changed on the basis of a stereoscopic-direction position variation control command transmitted from said stereoscopic viewing-enabled player or said stereoscopic viewing-enabled TV to said transcoding server, so that a stereoscopic sensation of the composed stereoscopic video can be increased or reduced in the depth or protruding direction.

10. The stereoscopic video distribution system according to claim 1,
- wherein said stereoscopic video distribution content stored in the video distribution server is stereoscopic video distribution content including a plurality of pieces of angle information,
- wherein when said stereoscopic viewing-enabled player or said stereoscopic viewing-enabled TV is viewed, multi-angle switching operation information including an external multi-angle display number is transferred from said stereoscopic viewing-enabled player or said stereoscopic viewing-enabled TV to said transcoding server,
- wherein said transcoding server transfers said multi-angle switching operation information, as information that said video distribution server can receive, to said video distribution server,
- wherein said video distribution server distributes said stereoscopic video distribution content whose angle is switched,
- wherein said stereoscopic video distribution content whose angle is switched is subjected to format conversion, and is redistributed to said stereoscopic viewing-enabled player or said stereoscopic viewing-enabled TV, so that multi-angle switching operation of can be performed on said stereoscopic video distribution content.

11. The stereoscopic video distribution system according to claim 1,
- wherein said stereoscopic video distribution content stored in the video distribution server is stereoscopic video distribution content including a plurality of pieces of angle information,
- wherein when said stereoscopic viewing-enabled player or said stereoscopic viewing-enabled TV is viewed, an angle sequential switching command is defined from the outside to sequentially switch an angle in clockwise or anti-clockwise direction with a predetermined time interval from a current viewing angle,
- wherein said stereoscopic viewing-enabled player or said stereoscopic viewing-enabled TV transfer said angle sequential switching command to said transcoding server,
- wherein said transcoding server transfers said multi-angle switching operation information, as information that said video distribution server can receive, to said video distribution server,
- wherein said video distribution server distributes stereoscopic video distribution content in which the angle sequentially switches in clockwise or anti-clockwise direction,
- and wherein said stereoscopic video distribution content whose angle is switched is subjected to format conversion in said transcoding server, and is redistributed to said stereoscopic viewing-enabled player or said stereoscopic viewing-enabled TV, so that multi-angle sequential switching operation in clockwise or anti-clockwise direction can be performed on said stereoscopic video distribution content.

12. The stereoscopic video distribution system according to claim 1,
- wherein when said stereoscopic viewing-enabled player or said stereoscopic viewing-enabled TV performs an authentication processing with said transcoding server, a billing processing is performed between the outside and said transcoding server,
- wherein after the billing processing between the outside and said transcoding server, a second billing processing is executed between said transcoding server and said video distribution server having said stereoscopic video distribution content desired by the outside,
- and wherein a predetermined ratio of an amount of money paid from the outside is give to a right holder of said video distribution server, and the remaining amount of money is distributed to right holders of said transcoding server.

13. The stereoscopic video distribution system according to claim 1,
- wherein said stereoscopic viewing-enabled player or said stereoscopic viewing-enabled TV includes a video distribution buffer having a capacity larger than a total time of a communication time between said transcoding server and said video distribution server, a switching time of the video distribution server to a video of another angle, a format conversion processing time taken in the transcoding server, and a communication time between the transcoding server and said stereoscopic viewing-enabled player or said stereoscopic viewing-enabled TV.

14. A stereoscopic video distribution system for distributing, from a server, a stereoscopic video including a left-eye video and a right-eye video utilizing parallax video,
- wherein video content that contains stereoscopic video is constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time,
- wherein said video information is a stereoscopic video distribution content that includes a flat video constituted by only one of the left-eye video and the right-eye video and enables viewing a stereoscopic video made using information about a video of the eye on the side opposite to the eye of said flat video, wherein said stereoscopic video distribution content is constituted by the flat video constituted by only one of the left-eye video and the right-eye video stored in a plurality of video distribution servers, wherein during video distribution, a desired flat video distribution content is distributed from one of the plurality of video distribution servers that has the desired flat video distribution content selected according to an external instruction, wherein said flat video distribution content to be distributed is once input to a transcoding server, wherein said transcoding server converts said flat video distribution content from the flat video into a stereoscopic video, and converts said flat video distribution content into a video signal format that can be decoded by a stereoscopic viewing-enabled player or a TV, wherein said flat video distribution content is redistributed to said stereoscopic viewing-enabled player or said TV, and wherein a stereoscopic-direction position of stereoscopic information composed and converted from the flat video is externally set with a stereoscopic-direction position variation input from said stereoscopic viewing-enabled player or said stereoscopic viewing-enabled TV, wherein a weighting parameter of a stereoscopic-direction weighting unit in said transcoding server is changed on the basis of a stereoscopic-direction position variation control command transmitted to said transcoding server from said stereoscopic viewing-enabled player or said stereoscopic viewing-enabled TV, so that a three-dimensionality in a depth or protruding direction of a composed stereoscopic video is increased or decreased.

15. The stereoscopic video distribution system according to claim 14, wherein the conversion from the flat video into the stereoscopic video is achieved by:

extracting a background section of a video;

separating a forward section of the video;

giving weights to stereoscopic-direction positions of these separated videos; and composing the videos weighted in the stereoscopic direction.

16. A stereoscopic video distribution method for distributing, from a server, a stereoscopic video including a left-eye video and a right-eye video utilizing parallax video, wherein video content that contains stereoscopic video is constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time, wherein said video information is a stereoscopic video distribution content that includes a flat video constituted by only one of the left-eye video and the right-eye video and enables viewing a stereoscopic video made using information about a video of the eye on the side opposite to the eye of said flat video, wherein said method comprises:

storing said stereoscopic video distribution content in a plurality of video distribution servers;

selecting a desired stereoscopic video distribution content for distribution from one of the plurality of video distribution servers according to an external instruction;

distributing said desired stereoscopic video distribution content to a transcoding server, and subjecting said desired stereoscopic video distribution content to a format conversion in said transcoding server, so that said desired stereoscopic video distribution content is made into a video signal format that can be decoded by a stereoscopic viewing-enabled player or a TV; and redistributing said converted stereoscopic video distribution content to said stereoscopic viewing-enabled player or said TV, wherein a stereoscopic reproducing player executes a determination processing to determine, based on information provided by an HDMI cable, whether a TV setting permits viewing of the flat-video and whether the TV setting permits viewing of the stereoscopic video, and stores the determination result as viewing-environment determination information, wherein when said stereoscopic viewing-enabled player performs an authentication processing with said transcoding server, said viewing-environment determination information is transmitted via said HDMI cable, wherein when the flat video can be viewed, said transcoding server distributes a flat video viewing menu of a video distribution menu made of a flat video previously prepared, and wherein when the stereoscopic video can be viewed, said transcoding server distributes a viewing menu enumerating a content for stereoscopic video-viewing and a content for flat video-viewing, which are present as a list in a mixed manner, wherein in the list, the content for stereoscopic video-viewing and the content for flat video-viewing can be distinguished from each other.

17. The stereoscopic video distribution method according to claim 16, wherein said stereoscopic video distribution content is distributed upon being transcoded by said transcoding server, so that the stereoscopic video signal format having been distributed has the same compression structure as a stereoscopic video signal format recorded on a storage medium in said stereoscopic viewing-enabled player.

18. The stereoscopic video distribution method according to claim 16, wherein the stereoscopic video signal format having been transcoded includes a stereoscopic video signal format including: a flat video including only one of the left-eye video and the right-eye video; and a video for the eye opposite to the eye corresponding to the flat video, wherein a compression efficiency is increased by obtaining a difference from the flat video.

19. A stereoscopic video distribution method for distributing, from a server, a stereoscopic video including a left-eye video and a right-eye video utilizing parallax video, wherein video content that contains stereoscopic video is constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time, wherein said video information is a stereoscopic video distribution content that includes a flat video constituted by only one of the left-eye video and the right-eye video and enables viewing a stereoscopic video made using information about a video of the eye on the side opposite to the eye of said flat video, wherein said method comprises:
storing said stereoscopic video distribution content in a plurality of video distribution servers;
selecting a desired stereoscopic video distribution content for distribution from one of the plurality of video distribution servers according to an external instruction;
distributing said desired stereoscopic video distribution content to a transcoding server, and subjecting said desired stereoscopic video distribution content to a format conversion in said transcoding server, so that said desired stereoscopic video distribution content is made into a video signal format that can be decoded by a stereoscopic viewing-enabled player or a TV; and
redistributing said converted stereoscopic video distribution content to said stereoscopic viewing-enabled player or said TV,
wherein a stereoscopic reproducing player executes a determination processing to determine, based on information provided by an HDMI cable, whether a TV connected to said stereoscopic viewing-enabled player is for viewing of the flat-video and whether the TV is for viewing of the stereoscopic video, and stores the determination result as viewing-environment determination information,
wherein when said stereoscopic viewing-enabled player performs an authentication processing with said transcoding server, said viewing-environment determination information is transmitted via said HDMI cable,
wherein when a TV for viewing the flat video is connected, said transcoding server distributes a flat video viewing menu of a video distribution menu made of a flat video previously prepared,
and wherein when a TV for viewing the stereoscopic video is connected, said transcoding server distributes a viewing menu enumerating a content for stereoscopic video-viewing and a content for flat video-viewing, which are present as a list in a mixed manner, wherein in the list, the content for stereoscopic video-viewing and the content for flat video-viewing can be distinguished from each other.

20. The stereoscopic video distribution method for distributing, from a server, a stereoscopic video including a left-eye video and a right-eye video utilizing parallax video,
wherein video content that contains stereoscopic video is constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time,
wherein said video information is a stereoscopic video distribution content that includes a flat video constituted by only one of the left-eye video and the right-eye video and enables viewing a stereoscopic video made using information about a video of the eye on the side opposite to the eye of said flat video,
wherein said method comprises:
storing said stereoscopic video distribution content in a plurality of video distribution servers;
selecting a desired stereoscopic video distribution content for distribution from one of the plurality of video distribution servers according to an external instruction;
distributing said desired stereoscopic video distribution content to a transcoding server, and subjecting said desired stereoscopic video distribution content to a format conversion in said transcoding server, so that said desired stereoscopic video distribution content is made into a video signal format that can be decoded by a stereoscopic viewing-enabled player or a TV; and
redistributing said converted stereoscopic video distribution content to said stereoscopic viewing-enabled player or said TV, and
wherein when said stereoscopic viewing-enabled player or said stereoscopic viewing-enabled TV outputs a desired widget information distribution request to said transcoding server, said transcoding server distributes stereoscopic viewing-enabled desired widget information as a stereoscopic viewing-enabled OSD signal format that can be displayed on said stereoscopic viewing-enabled player or said stereoscopic viewing-enabled TV.

21. The stereoscopic video distribution method according to claim 16,
wherein when said stereoscopic viewing-enabled player or said stereoscopic viewing-enabled TV outputs a desired widget information distribution request to said transcoding server, said transcoding server selects one of the plurality of video distribution servers that has stereoscopic viewing-enabled desired widget information, and the video distribution server distributes said stereoscopic viewing-enabled desired widget information to said transcoding server,
wherein said stereoscopic viewing-enabled desired widget information is converted by said transcoding server into a stereoscopic viewing-enabled OSD signal format that can be displayed on said stereoscopic viewing-enabled player or said stereoscopic viewing-enabled TV,
and wherein said stereoscopic viewing-enabled desired widget information together with the stereoscopic video distribution content is transmitted to said stereoscopic viewing-enabled player or said stereoscopic viewing-enabled TV.

22. The stereoscopic video distribution method according to claim 16,
wherein when said stereoscopic viewing-enabled player or said stereoscopic viewing-enabled TV outputs a desired widget information distribution request to said transcoding server, said transcoding server selects one of the plurality of video distribution servers that has stereoscopic viewing-enabled desired widget information,
wherein the video distribution server distributes said stereoscopic viewing-enabled desired widget information to said transcoding server,
wherein said transcoding server generates a second stereoscopic video distribution content including a combination of said stereoscopic video distribution content and said widget information, so that said second stereoscopic video distribution content is overlaid on a stereoscopic video distribution content screen or is displayed in a region other than a screen-divided content information screen,
and wherein said second stereoscopic video distribution content is redistributed to said stereoscopic viewing-enabled player or said stereoscopic viewing-enabled TV.

23. The stereoscopic video distribution method according to claim 16,
wherein when said stereoscopic viewing-enabled player or said stereoscopic viewing-enabled TV outputs a desired widget information distribution request to said transcoding server, said transcoding server positions in a stereoscopic direction and arranges a desired widget information made of a flat video owned by the video distribution server or said transcoding server, wherein a video composing unit in said transcoding server combines said stereoscopic video distribution content and said widget information to generate a second stereoscopic video distribution content, and wherein said second stereoscopic video distribution content is distributed as a video signal format that can be displayed on said stereoscopic viewing-enabled player or said stereoscopic viewing-enabled TV.

24. The stereoscopic video distribution method according to claim 23, wherein a stereoscopic-direction position of said combined widget information is set by a stereoscopic-direction position variation input unit in accordance with an external input from said stereoscopic viewing-enabled player or said stereoscopic viewing-enabled TV, wherein a weighting parameter of a stereoscopic-direction weighting unit in said transcoding server is changed on the basis of a stereoscopic-direction position variation control command transmitted from said stereoscopic viewing-enabled player or said stereoscopic viewing-enabled TV to said transcoding server, so that a stereoscopic sensation of the composed stereoscopic video can be increased or reduced in the depth or protruding direction.

25. The stereoscopic video distribution method according to claim 16, wherein said stereoscopic video distribution content stored in the video distribution server is stereoscopic video distribution content including a plurality of pieces of angle information, wherein when said stereoscopic viewing-enabled player or said stereoscopic viewing-enabled TV is viewed, multi-angle switching operation information including an external multi-angle display number is transferred from said stereoscopic viewing-enabled player or said stereoscopic viewing-enabled TV to said transcoding server, wherein said transcoding server transfers said multi-angle switching operation information, as information that said video distribution server can receive, to said video distribution server, wherein said video distribution server distributes said stereoscopic video distribution content whose angle is switched, and wherein said stereoscopic video distribution content whose angle is switched is subjected to format conversion, and is redistributed to said stereoscopic viewing-enabled player or said stereoscopic viewing-enabled TV, so that multi-angle switching operation can be performed on said stereoscopic video distribution content.

26. The stereoscopic video distribution method according to claim 16, wherein said stereoscopic video distribution content stored in the video distribution server is stereoscopic video distribution content including a plurality of pieces of angle information, wherein when said stereoscopic viewing-enabled player or said stereoscopic viewing-enabled TV is viewed, an angle sequential switching command is defined from the outside to sequentially switch in clockwise or anti-clockwise direction for a predetermined time from an angle during viewing, wherein said stereoscopic viewing-enabled player or said stereoscopic viewing-enabled TV transfer said angle sequential switching command to said transcoding server, wherein said transcoding server transfers said multi-angle switching operation information, as information that said video distribution server can receive, to said video distribution server, wherein said video distribution server distributes stereoscopic video distribution content in which the angle sequentially switches in clockwise or anti-clockwise direction, and wherein said stereoscopic video distribution content whose angle is switched is subjected to format conversion in said transcoding server, and is redistributed to said stereoscopic viewing-enabled player or said stereoscopic viewing-enabled TV, so that multi-angle sequential switching operation in clockwise or anti-clockwise direction can be performed on said stereoscopic video distribution content.

27. The stereoscopic video distribution method according to claim 16, wherein when said stereoscopic viewing-enabled player or said stereoscopic viewing-enabled TV performs an authentication processing with said transcoding server, a billing processing is performed between the outside and said transcoding server, wherein after the billing processing between the outside and said transcoding server, a second billing processing is executed between said transcoding server and said video distribution server having said stereoscopic video distribution content desired by the outside, and wherein a predetermined ratio of an amount of money paid from the outside is given to a right holder of said video distribution server, and the remaining amount of money is distributed to right holders of said transcoding server.

28. The stereoscopic video distribution method according to claim 16, wherein said stereoscopic viewing-enabled player or said stereoscopic viewing-enabled TV includes a video distribution buffer having a capacity larger than a total time of a communication time between said transcoding server and said video distribution server, a switching time of the video distribution server to a video of another angle, a format conversion processing time taken in the transcoding server, and a communication time between the transcoding server and said stereoscopic viewing-enabled player or said stereoscopic viewing-enabled TV.

29. A stereoscopic video distribution method for distributing, from a server, a stereoscopic video including a left-eye video and a right-eye video utilizing parallax video, wherein video content that contains stereoscopic video is constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time, wherein said video information is a stereoscopic video distribution content that includes a flat video constituted by only one of the left-eye video and the right-eye video and enables viewing a stereoscopic video made using information about a video of the eye on the side opposite to the eye of said flat video, wherein said stereoscopic video distribution content is constituted by the flat video constituted by only one of the left-eye video and the right-eye video stored in a plurality of video distribution servers, wherein during video distribution, a desired flat video distribution content is distributed from one of the plurality of video distribution servers that has the desired flat video distribution content selected according to an external instruction, wherein said flat video distribution content to be distributed is once input to a transcoding server, wherein said transcoding server converts said flat video distribution content from the flat video into a stereoscopic video, and converts said flat video distribution content into a video signal format that can be decoded by a stereoscopic viewing-enabled player or a TV, wherein said flat video distribution content is redistributed to said stereoscopic viewing-enabled player or said TV, and wherein a stereoscopic-direction position of stereoscopic information composed and converted from the flat video is externally set with a stereoscopic-direction position variation input from said stereoscopic viewing-enabled player or said stereoscopic viewing-enabled TV, wherein a weighting parameter of a stereoscopic-direction weighting unit in said transcoding server is changed on the basis of a stereoscopic-direction position variation control command transmitted to said transcoding server from said stereoscopic viewing-enabled player or said stereoscopic viewing-enabled TV, so that a three-dimensionality in a depth or protruding direction of a composed stereoscopic video is increased or decreased.

30. The stereoscopic video distribution method according to claim 29,
wherein the conversion from the flat video into the stereoscopic video is achieved by:
extracting a background section of a video;
separating a forward section of the video;
giving weights to stereoscopic-direction positions of these separated videos; and
composing the videos weighted in the stereoscopic direction.

31. A stereoscopic video distribution apparatus for distributing, from a server, a stereoscopic video including a left-eye video and a right-eye video utilizing parallax video, said apparatus comprising:
a format conversion unit; and
a redistribution unit,
wherein video content that contains stereoscopic video is constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time,
wherein said video information is a stereoscopic video distribution content that includes a flat video constituted by only one of the left-eye video and the right-eye video and enables viewing a stereoscopic video made using information about a video of the eye on the side opposite to the eye of said flat video,
wherein said stereoscopic video distribution content is stored in a plurality of video distribution servers,
wherein during video distribution, said stereoscopic video distribution content is distributed from one of the plurality of video distribution servers that has a desired content selected according to an external instruction,
wherein said stereoscopic video distribution content to be distributed is once input to a transcoding server,
wherein said format conversion unit is in said transcoding server,
wherein the format conversion unit makes said stereoscopic video distribution content into a video signal format that can be decoded by a stereoscopic viewing-enabled player or a TV, and said converted stereoscopic video distribution content is redistributed by said redistribution unit to said stereoscopic viewing-enabled player or said TV,
wherein a stereoscopic reproducing player executes a determination processing to determine, based on information provided by an HDMI cable, whether a TV setting permits viewing of the flat-video and whether the TV setting permits viewing of the stereoscopic video, and stores the determination result as viewing-environment determination information,
wherein the stereoscopic reproducing player transmits said viewing-environment determination information via said HDMI cable, when said stereoscopic viewing-enabled player performs an authentication processing with said transcoding server, and
when the flat video can be viewed, the stereo video distribution apparatus distributes a flat video viewing menu of a video distribution menu made of a flat video previously prepared in said transcoding server, wherein when the stereoscopic video can be viewed, the unit distributes a viewing menu enumerating a content for stereoscopic video-viewing and a content for flat video-viewing, which are present as a list in a mixed manner, wherein in the list, the content for stereoscopic video-viewing and the content for flat video-viewing can be distinguished from each other.

32. The stereoscopic video distribution apparatus according to claim 31,
wherein said stereoscopic video distribution content is distributed upon being transcoded by said format conversion unit of said transcoding server, so that the stereoscopic video signal format having been distributed has the same compression structure as a stereoscopic video signal format recorded on a storage medium in said stereoscopic viewing-enabled player.

33. The stereoscopic video distribution apparatus according to claim 31,
wherein the stereoscopic video signal format having been transcoded includes a stereoscopic video signal format including: a flat video including only one of the left-eye video and the right-eye video; and a video for the eye opposite to the eye corresponding to the flat video, wherein a compression efficiency is increased by obtaining a difference from the flat video.

34. A stereoscopic video distribution apparatus for distributing, from a server, a stereoscopic video including a left-eye video and a right-eye video utilizing parallax video, said apparatus comprising:
a format conversion unit; and
a redistribution unit,
wherein video content that contains stereoscopic video is constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time,
wherein said video information is a stereoscopic video distribution content that includes a flat video constituted by only one of the left-eye video and the right-eye video and enables viewing a stereoscopic video made using information about a video of the eye on the side opposite to the eye of said flat video, wherein said stereoscopic video distribution content is stored in a plurality of video distribution servers, wherein during video distribution, said stereoscopic video distribution content is distributed from one of the plurality of video distribution servers that has a desired content selected according to an external instruction, wherein said stereoscopic video distribution content to be distributed is once input to a transcoding server, wherein said format conversion unit is in said transcoding server, wherein the format conversion unit makes said stereoscopic video distribution content into a video signal format that can be decoded by a stereoscopic viewing-enabled player or a TV, and said converted stereoscopic video distribution content is redistributed by said redistribution unit to said stereoscopic viewing-enabled player or said TV, wherein a stereoscopic reproducing player determines, based on information provided by an HDMI cable, whether a TV connected to said stereoscopic viewing-enabled player is for viewing of the flat-video and whether the TV is for viewing of the stereoscopic video, wherein the stereoscopic reproducing player stores the results of the determination as viewing-environment determination information, wherein the stereoscopic reproducing player transmits said viewing-environment determination information via said HDMI cable, when said stereoscopic viewing-enabled player performs an authentication processing with said transcoding server, and wherein said transcoding server distributes a flat video viewing menu of a video distribution menu made of a flat video previously prepared in said transcoding server, when a TV for viewing the flat video is connected, wherein when a TV for viewing the stereoscopic video is connected, the transcoding server distributes a viewing menu enumerating a content for stereoscopic video-viewing and a content for flat video-viewing, which are present as a list in a mixed manner, wherein in the list, the content for stereoscopic video-viewing and the content for flat video-viewing can be distinguished from each other.

35. A stereoscopic video distribution apparatus for distributing, from a server, a stereoscopic video including a left-eye video and a right-eye video utilizing parallax video, said apparatus comprising:

a format conversion unit; and a redistribution unit, wherein video content that contains stereoscopic video is constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time, wherein said video information is a stereoscopic video distribution content that includes a flat video constituted by only one of the left-eye video and the right-eye video and enables viewing a stereoscopic video made using information about a video of the eye on the side opposite to the eye of said flat video, wherein said stereoscopic video distribution content is stored in a plurality of video distribution servers, wherein during video distribution, said stereoscopic video distribution content is distributed from one of the plurality of video distribution servers that has a desired content selected according to an external instruction, wherein said stereoscopic video distribution content to be distributed is once input to a transcoding server, wherein said format conversion unit is in said transcoding server, wherein the format conversion unit makes said stereoscopic video distribution content into a video signal format that can be decoded by a stereoscopic viewing-enabled player or a TV, and said converted stereoscopic video distribution content is redistributed by said redistribution unit to said stereoscopic viewing-enabled player or said TV, wherein said stereoscopic video distribution apparatus causes said stereoscopic viewing-enabled player or said stereoscopic viewing-enabled TV to output a desired widget information distribution request to said transcoding server, and wherein said stereoscopic video distribution apparatus distributes stereoscopic viewing-enabled desired widget information in said transcoding server as a stereoscopic viewing-enabled OSD signal format that can be displayed on said stereoscopic viewing-enabled player or said stereoscopic viewing-enabled TV.

36. The stereoscopic video distribution apparatus according to claim 31, wherein said stereoscopic video distribution apparatus causes said transcoding server to select one of the plurality of video distribution servers that has stereoscopic viewing-enabled desired widget information, when said stereoscopic viewing-enabled player or said stereoscopic viewing-enabled TV outputs a desired widget information distribution request to said transcoding server;

wherein said stereoscopic video distribution apparatus causes the video distribution server to distribute said stereoscopic viewing-enabled desired widget information to said transcoding server;

wherein said stereoscopic video distribution apparatus causes said transcoding server to convert said stereoscopic viewing-enabled desired widget information into a stereoscopic viewing-enabled OSD signal format that can be displayed on said stereoscopic viewing-enabled player or said stereoscopic viewing-enabled TV; and wherein said stereoscopic video distribution apparatus transmits said stereoscopic viewing-enabled desired widget information together with the stereoscopic video distribution content to said stereoscopic viewing-enabled player or said stereoscopic viewing-enabled TV.

37. The stereoscopic video distribution apparatus according to claim 31, wherein said stereoscopic video distribution apparatus causes said transcoding server to select one of the plurality of video distribution servers that has stereoscopic viewing-enabled desired widget information, when said stereoscopic viewing-enabled player or said stereoscopic viewing-enabled TV outputs a desired widget information distribution request to said transcoding server;

wherein said stereoscopic video distribution apparatus causes the video distribution server to distribute said stereoscopic viewing-enabled desired widget information to said transcoding server; and wherein said stereoscopic video distribution apparatus generates, in said transcoding server, a second stereoscopic video distribution content including a combination of said stereoscopic video distribution content and the widget information, so that said second stereoscopic video distribution content is overlaid on a stereoscopic video distribution content screen or is displayed in a region other than a screen-divided content information screen, wherein said second stereoscopic video distribution content is redistributed to said stereoscopic viewing-enabled player or said stereoscopic viewing-enabled TV.

38. The stereoscopic video distribution apparatus according to claim 31, wherein said stereoscopic video distribution apparatus causes said transcoding server to position in a stereoscopic direction and arrange a desired widget information made of a flat video owned by the video distribution server or said transcoding server, when said stereoscopic viewing-enabled player or said stereoscopic viewing-enabled TV outputs a desired widget information distribution request to said transcoding server;

wherein said stereoscopic video distribution apparatus causes a video composing unit in said transcoding server to combine said stereoscopic video distribution content and said widget information to generate a second stereoscopic video distribution content; and wherein said stereoscopic video distribution apparatus distributes said second stereoscopic video distribution content as a video signal format that can be displayed on said stereoscopic viewing-enabled player or said stereoscopic viewing-enabled TV.

39. The stereoscopic video distribution apparatus according to claim 38, wherein said stereoscopic video distribution apparatus causes a stereoscopic-direction position variation input unit to set a stereoscopic-direction position of said combined widget information in accordance with an external input from said stereoscopic viewing-enabled player or said stereoscopic viewing-enabled TV;

wherein said stereoscopic video distribution apparatus transmits a stereoscopic-direction position variation control command from said stereoscopic viewing-enabled player or said stereoscopic viewing-enabled TV to said transcoding server; and wherein said stereoscopic video distribution apparatus causes a unit for changing a weighting parameter of a stereoscopic-direction weighting unit in said transcoding server, so that a stereoscopic sensation of the composed stereoscopic video can be increased or reduced in the depth or protruding direction.

40. The stereoscopic video distribution apparatus according to claim 31, wherein said stereoscopic video distribution content stored in the video distribution server is stereoscopic video distribution content including a plurality of pieces of angle information, wherein the stereoscopic video distribution apparatus obtains multi-angle switching operation information including an external multi-angle display number, when said stereoscopic viewing-enabled player or said stereoscopic viewing-enabled TV is viewed, wherein said stereoscopic video distribution apparatus transfers said multi-angle switching operation information from said stereoscopic viewing-enabled player or said stereoscopic viewing-enabled TV to said transcoding server;

wherein said stereoscopic video distribution apparatus causes said video distribution server to distribute said stereoscopic video distribution content whose angle is switched;

wherein said format conversion unit performs format conversion on said stereoscopic video distribution content whose angle is switched;

wherein said redistribution unit redistributes said stereoscopic video distribution content to said stereoscopic viewing-enabled player or said stereoscopic viewing-enabled TV, and wherein multi-angle switching operation of said stereoscopic video distribution content is thus performed.

41. The stereoscopic video distribution apparatus according to claim 31, wherein said stereoscopic video distribution content stored in the video distribution server is stereoscopic video distribution content including a plurality of pieces of angle information, wherein the stereoscopic video distribution apparatus issues an angle sequential switching command to sequentially switch an angle in clockwise or anti-clockwise direction with a predetermined time interval from a current viewing angle, when said stereoscopic viewing-enabled player or said stereoscopic viewing-enabled TV is viewed;

wherein said stereoscopic video distribution apparatus causes said stereoscopic viewing-enabled player or said stereoscopic viewing-enabled TV to transfer said angle sequential switching command to said transcoding server;

wherein said stereoscopic video distribution apparatus causes said transcoding server to transfer said multi-angle switching operation information, as information that said video distribution server can receive, to said video distribution server;

wherein said stereoscopic video distribution apparatus causes said video distribution server to distribute stereoscopic video distribution content in which the angle sequentially switches in clockwise or anti-clockwise direction;

wherein said format conversion unit performs format conversion on said stereoscopic video distribution content whose angle is switched; and wherein said redistribution unit redistributes said stereoscopic video distribution content to said stereoscopic viewing-enabled player or said stereoscopic viewing-enabled TV, so that multi-angle sequential switching operation in clockwise or anti-clockwise direction can be performed on said stereoscopic video distribution content.

42. The stereoscopic video distribution apparatus according to claim 31, wherein said stereoscopic video distribution apparatus performs a billing processing between the outside and said transcoding server, when said stereoscopic viewing-enabled player or said stereoscopic viewing-enabled TV performs an authentication processing with said transcoding server;

wherein said stereoscopic video distribution apparatus executes a second billing processing between said transcoding server and said video distribution server having said stereoscopic video distribution content desired by the outside, after the billing processing was performed between the outside and said transcoding server; and wherein said stereoscopic video distribution apparatus gives a predetermined ratio of an amount of money paid from the outside to a right holder of said video distribution server, and distributes the remaining amount of money to right holders of said transcoding server.

43. The stereoscopic video distribution apparatus according to claim 31,
wherein said stereoscopic viewing-enabled player or said stereoscopic viewing-enabled TV includes a video distribution buffer having a capacity larger than a total time of a communication time between said transcoding server and said video distribution server, a switching time of the video distribution server to a video of another angle, a format conversion processing time taken in the transcoding server, and a communication time between the transcoding server and said stereoscopic viewing-enabled player or said stereoscopic viewing-enabled TV.

44. A stereoscopic video distribution apparatus for distributing, from a server, a stereoscopic video including a left-eye video and a right-eye video utilizing parallax video, said apparatus comprising:
a format conversion unit; and
a redistribution unit,
wherein video content that contains stereoscopic video is constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time,
wherein said video information is a stereoscopic video distribution content that includes a flat video constituted by only one of the left-eye video and the right-eye video and enables viewing a stereoscopic video made using information about a video of the eye on the side opposite to the eye of said flat video,
wherein said stereoscopic video distribution content is constituted by the flat video constituted by only one of the left-eye video and the right-eye video stored in a plurality of video distribution servers,
wherein during video distribution, a desired flat video distribution content is distributed from one of the plurality of video distribution servers that has the desired flat video distribution content selected according to an external instruction,
wherein said flat video distribution content to be distributed is once input to a transcoding server,
wherein said format conversion unit is included in said transcoding server,
wherein said format conversion unit converts said flat video distribution content from the flat video into a stereoscopic video,
wherein said format conversion unit converts said flat video distribution content into a video signal format that can be decoded by a stereoscopic viewing-enabled player or a stereoscopic viewing-enabled TV,
wherein said flat video distribution content is redistributed to said stereoscopic viewing-enabled player or said TV,
and wherein said stereoscopic video distribution apparatus externally sets a stereoscopic-direction position of stereoscopic information composed and converted from the flat video with a stereoscopic-direction position variation input from said stereoscopic viewing-enabled player or said stereoscopic viewing-enabled TV;
wherein said stereoscopic video distribution apparatus transmits a stereoscopic-direction position variation control command for setting the stereoscopic-direction position to said transcoding server from said stereoscopic viewing-enabled player or said stereoscopic viewing-enabled TV;
wherein said stereoscopic video distribution apparatus varies a weighting parameter of a stereoscopic-direction weighting unit in said transcoding server, so that a three-dimensionality in a depth or protruding direction of a composed stereoscopic video is increased or decreased.

45. The stereoscopic video distribution apparatus according to claim 44,
wherein the conversion from the flat video into the stereoscopic video is achieved by:
extracting a background section of a video;
separating a forward section of the video;
giving weights to stereoscopic-direction positions of these separated videos; and
composing the videos weighted in the stereoscopic direction.

* * * * *